(12) United States Patent
Bansal et al.

(10) Patent No.: US 7,805,510 B2
(45) Date of Patent: Sep. 28, 2010

(54) HIERARCHY FOR CHARACTERIZING INTERACTIONS WITH AN APPLICATION

(75) Inventors: Jyoti K. Bansal, San Francisco, CA (US); Ling Thio, Sunnyvale, CA (US); Jeffrey R. Cobb, Belmont, CA (US)

(73) Assignee: Computer Associates Think, Inc., Islandia, NY (US)

( * ) Notice: Subject to any disclaimer, the term of this patent is extended or adjusted under 35 U.S.C. 154(b) by 807 days.

(21) Appl. No.: 11/565,490

(22) Filed: Nov. 30, 2006

(65) Prior Publication Data

US 2007/0266045 A1 Nov. 15, 2007

Related U.S. Application Data

(60) Provisional application No. 60/799,607, filed on May 11, 2006.

(51) Int. Cl.
*G06F 15/173* (2006.01)
(52) U.S. Cl. .......................................... 709/224; 714/4
(58) Field of Classification Search ................. 709/224; 714/4
See application file for complete search history.

(56) References Cited

U.S. PATENT DOCUMENTS

| | | | |
|---|---|---|---|
| 4,774,681 A | 9/1988 | Frisch | |
| 5,375,199 A | 12/1994 | Harrow | |
| 5,426,730 A | 6/1995 | Miyake | |
| 5,655,081 A | 8/1997 | Bonnell | |
| 5,784,553 A | 7/1998 | Kolawa | |
| 5,790,858 A | 8/1998 | Vogel | |
| 5,862,381 A | 1/1999 | Advani | |
| 5,898,873 A | 4/1999 | Lehr | |
| 5,940,618 A | 8/1999 | Blandy | |
| 5,978,594 A | 11/1999 | Bonnell | |
| 5,996,092 A | 11/1999 | Augsburg | |

(Continued)

FOREIGN PATENT DOCUMENTS

EP 1024430 2/2000

OTHER PUBLICATIONS

U.S. Appl. No. 09/795,901, filed Feb. 28, 2001, "Adding Functionality To Existing Code At Exits," by Cobb.

(Continued)

*Primary Examiner*—Aaron Strange
*Assistant Examiner*—James Q Forman
(74) *Attorney, Agent, or Firm*—Vierra Magen Marcus & DeNiro LLP

(57) ABSTRACT

Application runtime data is obtained from an application monitoring system which monitors execution of an application, and traffic monitoring data is obtained from a traffic monitoring system which monitors traffic to/from the application as the clients interact with the application. Corresponding application runtime data and traffic monitoring data can be selectively output to assist an operator in investigating an anomalous condition. The data can be classified and selectively output according to one or more hierarchies which characterize the interactions. The hierarchies can include a domain level, a business process level (where a domain is made up of a number of business processes), a business transaction level (where a business process is made up of different business transactions), an individual transaction level (where a business transaction is made up of different transactions), and a transaction component level (where a transaction is made up of one or more transaction components).

35 Claims, 31 Drawing Sheets

U.S. PATENT DOCUMENTS

| | | | |
|---|---|---|---|
| 6,141,699 | A | 10/2000 | Luzzi |
| 6,260,187 | B1 | 7/2001 | Cirne |
| 6,263,298 | B1 | 7/2001 | Kerman |
| 6,266,805 | B1 | 7/2001 | Nwana |
| 6,282,701 | B1 | 8/2001 | Wygodny |
| 6,295,642 | B1 | 9/2001 | Blandy |
| 6,332,212 | B1 | 12/2001 | Organ |
| 6,332,213 | B1 | 12/2001 | Grossman |
| 6,530,075 | B1 | 3/2003 | Beadle |
| 6,564,342 | B2 * | 5/2003 | Landan ............... 714/48 |
| 6,584,501 | B1 * | 6/2003 | Cartsonis et al. ........... 709/224 |
| 6,611,276 | B1 | 8/2003 | Muratori |
| 6,643,842 | B2 | 11/2003 | Angel |
| 6,654,741 | B1 | 11/2003 | Cohen |
| 6,658,367 | B2 | 12/2003 | Conrad |
| 6,701,459 | B2 * | 3/2004 | Ramanathan et al. ......... 714/37 |
| 6,792,460 | B2 | 9/2004 | Oulu |
| 6,941,367 | B2 | 9/2005 | Vosseler |
| 7,076,547 | B1 * | 7/2006 | Black ............... 709/224 |
| 7,076,695 | B2 | 7/2006 | McGee |
| 7,093,013 | B1 | 8/2006 | Hornok, Jr. |
| 7,478,151 | B1 * | 1/2009 | Maiocco et al. ........... 709/223 |
| 2002/0029265 | A1 | 3/2002 | Mizoguchi |
| 2002/0038228 | A1 | 3/2002 | Waldorf |
| 2002/0073195 | A1 | 6/2002 | Hellerstein |
| 2002/0099731 | A1 | 7/2002 | Abajian |
| 2002/0169870 | A1 | 11/2002 | Vosseler |
| 2002/0174222 | A1 | 11/2002 | Cox |
| 2002/0198984 | A1 * | 12/2002 | Goldstein et al. ......... 709/224 |
| 2002/0198985 | A1 * | 12/2002 | Fraenkel et al. ............. 709/224 |
| 2003/0009507 | A1 | 1/2003 | Shum |
| 2003/0018909 | A1 | 1/2003 | Cuomo |
| 2003/0065986 | A1 | 4/2003 | Fraenkel |
| 2003/0079160 | A1 | 4/2003 | McGee |
| 2003/0158895 | A1 | 8/2003 | Mehra |
| 2003/0191989 | A1 | 10/2003 | O'Sullivan |
| 2004/0003375 | A1 | 1/2004 | George |
| 2004/0068560 | A1 | 4/2004 | Oulu |
| 2004/0075690 | A1 | 4/2004 | Cirne |
| 2004/0078691 | A1 | 4/2004 | Cirne |
| 2004/0122942 | A1 * | 6/2004 | Green et al. ............... 709/224 |
| 2004/0123279 | A1 | 6/2004 | Boykin |
| 2004/0172466 | A1 * | 9/2004 | Douglas et al. ............. 709/224 |
| 2004/0215762 | A1 | 10/2004 | Oulu |
| 2004/0215768 | A1 | 10/2004 | Oulu |
| 2004/0254920 | A1 | 12/2004 | Brill |
| 2005/0021748 | A1 | 1/2005 | Garcea |
| 2005/0039187 | A1 | 2/2005 | Avakian |
| 2005/0055437 | A1 | 3/2005 | Burckart |
| 2005/0114508 | A1 | 5/2005 | DeStefano |
| 2005/0188221 | A1 * | 8/2005 | Motsinger et al. ........... 713/201 |
| 2005/0216585 | A1 * | 9/2005 | Todorova et al. ............. 709/224 |
| 2005/0228890 | A1 | 10/2005 | Lawrence |
| 2005/0229165 | A1 | 10/2005 | Ma |
| 2006/0095569 | A1 | 5/2006 | O'Sullivan |
| 2006/0095570 | A1 | 5/2006 | O'Sullivan |
| 2006/0106866 | A1 * | 5/2006 | Green et al. ............. 707/104.1 |
| 2006/0107255 | A1 * | 5/2006 | Chagoly et al. ............. 717/127 |
| 2006/0184667 | A1 * | 8/2006 | Clubb et al. ................ 709/224 |
| 2006/0218143 | A1 | 9/2006 | Najork |

OTHER PUBLICATIONS

U.S. Appl. No. 11/304,153, filed Dec. 15, 2005, "Execution Flow Shape Compression for Aggregate Data Reporting in an Application Manager," by Vanrenen et al.

"Using the WorkArea Facility," Version 4.0, WebSphere Application Server, IBM Corp., Mar. 2001.

Sodhi, et al. "Skeleton Based Performance Prediction on Shared Networks," CCGRID 2004: The IEEE International Symposium on Cluster Computing and the Grid, Apr. 2004, Chicago, IL.

"JSR 149: Work Area Service for J2EE," Sun Microsystems, www.jcp.org/en/jsr/detail?id=149&showPrint, printed Aug. 22, 2005.

Office Action dated Sep. 16, 2009 in U.S. Appl. No. 11/566,454.

* cited by examiner

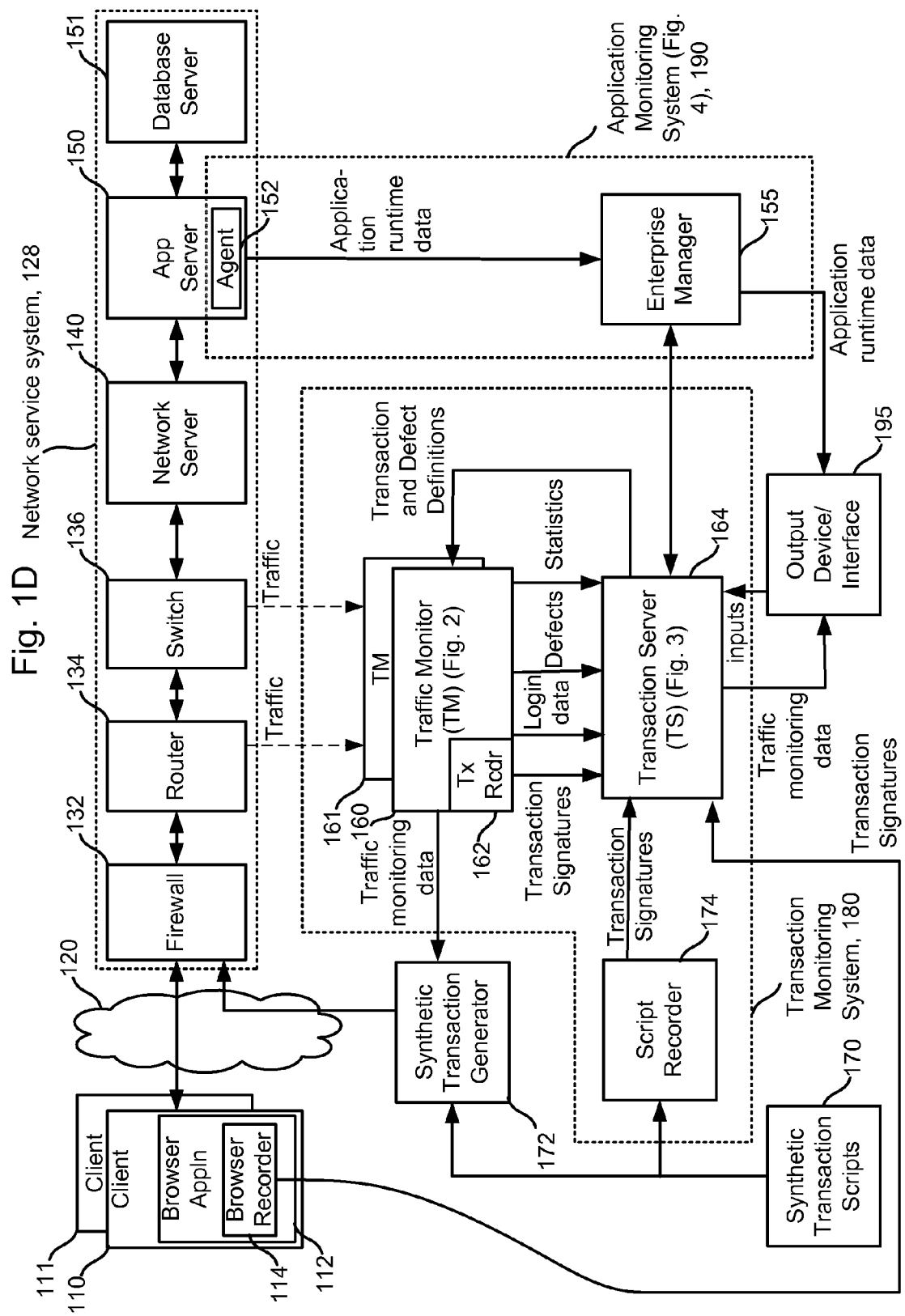
Fig. 1D  Network service system, 128

Fig. 29

Traffic monitoring system incident report list

| | | | | | | | | | | Help | About |

Setup  Administration  Tools  CEM

Business Impact  Performance  Quality  Summary  Analysis

Incidents | Impact Maps | Impact Leaders | Defects

[Close]  Status: [Open ▼]  Business Process: [All ▼]  [Generate]

Open Incidents for All Business Processes

170 Defects in 4 Incidents.  0 Critical ▮▮▮  2 Severe ▮▮▮  2 Moderate ..

| ☐ | IID (click for detail) | Status | Impact Level | Business Impact | Business Process | Business Transaction | Identified Users | User Groups | Defects | Defect Type | First Occurred | Last Occurred | Duration (hh:mm) |
|---|---|---|---|---|---|---|---|---|---|---|---|---|---|
| ☐ | 001334 | Open | Moderate | 3,264 | CE|Buy Book | Add To Cart | 0 | 0 | 51 | Slow Time | 7-Apr-2006 11:17 | 7-Apr-2006 15:32 | 04:15 |
| ☐ | 001335 | Open | Moderate | 3,264 | CE|Buy Book | Shop | 0 | 0 | 34 | Slow Time | 7-Apr-2006 11:17 | 7-Apr-2006 15:32 | 04:15 |
| ☐ | 001332 | Open | Severe | 2,176 | CE|Track Order | Enter order id | 0 | 0 | 20 | Slow Time | 7-Apr-2006 10:45 | 7-Apr-2006 15:35 | 04:50 |
| ☐ | 001333 | Open | Severe | 2,176 | CE|Search Books | Enter title | 0 | 0 | 65 | Slow Time | 7-Apr-2006 10:45 | 7-Apr-2006 15:35 | 04:50 |

4 items found. Displaying all items

Fig. 30

Traffic monitoring system incident detail

Setup  Administration  Tools  CEM  Help

Business Impact | Performance | Quality | Summary | Analysis

Incident: 001334
Business Process: CE|Buy Book    Business Transaction: Add To Cart    Defect Type: Slow Time  ← 3005
Closed on: 7-Apr-2006 15:41
Closed by:
Cause:
Resolution:
    Close Incident

| Impact | | Details | | Problem Resolution Cycle | |
|---|---|---|---|---|---|
| Business Impact: | ⫴ 3,264  (Severe) | Status: | Open | Identification Time: | 04:10 (hh:m) |
| Defects: | 51 | First Defect Time: | 7-Apr-2006 11:17 | Resolution Time: | 03:05 |
| Identified Affected Users: | 0 Users in 0 User Groups | Incident Trigger Time: | 7-Apr-2006 15:27 | Verification Time: | 03:09 |
| Moderate Evidence Collected: | No | | | Total Time: | 04:24 |
| Severe Evidence Collected: | No | Last Defect Time: | 7-Apr-2006 15:32 | | |
| Critical Evidence Collected: | No | Incident Close Time: | n/a | | |
| Application Runtime Data: | View | Duration: | 04:15 (hh:mm) | | |

3015 → (points to Impact column)
3010 → (points to View link)
3000 (whole window)

Fig. 33

Traffic monitoring system defect report list

Setup  Administration  Tools  CEM  Help  About

Business Impact  Performance  Quality  Summary  Analysis

Incidents  Impact Maps  Impact Leaders  Defects

View: Customer Experience View ▼

Defect List

| Date and Time (click for detail) | Business Process | Business Transaction | Defect Type | Limit | Value | Business Impact | Login Name | User Group | Client IP Address | Web Server IP Address | Web Server MAC Address |
|---|---|---|---|---|---|---|---|---|---|---|---|
| 7-Apr-2006 15:32:39 | CE\|Buy Book | Login | Slow Time | 0.001s | 0.016s | 64 (4 - 4 - 4) | Unspecified | Unspecified Users | 172.27.2.204 | 172.27.8.96 | 00:11:25 3E:21:04 |
| 7-Apr-2006 15:32:38 | CE\|Track Order | Link to shipper | Slow Time | 0.001s | 0.014s | 64 (4 - 4 - 4) | Unspecified | Unspecified Users | 172.27.2.204 | 172.27.8.96 | 00:11:25 3E:21:04 |
| 7-Apr-2006 15:32:37 | CE\|Track Order | Enter order id | Slow Time | 0.001s | 0.013s | 64 (4 - 4 - 4) | Unspecified | Unspecified Users | 172.27.2.204 | 172.27.0.96 | 00:11:25 0C:21:04 |
| 7-Apr-2006 15:32:36 | CE\|Buy Book | Checkout | Slow Time | 0.001s | 0.013s | 64 (4 - 4 - 4) | Unspecified | Unspecified Users | 172.27.2.204 | 172.27.8.96 | 00:11:25 3E:21:04 |

3300

3310 ized U.S. patent application Ser. No. 11/566,454, filed Dec. 4, 2006, published as US2007/0266149 on Nov. 15, 2007, titled "Integrating Traffic Monitoring Data And Application Runtime Data", co-pending, commonly-assigned U.S. patent application Ser No. 11/612,058, filed Dec. 18, 2006, published as US2008/0148039 on Jun. 19, 2008, titled "Selecting Instrumentation Points For An Application", and co-pending, commonly-assigned U.S. patent application Ser No. 11/612,063, filed Dec. 18, 2006, published as US2008/0148242 on Jun. 19, 2008, titled "Optimizing An Interaction Model For An Application", each of which is incorporated herein by reference.

HIERARCHY FOR CHARACTERIZING INTERACTIONS WITH AN APPLICATION

CROSS-REFERENCE TO RELATED APPLICATIONS

This application claims the benefit of commonly assigned U.S. provisional patent application No. 60/799,607, filed May 11, 2006, titled "Traffic and Infrastructure Monitoring System".

This application is related to co-pending, commonly-assigned U.S. patent application Ser. No. 11/566,454, filed Dec. 4, 2006, published as US2007/0266149 on Nov. 15, 2007, titled "Integrating Traffic Monitoring Data And Application Runtime Data", co-pending, commonly-assigned U.S. patent application Ser No. 11/612,058, filed Dec. 18, 2006, published as US2008/0148039 on Jun. 19, 2008, titled "Selecting Instrumentation Points For An Application", and co-pending, commonly-assigned U.S. patent application Ser No. 11/612,063, filed Dec. 18, 2006, published as US2008/0148242 on Jun. 19, 2008, titled "Optimizing An Interaction Model For An Application", each of which is incorporated herein by reference.

BACKGROUND OF THE INVENTION

Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that the applications perform as expected. To this end, various application management techniques have been developed.

One approach involves monitoring the infrastructure of the application by collecting application runtime data regarding the individual software components that are invoked in the application. This approach can use agents that essentially live in the system being monitored. For example, an execution flow, e.g., thread or process, can be traced to identify each component that is invoked as well as obtain runtime data such as the execution time of each component. Tracing refers to obtaining a detailed record, or trace, of the steps a computer program executes. One type of trace is a stack trace. Traces can be used as an aid in debugging. While such component level data is useful for diagnostics, it does not directly measure the impact of application on the users, and typically can only be understood by programmers or other specialists.

Another approach involves monitoring traffic which is sent between a client and an application, for instance, such as requests and corresponding responses. This approach can be used to obtain information such as response times which characterizes a client's interaction with the application. However, detailed information regarding the execution of the application cannot be obtained in this way.

SUMMARY OF THE INVENTION

A method and system are provided for presenting application runtime data and traffic monitoring data in an accessible manner, e.g., to enhance capacity planning, understanding of resource usage, and troubleshooting capabilities.

In one embodiment, a computer-implemented method for providing information regarding an application includes generating application runtime data based on execution of an application, where the execution is responsive to at least one client interacting with the application. The method further includes classifying the application runtime data according to a hierarchy.

In another embodiment, a computer-implemented method for providing information regarding an application includes generating traffic monitoring data based on traffic between at least one client and an application as the at least one client is interacting with the application and classifying the traffic monitoring data according to a hierarchy.

In either case, the hierarchy can include different levels which characterize the interacting from a perspective of the at least one client with different degrees of breadth. An output such as an interface display is provided using the classified application performance data and/or traffic monitoring data.

The hierarchy can include a domain level, a business process level (where a domain is made up of a number of business processes), a business transaction level (where a business process is made up of a number of business transactions), a transaction level (where a business transaction is made up of a number of transactions), and a transaction component level (where a transaction is made up of a number of transaction components). In one example, the hierarchy identifies components of a web page at one level, a web page at a next higher level, a business transaction associated with a set of web pages at a next higher level, and a business process associated with a group of business transactions at a next higher level.

Further, the application runtime data and traffic monitoring data can be classified using a common, shared hierarchy or using respective different hierarchies.

Corresponding apparatuses and processor readable storage devices are also provided.

BRIEF DESCRIPTION OF THE DRAWINGS

FIG. 1D is a block diagram of an embodiment of a system for monitoring a network service.

FIG. 29 is an example interface display which depicts an incident report list of a traffic monitoring system.

FIG. 30 is an example interface display which depicts details of an incident on the incident report list of FIG. 29, in addition to a link to application runtime data (FIG. 31A).

FIG. 33 is an example interface display which depicts a defect report list of a traffic monitoring system.

DETAILED DESCRIPTION

Figure 1A:
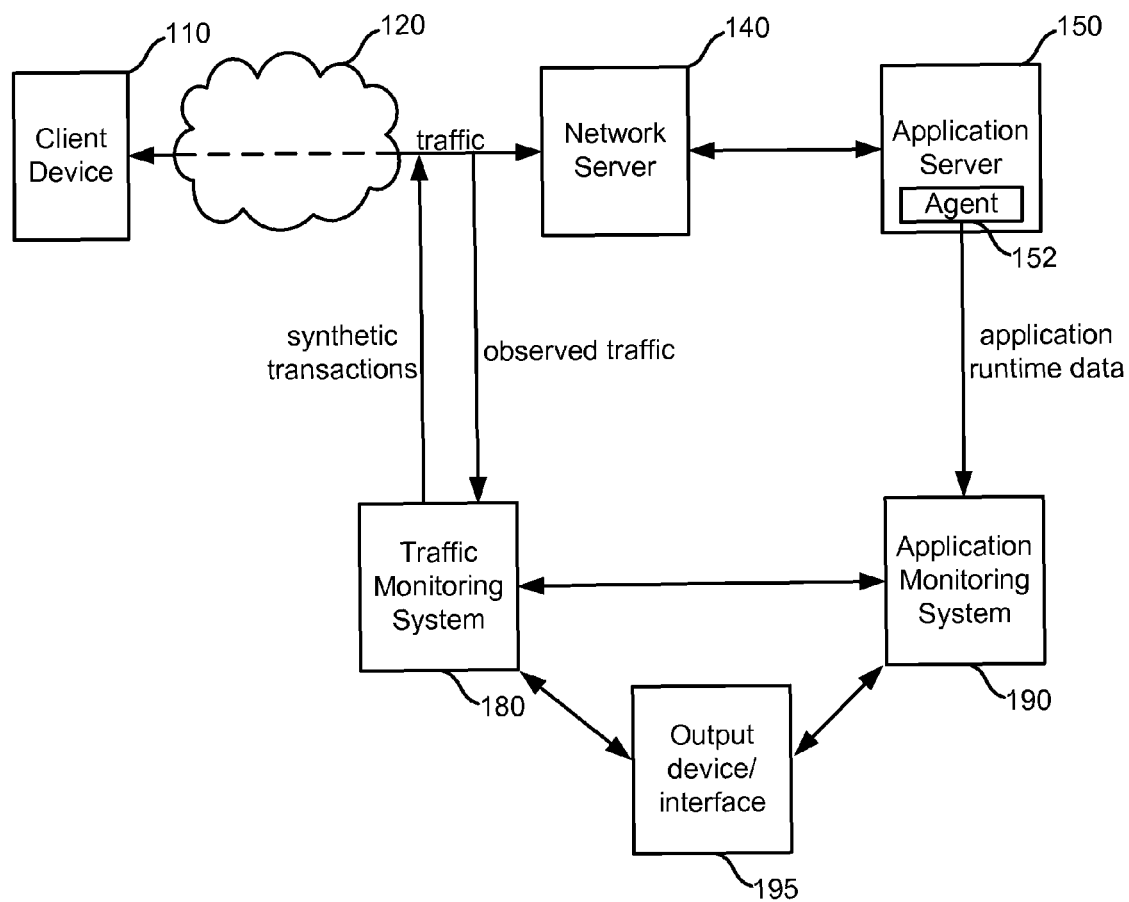
FIG. 1A is a block diagram of an embodiment of a network monitoring system which monitors a network service.

A method and system are provided for presenting information from application and traffic monitoring systems in an accessible manner. The method and system can be understood in the context of network service monitoring, integrated display of traffic monitoring data and application runtime data, a hierarchy for characterizing interactions with an application and example interface displays, discussed below.

Network Service Monitoring

The present technology may be implemented at least in part by a network service monitoring system that monitors a network service such as a web service, though other network services may be monitored as well. Generally, a network service can be provided over the Internet, an intranet, an extranet, a private network or other network or networks and is not limited to network services which are provided via the World Wide Web. Although some examples discussed below reference a web service, the technology discussed herein applies generally to other services that are connected to or in communication with a network or other means of communication.

The network service monitoring system may include multiple monitoring systems such as, in one embodiment, a traffic monitoring system and an application monitoring system. The traffic monitoring system may observe network traffic sent and received by a network service, may have a variety of architectures and may monitor traffic provided according to any type of network protocol. The observed traffic may be processed as discussed in more detail below to provide traffic monitoring data. An example network monitoring system is discussed below in connection with FIG. 1A. Logical operation of a traffic monitoring system is discussed below with respect to FIG. 1B.

The application monitoring system may monitor the execution of one or more applications of the network service. For example, the application monitoring system may monitor the performance of one or more applications and/or application components and generate corresponding application runtime data which identifies, e.g., components which are invoked in one or more execution paths such as threads and/or processes of the application. For example, the components can include servlets, Java Server Pages, Enterprise Java Beans Java Database Connectivity components and/or Microsoft .NET components. The application runtime data can provide a transaction trace, for example, which indicates the time intervals in which the components were invoked. Logical operation of an application monitoring system is discussed in more detail below with respect to FIG. 1C.

Processing observed traffic and application runtime data may include associating the two types of data so that related traffic monitoring data and application runtime data can be correlated and selectively accessed. In this way, an operator can quickly navigate through the data to obtain relevant information, such as information for diagnosing an anomalous condition.

Thus, an operator may obtain information regarding network service performance "from the outside" by viewing the observed traffic (e.g., from the perspective of a client interacting with the network service) as well as "from the inside" (e.g., from the perspective of the execution of components of the application). By viewing a network service from the inside and outside, the operator has more information from which to monitor, manage and diagnose the performance and health of a network service.

For example, the traffic monitoring data can characterize a user's interaction with an application from the user's perspective, that is, by answering the question: "What is the impact of the application on the user?" The application runtime data can characterize the application from a perspective of individual software components that are invoked in the application. Such component level data allows a programmer or other specialists to diagnose a problem and implement a fix, e.g., by patching or otherwise revising the application, repairing or replacing hardware, reallocating resources, etc. The traffic monitoring data and application runtime data can also be used separately, in a non-integrated manner. Generally, the application runtime data focuses on diagnosis of a problem, e.g., finding the root cause of a problem, while the traffic monitoring data focuses on user impact.

Further, traffic monitoring data and application runtime data can be classified according to one or more hierarchies which characterize client interactions with an application. For instance, a hierarchy may characterize the interactions according to a business model for an e-commerce application. This allows the traffic monitoring data and application runtime data to be presented in a user-friendly manner which is tailored to the needs of a particular organization and individuals in the organization.

FIG. 1A is a block diagram of an embodiment of a network monitoring system which monitors a network service. The network service includes an example network server 140 and an example application server 150. In practice, any number of servers or other computing devices which are connected in any configuration can be used. Network server 140 sends traffic to and receives traffic from an example client device 110 over a network 120, such as the Internet or other WAN, a LAN, intranet, extranet, private network or other network or networks. In practice, a number of client devices can communicate with the network server 140.

Application server 150 may be in communication with network server 140. In particular, when network server 140 receives a request from client device 110, network server 140 may relay the request to application server 150 for processing. The client device 110 can be a laptop, PC, workstation, cell phone, PDA, or other computing device which is operated by an end user. Or, the client device can be an automated computing device such a server. Application server 150 processes the request received from the network server 140 and sends a corresponding response to the client device 110 via the network server 140.

The network monitoring system also includes traffic monitoring system 180 and an application monitoring system 190. In one possible approach, the application monitoring system uses one or more agents, such as agent 152, which is considered part of the application monitoring system 190, though it is illustrated as a separate block in FIG. 1A. Traffic monitoring system 180 observes traffic sent between client device 110 and network server 140, including requests sent from client device 110 and corresponding responses received by the client device 110. Agent 152 and application monitoring system 190 monitor the execution of one or more applications at the application server 150, generate application runtime data, which represents the execution of components of the application responsive to the requests, and process the generated application runtime data. In some embodiments, application monitoring system 190 may be used to monitor the execution of an application or other code at some other server, such as network server 140. An output device/interface 195 may communicate with the traffic monitoring system 180 and the application monitoring system 190 for presenting reports and other data to an operator and for receiving inputs from the operator. The traffic monitoring system 180 and the application monitoring system 190 may have independent interfaces or may share a common interface.

Figure 1B:
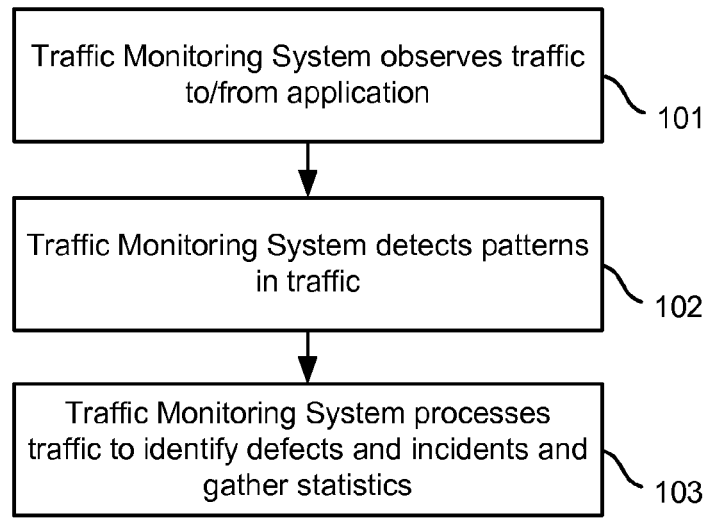
FIG. 1B illustrates a flowchart of an embodiment of a process by which a traffic monitoring system monitors traffic.

FIG. 1B illustrates a flowchart of an embodiment of a process by which traffic monitoring system 180 of FIG. 1A monitors traffic. Note that in this and the other flowcharts provided, the steps indicated are not necessarily performed one at a time in the order indicated, but may occur simultaneously, at least in part, and/or in another order. Traffic sent to and from an application, such as traffic sent between client device 110 and web server 140 over network 120, for instance, is observed by traffic monitoring system 180 at step 101. The observation can involve passively copying the traffic at some intermediate point between the client and the application via a tap or mirror port, for instance, or intercepting the traffic, copying the intercepted traffic and relaying the intercepted traffic it to its intended destination.

At step 102, the traffic monitoring system 180 detects patterns in the traffic and may use this information to group traffic into an object hierarchy. For example, this can involve recognizing application requests and responses, relating or binding corresponding request-response pairs into transaction components (for example an HTML file or an image file), binding transaction components into transactions (for example a web page with an HTML file and zero or more image files), binding transactions into user-specific tasks that may be called business transactions (for example an application's login business transaction may retrieves one or more web pages). Similarly, business transactions can be bound to a business process, and business processes can be bound to a domain. The domain, business processes, business transactions, transactions and transaction components may be part of one or more hierarchies which are defined for classifying the observed traffic. A business process includes one or more business transactions, and a domain includes one or more business processes.

Also, a transaction component may itself be a transaction and require no component-to-transaction binding, for example, where a web page transaction contains no additional components, or where additional components exist but are not defined as part of the transaction. Binding may be accomplished through a simple table lookup, where a list of transaction components is related to a transaction, for example. Another example of a binding mechanism may be through such a list used with a session identifier, where only transactions or transaction components sharing a common session identifier may be bound together. Further related information can be found in U.S. patent app. publication no. 2003/0191989 to P. O'Sullivan, published Oct. 9, 2003, titled "Methods, systems and computer program products for triggered data collection and correlation of status and/or state in distributed data processing systems," and incorporated herein by reference.

Transactions can be detected based on transaction definitions which specify the existence or non-existence or combination thereof of a set of name/value pairs, e.g., parameters, which are found in the traffic. For example, parameter specification may include a matching type, a parameter type (e.g., URL, cookie, post, or query, or session), a name pattern, and a value pattern. URL parameters include name/value pairs that appear in the HTTP request line before the first "?" character or in special request headers such as the Host: request header. Cookie parameters include name/value pairs that appear in the Cookie: request header. Post parameters include name/value pairs that appear in the HTTP POST request-body. Query parameters include name/value pairs that appear in the HTTP request line after the first "?" character. Session managers, such as the eTrust® SiteMinder available from CA, Inc., Islandia, N.Y. uses a cookie parameter to hold an encoded or encrypted value, which in turn holds session specific name/value pairs. Session parameters include name/value pairs that appear in such an encoded or encrypted value. Name and value specifications may specify an exact value for exact matching or a pattern for pattern matching. Any form of pattern matching may be used, from simple wild-card pattern matching to more complex regular expression pattern matching.

In particular, an operator can define a hierarchy for organizing the traffic monitoring data which is obtained by the traffic monitoring system, e.g., through an interface or other means. For example, an operator may use an interface to generate the hierarchy from a set of parameters obtained from the observed traffic. The parameters can be designated as belonging to one or more levels of the hierarchy as discussed in more detail below with respect to FIG. 3 and FIG. 10B. In this manner, traffic monitoring data can be accessed according to the classification provided by the hierarchy to facilitate diagnosis of anomalies and understanding of application and network performance.

At step 103, the traffic monitoring system processes the traffic to identify defects and incidents and gather statistics. A defect generally indicates an anomalous condition of a request-response pair. Moreover, an incident can be set when one or more related defects are set. An incident may be a cause for concern which should be analyzed further. The one or more defects of an incident can be associated when they are caused by the same factors, for instance. For example, an incident may be associated with a group of one or more defects having the same defect type, or affecting the same business transaction or group of users. In some cases, a defect such as a slow response to a request may not be sufficient to set an incident, but a specified number of such defects may be sufficient. In other cases, a single occurrence of a type of defect may be sufficient to set an incident.

In one approach, defects can be detected by evaluating a request-response pair against defect criteria which may specify transaction types, a range of acceptable response times, and/or other parameters, for instance. For example, when the defect criteria specifies a range of acceptable response times within which a response may be received after a request is sent, the request-response pair is defective if the response time falls outside the specified range. Similarly, when the defect criteria specify a range of unacceptable response times, the request-response pair is defective if the response time falls within the specified range. Moreover, defect criteria can be specified for transaction components, transactions and/or business transactions.

Furthermore, defect data and statistics can be aggregated for a number of request-response pairs and classified according to the hierarchy. The aggregated statistics and defects can then be processed to enable other functionality of the present technology and stored for access by an operator through an interface or other appropriate output.

Figure 1C:
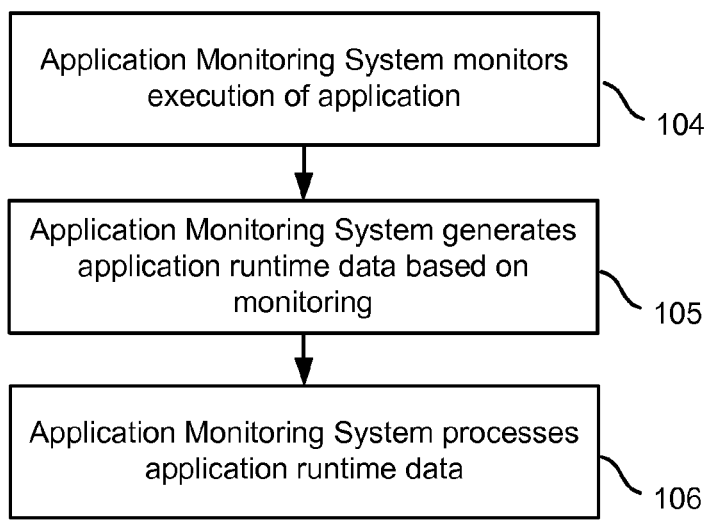
FIG. 1C illustrates a flowchart of an embodiment of a process by which an application monitoring system monitors an application.

FIG. 1C illustrates a flowchart of an embodiment of a process by which the application monitoring system 190 of FIG. 1A monitors an application. An application is monitored by application monitoring system 190 at step 104. Monitoring may involve agent 152 determining which components of application server 150 are invoked and the duration in which they are invoked when the application processes a client request, as discussed in more detail below with respect to FIG. 4 and FIG. 11.

Application runtime data based on the monitoring of the application is generated at step 105. The generated application runtime data can indicate the application components involved in processing a request, the duration that each component consumed in processing a request, and other information. The application runtime data can be generated by agent 152, in one possible approach, after which the agent 152 may forward the generated application runtime data to application monitoring system 190, which can exist outside of application server 150, in one embodiment. Generating and reporting application runtime data is discussed in more detail below with respect to FIG. 4 and FIG. 11.

The application runtime data is processed by application monitoring system 190 at step 106 such as by aggregating the data, storing the data, and providing the data to an operator through an interface or other output.

Further, traffic monitoring system 180 and application monitoring system 190 may communicate with each other to enable association of the traffic monitoring data and application runtime data. The association allows an operator to access information which characterizes the network service from the "outside" via the traffic monitoring data and from the "inside" of the network service via the application runtime data. This provides the operator with a powerful insight into how a network service processes requests (the inside perspective) and the effect of the network service on a customer or other user or network component (the outside perspective).

In some embodiments, the traffic and application monitoring systems may be used together, e.g., integrated, to provide diagnostics, statistics and other data regarding the operation of a web service, network system or other system. The integrated data may be analyzed by an operator or administrator, viewed in reports, and processed to identify system health, performance or other issues of concern, for instance.

In one embodiment, integrating the data allows business information associated with a number of web service requests and corresponding responses to be associated with application runtime data. For example, consider a number of requests received daily by a web service of a bank to open new user accounts. The integrated traffic monitoring and application runtime data may provide aggregated information regarding the content of the requests and responses and timing information (e.g., response times) for the transactions from the requesting users' point of view, as well as detailed information regarding the execution of the application such as information regarding application components which are invoked and timing information regarding how the requests were processed and the responses were generated. Generally, application runtime data can include information such as average method execution time, a method invocation rate per second or per interval, a count of method invocations, a concurrency metric indicating number of method invocations that have started but not finished per interval, and a stalled metric indicating a number of method invocations that have started whose method invocation times have exceeded a specific threshold per interval. Further, application runtime data can identify a garbage collection heap size, a bandwidth metric indicating file and socket activity, a number of threads, system logs, exceptions, memory leaks and component interactions. The traffic monitoring data and application runtime data can be aggregated over many requests and responses to obtain valuable trend information without the need to save data for each specific request and response. However, traffic monitoring data and application runtime data for a specific request and response can be saved, e.g., if an anomalous condition is detected, to allow a detailed analysis of a specific request-response pair on an as-needed basis. The integrated data may be accessed through the traffic monitoring system, the application monitoring system or some other system, and/or provided to another system, device or program code for further processing.

Below, an architecture for a traffic monitoring system and application monitoring system is discussed generally and then in more detail with respect to FIGS. 1D-5. Operation of the monitoring systems is discussed with respect to FIGS. 6-11. Exemplary methods of integrating traffic monitoring data and application runtime data are discussed with respect to FIGS. 12A-13.

FIG. 1D is a block diagram of an embodiment of a system for monitoring a network service. A network service system 128, traffic monitoring system 180, and application monitoring system 190 are provided. The network service system 128 includes firewall 132, router 134, switch 136, network server 140, application server 150 and database server 151. Client 110 may send requests to and receive responses from the network service system over one or more networks such as network 120. Traffic monitoring system 180 collects data regarding network service system traffic and application monitoring system 190 collects data regarding execution of the application at the application server 150.

In the embodiment illustrated, client 110 includes browser application 112, which may be implemented, e.g., as a web browser or other network browser. In some embodiments, browser application 112 may include browser recorder 114 which records browser requests, headers and content data received from network server 140, translates the browser content data into transaction signatures, and transmits the signatures to transaction server 164. Transactions signatures and recorders are discussed in more detail below. In some embodiments, more than one client, as illustrated by additional client 111, may communicate with network server 140 to send traffic to and receive traffic from network server 140. In some embodiments, a client can be a server computer or other computer. In this case, requests need not originate from a browser or as a result of human interaction. In any case, the recorder 114 can record requests, headers and content for the client device.

Traffic sent over network 120 from client 110 may pass through firewall 132, router 134 and switch 136 before reaching network server 140, in one possible network topology. In practice, more complex or less complex topologies may be used. Firewall 132 may be implemented as a set of one or more related programs located on a network gateway server that protects the resources of the servers and devices inside a private network. Incoming traffic received by firewall 132 can be analyzed to determine if it is safe before it is sent toward network server 140.

Router 134 may be implemented as a device or software within a device and can be connected to more than one other device. Router 134 determines the next network point or device to which an information packet should be forwarded based on its understanding of the state of the network or networks to which it is connected. Switch 136 channels incoming data from any of multiple input ports to the specific output port that will take the data towards its intended destination, e.g., based on an Internet Protocol or IP address in each received packet.

Traffic sent by client 110 is received by network server 140 and may be processed by network server 140. Network server 140 may optionally send requests to one or more other servers to process the received traffic, such as application server 150, database server 151 or other backend servers (not illustrated in FIG. 1D). In response to a request received from browser application 112, network server 140 provides a response with web page content, for instance, to browser application 1 12. Network server 140 is in communication with client 110 (through devices 132-136) and with application server 150. Application server 150, which can include one or more application programs that provide business logic, for instance, is in communication with network server 140 and database server 151. Database server 151 is in communication with application server 150 and stores network service system information and other information for responding to client requests. The stored information is configured to be accessed, managed and updated by application server 150 and other devices and/or programs.

The network service system processes a request received from client 110 such as by sending the request to application server 150 which, in turn, generates a response and provides it to network server 140. In some cases, application server 150 may access database server 151 or some other backend server to process the request. Network server 140 transmits the response to the client 110 through switch 136, router 134, firewall 132 and network 120.

Traffic monitoring system 180 may monitor the traffic associated with the request and corresponding response at any desired location such as between client 110 and network server 140. Traffic monitoring system 180 includes traffic monitor (TM) 160, transaction server (TS) 164, script recorder 174, and browser recorder 114. In some embodiments, there may be more than one traffic monitor, as illustrated by additional traffic monitor 161. In one approach, each traffic monitor can monitor a different server, such as a web server or application server. Moreover, the monitoring duties may be divided among multiple monitors according to different ranges of network addresses. One or more traffic monitors may report information to transaction server 164. Thus, one transaction server may receive information from more than one traffic monitor, in one approach.

Traffic monitor 160 observes the traffic and can perform tasks such as determining whether portions of the traffic qualify as a defect, identifying user information in a transaction, and generating defects and statistics information. Traffic monitor 160 may observe the traffic at router 134, e.g., through a passive tap, at switch 136, e.g., via a mirror port, or some other point in the route traversed by the traffic. Traffic monitor 160 is described in more detail below with respect to FIG. 2.

Transaction server 164 receives login data, statistics and defects information from traffic monitor 160, receives transaction signatures from one or more recorders, generates transaction and defect definitions, provides the definitions to traffic monitor 160, and provides traffic monitoring data to an operator regarding the observed traffic. Transaction signatures provide information for transactions monitored by a particular recorder and are used by transaction server 164 to generate transaction definitions and defect definitions. Transaction server 164 provides the definitions to traffic monitor 160 for use in detecting transactions and determining whether they are defective. The transaction data may be provided to an operator through an output device/interface 195 to allow the operator to view reports with traffic monitoring data and application runtime data, generate and modify transaction and defect definitions, and perform other tasks. Transaction server 164 is discussed in more detail below with respect to FIG. 3.

The transaction signatures received by transaction server 164 can be sent by one or more transaction recorders. A transaction signature is a set of data that describes a particular transaction. In one embodiment, a transaction includes one or more request-response pairs. For example, a transaction may include a request by a client browser application for a login page from a web service system, and the corresponding response from the system that includes the login page content to be rendered by the client browser. The transaction signature that describes the transaction may include the request header data, request body data, the user data contained in the request, a request identifier, the source of the request, the recipient of the request, and corresponding information in the response (e.g., header, body, source of response, intended recipient).

An operator may use an interface to generate transaction definitions from transaction signatures, e.g., by viewing transaction signature data through the interface, modify the transaction signature data if desired, and selecting or "promoting" the transaction signature data to a transaction definition. The transaction definition may then be used to identify valid transactions in subsequently observed traffic. For example, assume a user "Bob" is logging on to a corporate intranet site to submit a form to the human resources department. Transaction definitions can be set which identify Bob's login transaction and the form submission transaction as two distinct transactions. Moreover, the promotion can also remove "Bob" as a specific user. Generating transaction definitions from transaction signatures is discussed in more detail below.

One or more recorder can be used to provide the transaction signatures by capturing transaction data (for example, a request observed at a client which generated the request or observed in network server system traffic), translating the transaction data into transaction signatures, and transmitting the signatures to transaction server 164. For example, a client request can be translated into a transaction signature by extracting identification parameters such as HTTP parameters (name/value pairs) from the request. Moreover, different types of recorders can be used, such as comprehensive recorders, standard recorders, and script recorders. A comprehensive recorder may be implemented on any machine, such as an administrator console or a machine which performs live transactions. For example, the transaction recorder (Tx Rcdr) 162 which is provided as part of the traffic monitor 160 may be considered to be a comprehensive recorder. A standard recorder may be implemented on the same machine which performs live transactions (such as within a browser). For example, the browser recorder 114 may be considered to be a standard recorder. Script recorders, such as script recorder 174, use pre-recorded network packet capture files and test script output files to create transaction signatures.

In one embodiment, transaction server 164 receives transaction signatures from browser recorder 114 within browser application 112, script recorder 174, and transaction recorder (Tx Rcdr) 162 within traffic monitor 160. Browser recorder 114 may be a standard recorder or a browser plug-in. The browser plug-in records a web page and page components as they are loaded into browser application 1 12. Browser recorder 114 then translates the page and page components into a transaction signature and transmits the transaction signature to transaction server 164. Transaction recorder 162 records transaction signatures from monitored traffic. Script recorder 174 may receive transaction scripts. A transaction script is a set of script commands that can be executed to perform one or more transactions at a client communicating with a network system. For example, a transaction script may include script commands to request a network service login page, and provide login user information in response to receiving the login page. In some embodiments, each script command may also include parameters and other data to complete each request. For example, a login request may include data for a user name and password. In some embodiments, the transaction scripts may be provided in a log file or some other script file. Script recorder 174 translates the transaction scripts into transaction signatures and transmits the signatures to transaction server 164. One example of a script recorder uses a script generated by "Mercury LoadRunner," software, available from Mercury Interactive Corporation, of Mountain View, Calif.

Transaction server 164 may also communicate and exchange information with Enterprise Manager 155 such as hierarchy information, statistics and defects information and other information, as discussed in more detail below.

Application monitoring system 190 may monitor execution of an application based on the traffic received by the application, generate application runtime data and process the generated data. As discussed above with respect to FIGS. 1A and 1C, application monitoring system 190 may include Enterprise Manager 155 and Agent 152 and is in communication with application server 150 and traffic monitoring system 180. Application monitoring system 190 is discussed in more detail below with respect to FIG. 4.

Output device/interface 195, which may include an on-screen interface, for instance, may receive traffic monitoring data from traffic monitoring system 180 and application runtime data from application monitoring system 190 for access by an operator. The interface 195 also allows the operator to provide inputs to the transaction server 164, e.g., to provide transaction definitions or other configuration settings.

Synthetic transaction generator 172 may generate synthetic transactions for network server 140, e.g., in response to receiving synthetic transaction scripts from synthetic transaction script module 170. The synthetic transaction scripts can also be received by script recorder 174, which records the scripts, translates the scripts into transaction signatures, and forwards the generated transaction signatures to transaction server 164. The synthetic transaction generator 172 may be provided as part of the traffic monitoring system or as a component that works with the traffic monitoring system and/or the application monitoring system. The synthetic transactions may be injected into the traffic received by network server 140. Generating synthetic transactions may begin with observing traffic for a network service, and determining the scope and frequency of the traffic, in particular, the scope of a network functionality tested by the observed traffic as well as the frequency with which the traffic scope is tested. Synthetic transactions may be generated to test network service functionality based on a comparison of actual traffic scope and/or frequency to target scope and/or frequency. For example, if a particular function of an application is not being tested frequently enough by the actual users of the network service, synthetic transactions can be generated to test the function. In some embodiments, the synthetic transactions may also be based on application runtime data which may be processed to determine the scope and frequency with which application components are tested by the observed network traffic.

Figure 2:
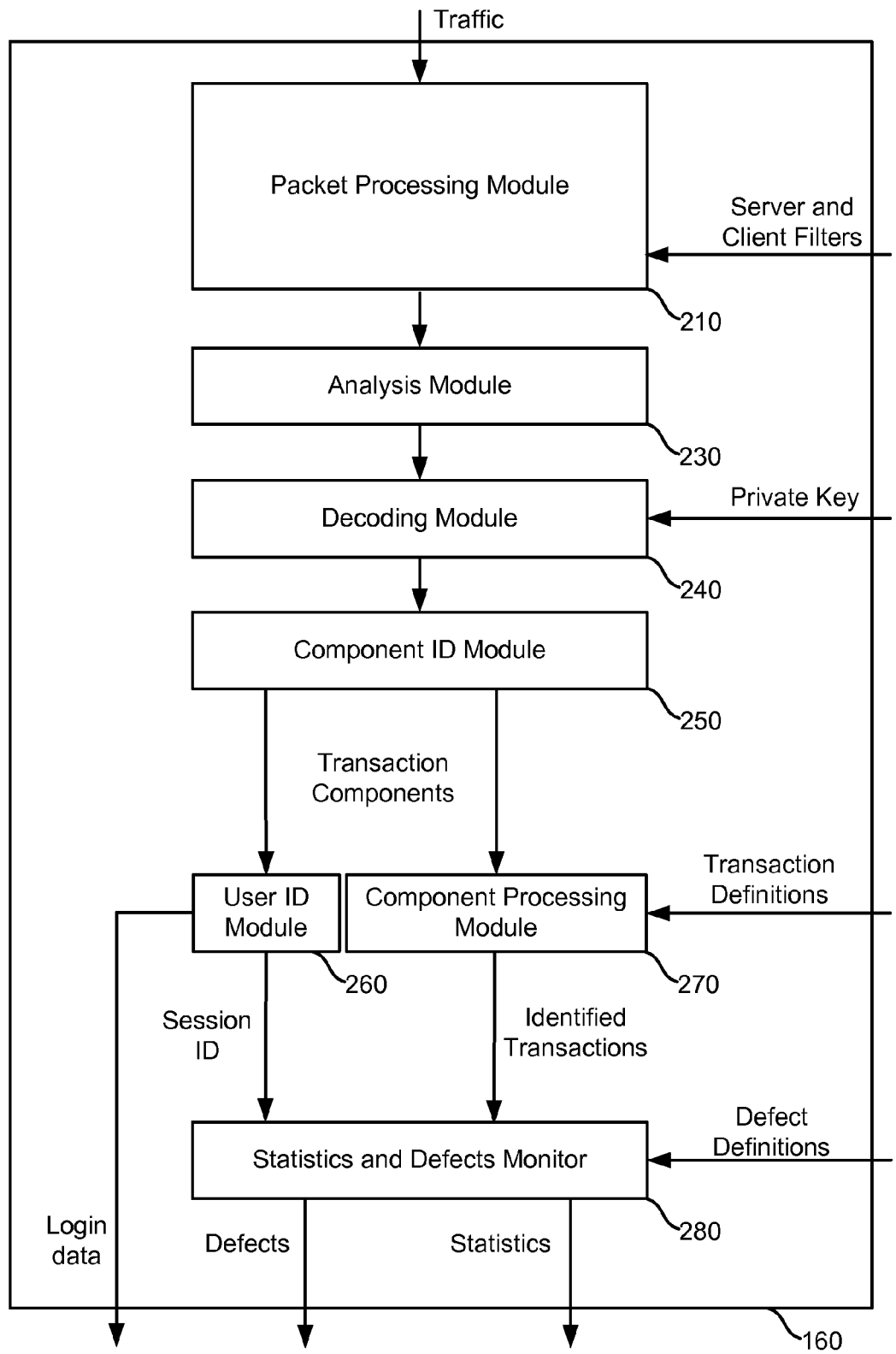
FIG. 2 is a block diagram of an embodiment of a system for processing network traffic.

FIG. 2 is a block diagram of an embodiment of a system for processing observed network traffic. In one embodiment, FIG. 2 provides detail of software modules for implementing the traffic monitor 160 of FIG. 1D. Operation of traffic monitor 160 is also discussed with respect to FIGS. 8 and 9.

As discussed above, traffic monitoring system 180 may be used to observe and process network traffic using any protocol, including but not limited to HTTP and HTTPS. Portions of the discussion below that reference HTTP and/or HTTPS, or any other protocol, are provided for purposes of example and should not be construed to limit application of the present technology.

Traffic monitor 160 includes packet processing module 210, analysis module 230, decoding module 240, component ID module 250, user ID module 260, component processing module 270 and statistics and defects monitor 280. Packet processing module 210 captures and filters traffic packets. In some embodiments, observing traffic may include receiving a copy of the traffic which is received by router 134, switch 136 or some other point in the path of traffic between client 110 and web server 140. In some embodiments, traffic may also be observed at a device existing between network server 140 and application server 150, or between application server 150 and database server 151. The observed traffic may be received as unordered packets of traffic provided according to HTTP, HTTPS or some other format. Packet processing module 210 may also receive one or more server and/or client filters for filtering the captured traffic as discussed in more detail below with respect to FIG. 8.

The analysis module 230 may reconstruct a data stream according to its format, e.g., TCP/IP, from filtered unordered packets received from packet processing module 210. The reconstructed data stream may include requests and responses. For example, request-response pairs can be detected in the data stream. A request-response pair can include a request provided by a client to an application and a corresponding response provided by the application to the client. For instance, the request can be a request for a component of a web page such as an image, a cascaded style sheet, or a JavaScript component.

Decoding module 240 decodes the reconstructed data stream provided by the analysis module when it is an encoded data stream. For example, a data stream may be encoded if it is generated from a stream of packets sent over a secure socket layer connection, e.g., using HTTPS or some other secure protocol. The decoding may be performed using a private key received or otherwise accessed by decoding module 240.

Component ID module 250 receives a reconstructed data stream from analysis module 230 (or decoding module 240 if the stream was encoded), identifies transaction components within the stream such as by identifying name/value pairs and provides the transaction components to a user ID module 260 and a component processing module 270. Further details regarding the component ID module 250 are provided below in connection with FIG. 8.

User identification (ID) module 260 receives the transaction components from component ID module 250 and identifies a session ID and/or user ID from the received components. In some embodiments, a user ID is derived from a login transaction as part of a business transaction. The user identification module 260 then provides the session ID and/or user ID to the statistics and defects monitor 280.

In one approach, a session identifier can be related to one or more transactions. For example, in a web application, the session ID is carried in the observed traffic as a cookie in every packet. The session ID in the packets related to the transaction may be related to the transaction itself. A single session identifier may be bound to one or more transactions. Session attributes, for example, session priority, may also be associated with transactions through this session-to-transaction binding mechanism.

Further, a user identity can be related to transactions. A user ID may be identified and associated with a session by examining and parsing a login transaction for user identity information, for example. In those cases where the login transaction possesses a session identifier, for example, this session ID may be used to establish a relationship between the user ID and the session ID, which may in turn share a relationship with one or more transactions. Another example of user to transaction binding is through the intermediary of a network address, for example where the IP source address of the packets related to the transaction is used to look up user identity in a table of IP address to user identity relationships. User attributes, for example, user priority, user location, user access rights, user organization, and/or user group, among other user attributes may be associated with sessions and/or transactions through this user-to-session binding mechanism and through the user-to-session-to-transaction binding mechanism. User attributes may be retrieved from an external system, for example, by using user identity information to look up user attributes in an X.500 directory, a LDAP directory, and/or a single sign-on system.

Component processing module 270 receives the transaction components from component ID module 250 and processes them to identify associated transactions using transaction definitions received from transaction server 164. A transaction can refer to a series of related network communications that perform a function. For example, the retrieval of a web page may involve one or more transactions. Moreover, a transaction definition may indicate that a particular transaction component is a "primary" component of a particular transaction. In some cases, this can be the first transaction component in a set of transaction components that make up a transaction. The presence of the primary component indicates the presence of the associated transaction. The other transaction components in the definition of a transaction can be considered to be secondary components. For example, if a transaction component within a transaction has a key/value pair indicating an action of "login," then the transaction is a login transaction. The secondary components are also part of the login transaction. The use of primary components to identify transactions can improve efficiency but is not necessary.

The received components are compared to the transaction definitions to identify transactions to be further processed by the traffic monitoring system. Transactions are selected to be processed further if the components conform to one or more of the transaction definitions. In one embodiment, the comparison determines if the received components have a URL which matches a URL in the transaction definitions. The components which match the transaction definitions are combined into transactions and provided to statistics and defects monitor 280 to be processed further. The components that do not match any transaction definitions can be discarded, ignored, identified as "not classified," or otherwise processed.

In addition to identifying transactions based on transaction components, component processing module 270 can identify a business transaction which includes a set of associated transactions. Generally, different logical constructs of a hierarchy can be identified from the transaction components. At higher levels of the hierarchy, a business process which refers to a series of related business transactions, and a domain which refers to a series of related business processes, can be defined using corresponding definitions. A business process can include a set of associated business transactions which have a common session identification, for instance. To illustrate, a business process class for buying a book from an e-commerce web site can be defined. This business process class can include classes of business transactions such as login, shopping, add to cart and checkout. A particular use of the login process, for instance, by a particular user at a particular time represents an example of an instance of the login business transaction. The login business transaction instance may include transaction component instances which provide a user identifier (user ID), a URL for a login page, and a session identifier (session ID). The component processing module provides the identified transactions to the statistics and defects monitor 280.

Further, multiple business process hierarchies may be built on top of a single business transaction/transaction/transaction component hierarchy. Also, users may be part of a user group hierarchy. Users groups may be part of a higher level user group hierarchy. Multiple user group hierarchies may be built on top of the user identification.

Statistics and defects monitor 280 receives session ID data from user ID module 260, identified transactions (transactions that match a transaction definition) from component processing module 270 and defect definitions from transaction server 164. In one embodiment, the defect definitions define criteria for determining whether the behavior of a transaction is acceptable. For example, a defect definition may indicate an acceptable response time for a component, error responses that are allowed or not allowed in response to a request, and other transaction data components required for a transaction. The identified transactions are analyzed based on the defect definitions to generate defects and statistics data. Generally, transactions are defective when they fail to meet quality standards. Moreover, the quality standards may be set for different levels of the hierarchy such as the business transaction, transaction or transaction component levels, for instance. Behavioral defects result from the behavior of a transaction failing to meet specifications. Slow transaction time, fast transaction time, low throughput, and incomplete transactions are examples of different types of behavioral defects. Response defects result from the response of a transaction failing to meet specifications. HTTP response codes (for example, HTTP 500-599 errors), unauthorized access, content analysis defects, and missing response defects are examples of different types of response defects.

The defect data indicates the number of defects found in the identified transactions over time, the type of defect and the number of defect transactions for each particular defect type. The defects may be reported per defective transaction with session identification information. In one embodiment, any identified transactions that conform to the defect definitions are designated as defects. Statistics data may include the number of transactions which occur, the type of transaction (for example, by URL), and other data. The statistics may be reported per hour, per transaction definition, per user and per session identification, for instance. Statistics and defects monitor 280 can report statistics and defect data for the identified transactions to transaction server 164.

Figure 3:
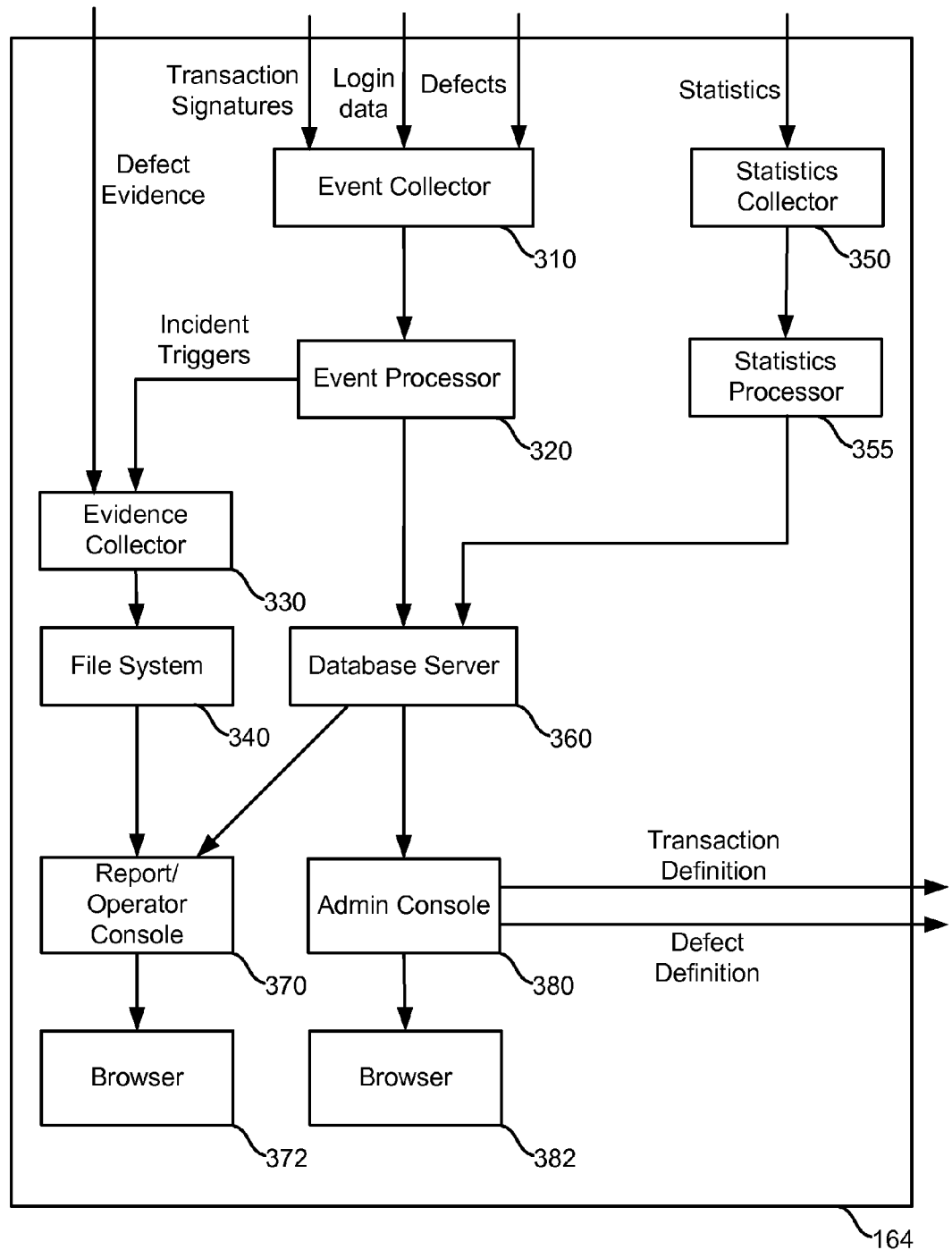
FIG. 3 is a block diagram of an embodiment of a system for receiving traffic information and generating traffic monitoring data.

FIG. 3 is a block diagram of an embodiment of a system for receiving transaction data and generating traffic monitoring data, e.g., transaction statistics, defect data, transaction definitions, and other data. In one embodiment, the system of FIG. 3 provides details regarding software modules for implementing transaction server 164 of FIG. 1D. Operation of transaction server 164 is discussed with respect to FIGS. 10A and 10B. Generally, transaction server 164 enables an operator to generate traffic classification logic, view traffic monitoring data reports, such as defect and incident reports, and provide transaction and defect definitions to traffic monitor 160.

Event collector 310, statistics collector 350, event processor 320, statistics processor 355, evidence collector 330, file system 340, database server 360, report/operator console 370, admin console 380, and browsers 372 and 382 are provided. Event collector 310 receives data including transaction signatures from recorders 114, 162, and 174 (FIG. 1D) and login data and defects from traffic monitor 160 as discussed above with respect to FIG. 2, and translates the received data into a format that can be processed by event processor 320. In one embodiment, event collector 310 generates objects, such as Java objects, from the received data and provides the objects to event processor 320. Event processor 320 processes the objects to provide database data to be stored at database server 360. In some embodiments, database server 360 may be implemented as an SQL database server. In one possible approach, the Java Database Connectivity (JDBC) API can be used for this purpose. JDBC enables Java programs to execute SQL statements to allow Java programs to interact with an SQL-compliant database.

Similarly, statistics collector 350 receives statistics data from traffic monitor 160, translates the received data into one or more objects, such as Java objects, and provides the generated objects to statistics processor 355. Statistics processor 355 processes the objects to provide database data to be stored at database server 360, again such as by using JDBC.

Event processor 320 may also generate incident triggers for use by evidence collector 330. An incident can be set when one or more related defects are set. An incident may be a cause for concern which should be analyzed further. An incident trigger is an event that informs evidence collector 330 when to collect evidence associated with defects. The one or more defects of an incident can be associated when they are caused by the same factors, for instance. For example, an incident may be associated with a group of one or more defects having the same defect type, or affecting the same business transaction or group of users. In some cases, a defect such as a slow response to a request may not be sufficient to set an incident, but a specified number of such defects may be sufficient. In other cases, a single occurrence of a type of defect may set an incident. In response to receipt of incident triggers, evidence collector 330 gathers evidence regarding defects and/or incidents and provides the evidence to file system 340. The evidence gathered can be any form of unstructured data collected from various resources (e.g., switches, routers, load balancers, web servers, application servers, database servers, etc.) Evidence collector 330 places gathered evidence into persistent storage. For example, in one possible approach, the evidence is placed in an evidence file (for example, in HTML format) and stored at the file system 340. For example, when a number of "slow transaction" defects trigger the business impact threshold of an incident, an evidence collection trigger can be sent from event processor 320 to evidence collector 330. Evidence collector 330 can execute any executable program, including a script to collect any form of evidence, for example, a script (Unix shell, Python, Perl, etc.) to retrieve a web log from the server performing the slow transaction and execute a Simple Network Management Protocol (SNMP) GET command on a router. The script then appends the content of the web log and the results of the SNMP query into a single evidence file. In some cases, the script may also reformat the content of the evidence file in a format for providing a display in a web browser such as by inserting various HTML tags into the evidence file.

A persistent store such as database server 360 may store transaction data and other data, e.g., based on data received from processors 320 and 355, for access by an operator user through operator console 370 and admin console 380 of transaction server 164. Note that the admin console 380 and the operator console can optionally be provided in the same console. Operator console 370 may be used to access and perform operations on data at the database server 360. Admin console 380 may provide an interface through browser 382 to allow an operator to view reports, define transaction and defect definitions from received transaction signatures and perform other tasks. Defining a transaction definition and defect definition is discussed in more detail below.

Figure 4:
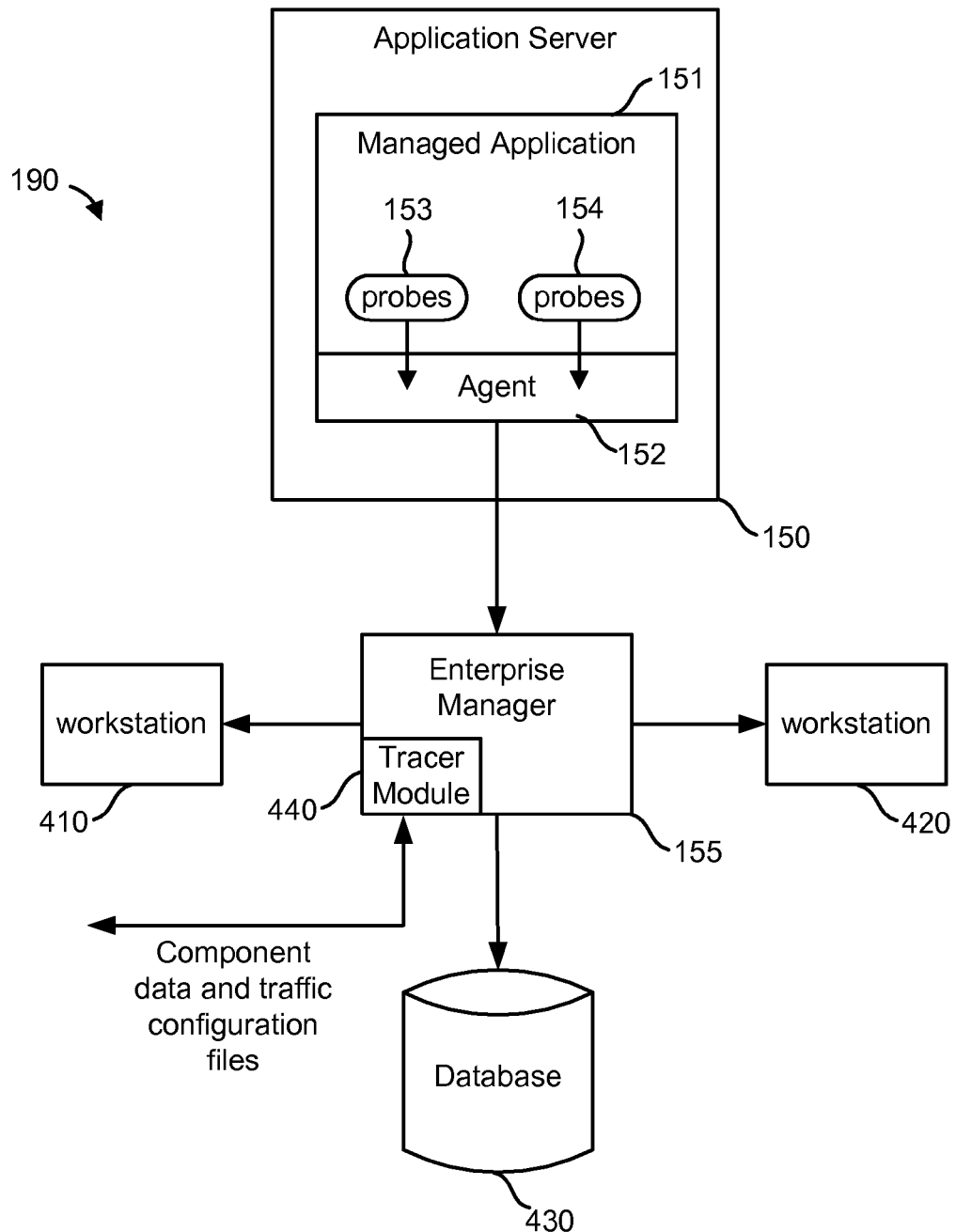
FIG. 4 is a block diagram of an embodiment of a system for monitoring an application.

FIG. 4 is a block diagram of an embodiment of a system for monitoring an application. As discussed above with respect to FIG. 1A, the application monitoring system 190 may be used to monitor an application and generate application runtime data. In one embodiment, FIG. 4 provides more detail for application server 150 and Enterprise Manager 155 of FIG. 1D. The system includes application server 150 which is in communication with Enterprise Manager 155 which, in turn, is in communication with example workstations 410 and 420 and database 430. Application server 150 includes managed application 151, which includes agent 152 and example probes 153 and 154. Application 151 can be a Java application or a different type of application.

Behavior of the application 151 can be monitored by instrumenting bytecode or intermediate language (IL) code of the application, by plugging into an exit built into the application or network server, or by any other monitoring technique. For example, information from the application 151 can also be obtained using probes 153 and 154. In practice, many such probes can be used to obtain information regarding different components of the application.

In one embodiment, a probe builder (not pictured) instruments (e.g. modifies) bytecode for application 151 to add the probes 153 and 154 and additional code. In another approach, developers add probes to the application source code. The probes may measure specific pieces of information regarding the application without changing the application's business logic. The probe builder may also add agent 152 which may be installed on the same machine as application 151 or a separate machine. Once the probes have been installed in the application, or a monitoring capability has otherwise been provided, the application is referred to as a managed application. More information about instrumenting bytecode can be found in U.S. Pat. No. 6,260,187, "System For Modifying Object Oriented Code" by Lewis K. Cirne, and U.S. patent application Ser. No. 09/795,901, "Adding Functionality To Existing Code At Exits," filed on Feb. 28, 2001, each of which is incorporated herein by reference in its entirety. See also FIG. 11.

As managed application 151 runs, probes 153 and 154 send data to agent 152. In one embodiment, probes 153 and 154 may be implemented in objects and other code that write data, change data or otherwise cause the state of an application server to change. Agent 152 then collects, summarizes and sends the data, referred to as application runtime data, to Enterprise Manager 155. In response, Enterprise Manager 155 runs requested calculations, makes application runtime data available to workstations 230 and 240 and, optionally, sends the application runtime data to database 430 for later analysis. More information regarding monitoring an application using probes can be found in U.S. Patent App. Pub. No. 2004/0075690, published Apr. 22, 2004, titled, "User Interface For Viewing Performance Information About Transactions", by Lewis K. Cirne, incorporated herein by reference.

Workstations 410 and 420 provide a graphical interface for viewing application runtime data such as by creating custom views which can be monitored by a human operator. The workstations can include windows which provide a set of customizable views and depict alerts and calculators that filter application runtime data so that the data can be viewed in a meaningful way. The elements of the workstation that organize, manipulate, filter and display application runtime data can include actions, alerts, calculators, dashboards, persistent collections, metric groupings, comparisons, smart triggers and SNMP collections.

In one embodiment of the system of FIG. 4, one or more components are running on different computing devices. Alternatively, the components can run on the same computing device. A computing device on which each component may run is discussed in more detail below with respect to FIG. 5.

Enterprise manager 155 may also include tracer module 440 which may receive a hierarchy rules engine from transaction server 164 of FIG. 1D. In another approach, the tracer module 440 receives a configuration file which it parses to obtain the rules engine. In either case, the rules engine can be used to classify the application performance data according to different levels of the hierarchy. In one embodiment, the configuration file may include transaction server module identification, the date and time that the configuration file was created, application defect information, parameter defect lists and information regarding a domain, business processes associated with the domain, business transactions associated with the business processes, transactions associated with the business transactions and transaction components for each transaction. Further, for each of the business transactions, transactions and transaction components, defect definitions may be specified. Processing using a hierarchy is discussed in more detail below.

Figure 5:
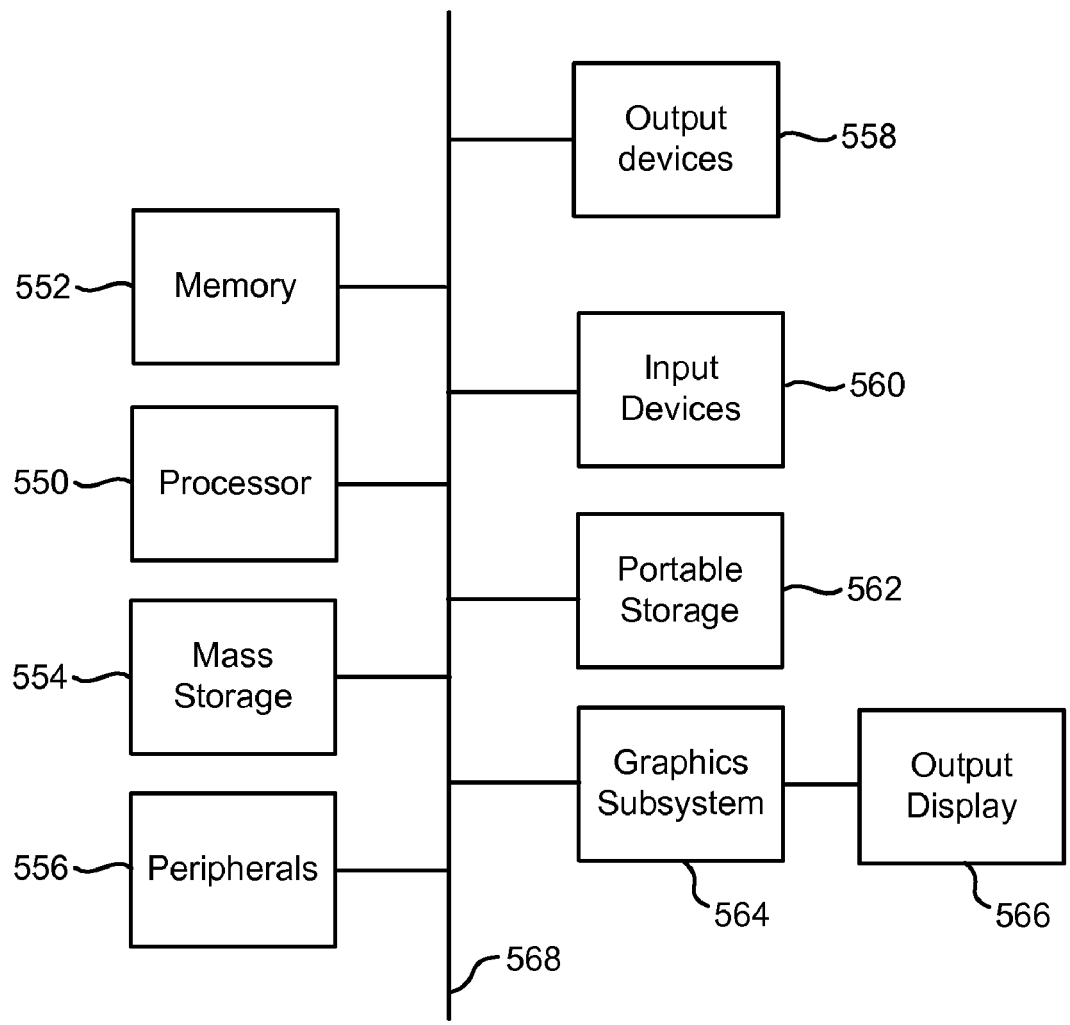
FIG. 5 is a block diagram of an embodiment of a computing system.

FIG. 5 is a block diagram of an embodiment of a computing system for use with the present technology. In one embodiment, the computing system may be used to implement client device 110, any of firewall 132, router 134 and switch 136 on one or more machines, network server 140, application server 150, database server 151, Enterprise Manager 150, workstations 410 and 420, database 430, traffic monitor 160, transaction server 164, synthetic transaction generator 172, script recorder 174 and synthetic transaction script module 170.

The computer system includes one or more processors 550 and main memory 552 which stores, in part, instructions and data for execution by processor unit 550. If the system of the present invention is wholly or partially implemented in software, main memory 552 can store the executable code when in operation. Also provided are a mass storage device 554, peripheral device(s) 556, user input device(s) 560, output devices 558, portable storage medium drive(s) 562, a graphics subsystem 564 and an output display 566. For simplicity, the components are depicted as being connected via a single bus 568. However, the components may be connected through one or more data transport means. For example, processor unit 550 and main memory 552 may be connected via a local microprocessor bus, and the mass storage device 554, peripheral device(s) 556, portable storage medium drive(s) 562, and graphics subsystem 564 may be connected via one or more input/output (I/O) buses. Mass storage device 554, which may be implemented with a magnetic disk drive or an optical disk drive, is a non-volatile storage device for storing data and instructions for use by processor unit 550. In one embodiment, mass storage device 554 stores the system software for implementing the present invention for purposes of loading to main memory 552.

Portable storage medium drive 562 operates with a portable non-volatile storage medium, such as a floppy disk, to input and output data and code to and from the computer system. In one embodiment, the system software for implementing the present invention is stored on such a portable medium, and is input to the computer system via the portable storage medium drive 562. Peripheral device(s) 556 may include any type of computer support device, such as an input/output (I/O) interface, to add additional functionality to the computer system. For example, peripheral device(s) 556 may include a network interface for connecting the computer system to a network, a modem, a router, etc.

User input device(s) 560 provides a portion of a user interface. User input device(s) 560 may include an alpha-numeric keypad for inputting alpha-numeric and other information, or a pointing device, such as a mouse, a trackball, stylus, or cursor direction keys. In order to display textual and graphical information, the computer system includes graphics subsystem 564 and output display 566. Output display 566 may include a cathode ray tube (CRT) display, liquid crystal display (LCD) or other suitable display device. Graphics subsystem 564 receives textual and graphical information, and processes the information for output to output display 566. Additionally, the computer system includes output devices 558. Examples of suitable output devices include speakers, printers, network interfaces, monitors, etc.

The components contained in the computer system are those typically found in computer systems suitable for use with the present invention, and are intended to represent a broad category of such computer components that are well known in the art. Thus, the computer system can be a personal computer, hand held computing device, telephone, mobile computing device, workstation, server, minicomputer, mainframe computer, or any other computing device. The computer system can also include different bus configurations, networked platforms, multi-processor platforms, etc. Various operating systems can be used including Unix, Linux, Windows, Macintosh OS, Palm OS, and other suitable operating systems.

Figure 6:
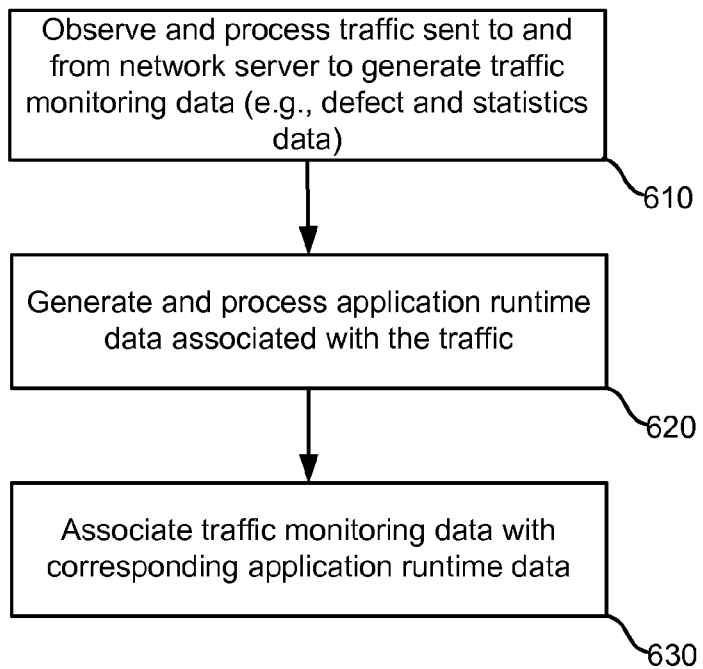
FIG. 6 is a flowchart of an embodiment of a process for monitoring a network service.

FIG. 6 is a flowchart of an embodiment of a process for monitoring a network service. The process can be performed by traffic monitoring system 180 and application monitoring system 190 of FIG. 1. The process begins with the traffic monitoring system observing and processing traffic sent to and from network server 140 to generate traffic monitoring data such as defects and statistics data, at step 610. In one embodiment, traffic may be received by a device in the line of communication between client 110 and network server 140. The device which receives the traffic sends a copy of the traffic to traffic monitoring system 180 while also forwarding the traffic to its intended destination. In particular, the traffic is received and processed by traffic monitor 160 and further processed by transaction server 164 of FIG. 1, e.g., to translate the traffic into transaction components, identify transactions from the transaction components, obtain statistics and defect data from the identified transactions, store transaction data and report information regarding the stored transaction data. Observing and processing traffic in step 610 is discussed in more detail below with respect to FIG. 7.

Application runtime data associated with the observed traffic is generated and processed by the application monitoring system at step 620. For example, the application may execute to handle a request from a network server to retrieve data from a database by sending a request to the database for the requested data, receiving the data in a response from the database, and sending the requested data to the network server in a response. For each of these actions performed by the application while processing the request, application runtime data can be generated, e.g., by the agent 152, and sent to Enterprise Manager 155 for processing. Step 620 is discussed in more detail below with respect to FIG. 11.

Traffic monitoring data can be associated with corresponding application runtime data at step 630. This can be achieved in different ways. For example, an identifier may be assigned by the application monitoring system to a request-response pair of a transaction component and provided to the traffic monitoring system in the response. Moreover, in some embodiments, the traffic monitoring system and the application monitoring system may use the same or similar classification rules for classifying transactions according to a hierarchy. In some embodiments, traffic monitoring data may be integrated with the application runtime data and viewed through an output device. Providing application runtime data associated with traffic monitoring data to an operator is discussed in more detail below, e.g., with respect to FIGS. 12A-13.

Figure 7:
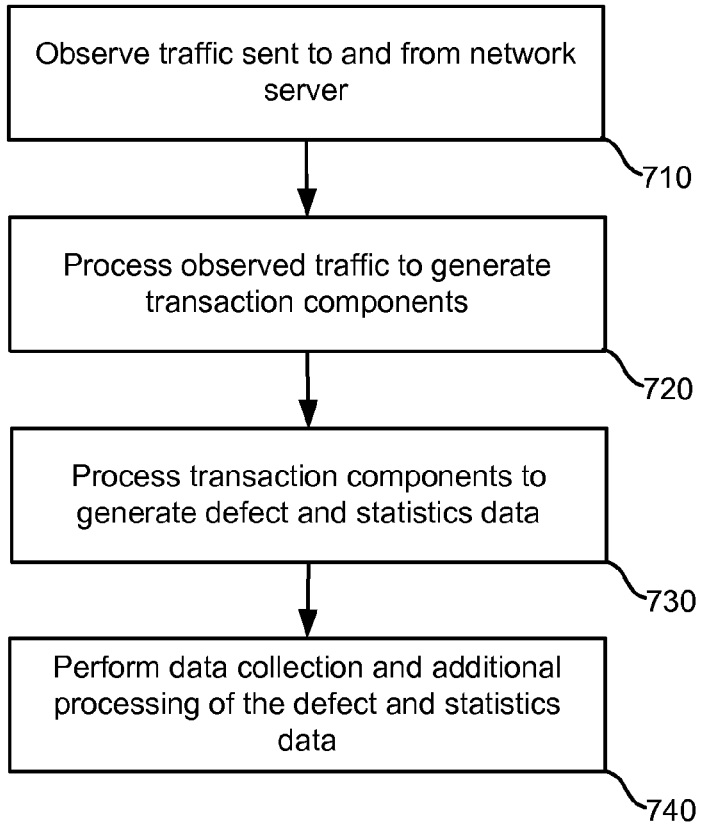
FIG. 7 is a flowchart of an embodiment of a process for observing and processing network server traffic.

FIG. 7 is a flowchart of an embodiment of a process for capturing and processing network service system traffic. In one embodiment, the flowchart provides more detail for step 610 of FIG. 6 performed by traffic monitoring system 180. First, traffic sent to and from network server 140 is observed at step 710, e.g., by receiving the traffic at router 134, switch 136 or some other point between firewall 132 and network server 140. The device which receives the traffic can provide a copy of the traffic to traffic monitoring system 180, enabling system 180 to observe the traffic. In another approach, observing the traffic can include intercepting the traffic and forwarding it to its intended destination.

The traffic monitor 160 processes the observed traffic to generate transaction components at step 720. Referring also to the discussion regarding FIG. 2, this processing may include constructing a data stream from data packets of the observed traffic, determining request-response pairs that form transaction components, and grouping the transaction components into classifications such as transactions, business transactions, business processes and a domain. This processing is discussed in more detail below with respect to FIG. 8.

Traffic monitor 160 processes the transaction components to generate defect and statistics data at step 730. In one embodiment, this involves processing transaction components to identify valid transactions using received transaction definitions, determining defect and statistics data from the valid transactions and defect definitions, and providing the defect and statistics data for further processing, storage and reporting. This processing is discussed in more detail below with respect to FIG. 9.

Transaction server 164 performs data collection and additional processing on the defects and statistics data at step 740. In one embodiment, data collection includes translating the defects and statistics data into a format which can be stored in a database, storing the data and reporting the data. The additional processing may include generating transaction and defect definitions from transaction signature data received from one or more recorders and providing the definitions to traffic monitor 160. Performing data collection and additional processing is discussed in more detail below with respect to FIG. 10A.

Figure 8:
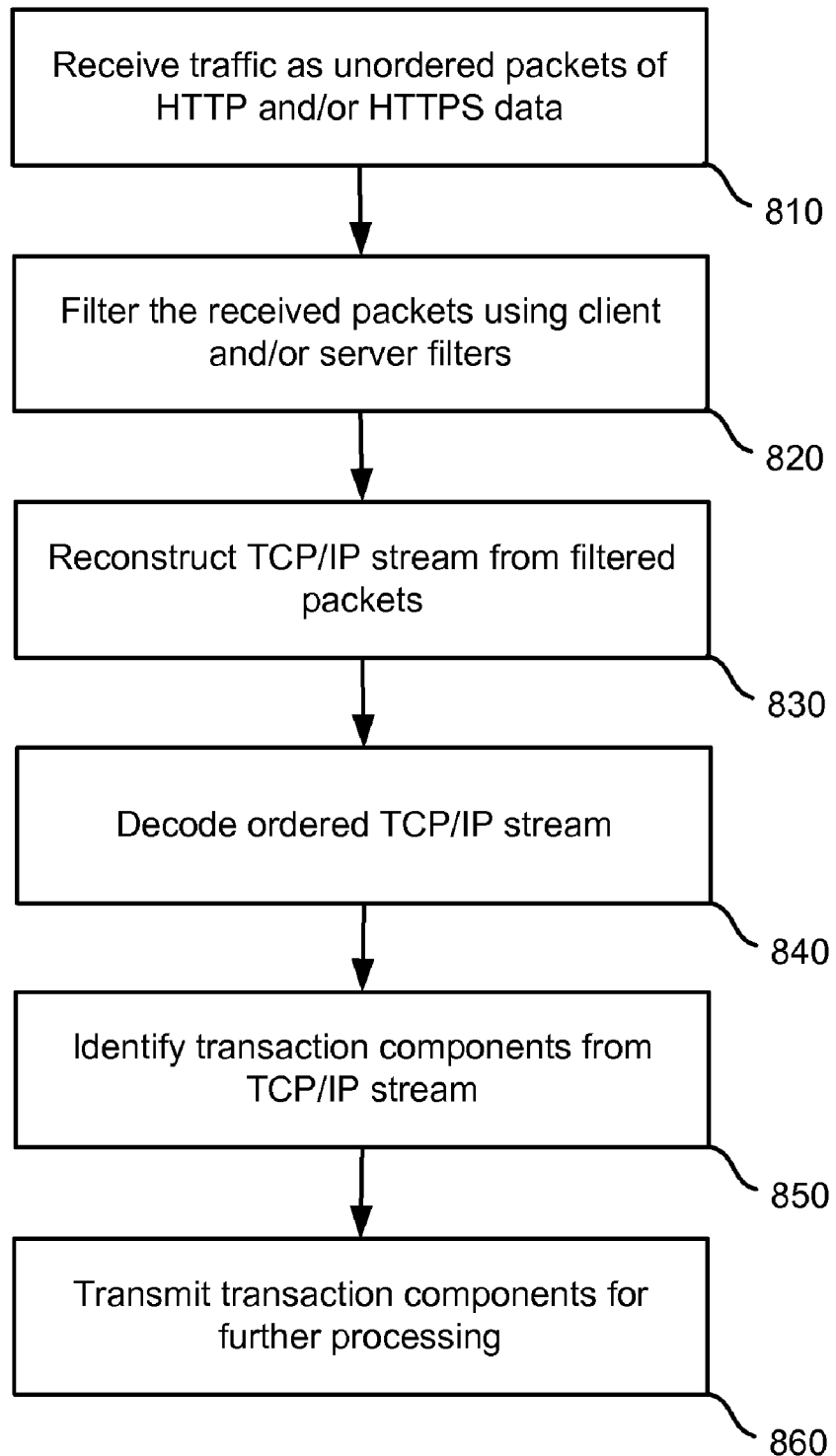
FIG. 8 is a flowchart of an embodiment of a process for obtaining transaction components from observed traffic.

FIG. 8 is a flowchart of an embodiment of a process for obtaining transaction components from observed traffic. In one embodiment, the process provides more detail for step 720 of the process of FIG. 7 and can be implemented by modules 210-250 of transaction server 160 of FIG. 2. At step 810, traffic is received, e.g., in the form of unordered packets of data provided in an HTTP and/or HTTPS format or some other network data transport format.

The unordered packets are filtered at step 820, e.g., via packet processing module 210 using filter data received from the transaction server 164. The filter data can apply to the client 110, network server 140 and/or application server 150. In one embodiment, the filtering achieves load-balancing of large packet streams across multiple traffic monitors. For example, if three traffic monitors process a large packet stream, each traffic monitor may be configured to process one third of the stream. The traffic monitors may be configured by a client or server filter file that instructs each monitor as to what range of traffic to process. The packet filtering can involve determining which traffic should be captured and processed and which packets should be discarded or ignored or otherwise processed differently.

Filtering may be performed based on client and/or server filters received by traffic monitor 160. The client and server filters may include one or more IP address ranges, for instance, which indicate which packets to process and/or which packets not to process for a particular traffic monitor. Thus, if an observed traffic packet has an IP address which is not within a corresponding IP address range of a corresponding filter, the traffic packet is not processed. The client filter file may enable filtering based on client IP address ranges. A server filter file may enable filtering on server IP address ranges. Filtering can also be based on IP-Address: TCP-Port combinations in addition to just IP-Address, or any other form of filtering. If no filter file is received and no client filters are specified for a traffic monitor module, the particular traffic monitor does not perform client filtering of incoming traffic packets. When one or more client filters are specified, any captured packet that does not match at least one of the client filters can be discarded. For example, a packet matches a filter if either its source or destination address is greater than or equal to the <FromIp>address of a client filter and less than or equal to the <ToIp> address of the same filter. In some embodiments, the packet source and/or destination address, client filter <FromIp> address and client filter <ToIp> address are 32-bit numbers.

After filtering the packets, a TCP/IP stream, for instance, is reconstructed from the filtered packets at step 830. The TCP/IP stream can be generated by analysis module 230 of traffic monitor 160 of FIG. 2 such as by generating requests and responses in a network protocol format (e.g., for HTTP format, the requests and responses have a header and data portion) from the received traffic packets. The generated TCP/IP stream is then decoded, if necessary, at step 840 by decoding module 240 of traffic monitor 160 (FIG. 2). In one embodiment, decoding module 240 decodes an encrypted ordered TCP/IP stream using a private key which is obtained from network server 140 or other source by traffic monitor 160 to provide a decoded TCP/IP stream to component ID module 250.

After decoding the stream, transaction components are identified from the TCP/IP stream at step 850 by component ID module 250. As discussed above, a transaction component can include a portion of a content page provided as a response to a request. In this case, component ID module 250 parses requests in the decoded TCP/IP stream to generate transaction components. For example, each request may be parsed to determine query, cookie, post, URL and session type name/value pairs. For example, a typical HTTP post request which can be parsed by traffic monitor 160 is shown below.
Request-line: POST /dir/file.html?query1=q1&query2=q2 HTTP/1.1\r\n
request-headers: Content-type: application/x-www-form-urlencoded\r\n
  Host: www.company.com\r\n
  Cookie: cookie1=c1; cookie2=c2\r\n
  Referer: https://www.company.com/dir/home.html?action login\r\n
  \r\n
request-body: post1=p1&post2=p2

An example of an HTTP parameter list derived from parsing the above request is shown below. Each parameter includes a type and name/value pair.
type="Query," name="query1", value="q1"
type="Query," name="query2", value="q2"
type="Cookie," name="cookie1", value="c1"
type="Cookie," name="cookie2", value="c2"
type="Post," name="post1", value="p1"
type="Post," name="post2", value="p2"
type="Url," name="Host", value="www.company.com"
type="Url," name="Path", value="/dir/file.html"
type="Url," name="Url",value="www.company.com/dir/file.html?query1=q1&query2=q2"
type="Url," name="Referer",value="www.company.com/dir/home.html?action=login"

The parameter list data is retrieved from the request listed above. In particular, the parameter list query data can be retrieved from the request-line of the request, the cookie data can be retrieved from the request headers, the post data can be retrieved from the request body, and the URL data can be retrieved from the request header and request line.

Identifying components at step 850 may include identifying primary and secondary components. As discussed above, a request can be processed to identify transaction components by comparing parameters in the request to parameters in a transaction definition. If the request includes a primary transaction component, the request can be categorized directly according to the transaction with which the primary transaction component is associated. A primary transaction component and associated secondary components can be identified by their use of the same session ID in one possible approach. In some embodiments, a primary component may be identified as the first component to have a particular session ID. In some embodiments, a primary component is a component having a "content type" value that starts with "text." If no primary transaction component is used, the request can be categorized according to a transaction definition which is met by a set of one or more transaction components of the request. Further, the request-response pair can be categorized according to the request, in one possible approach. The transaction components are transmitted by component ID module 250 to user ID module 260 and component processing module 270 of traffic monitor 160 for further processing at step 860.

Figure 9:
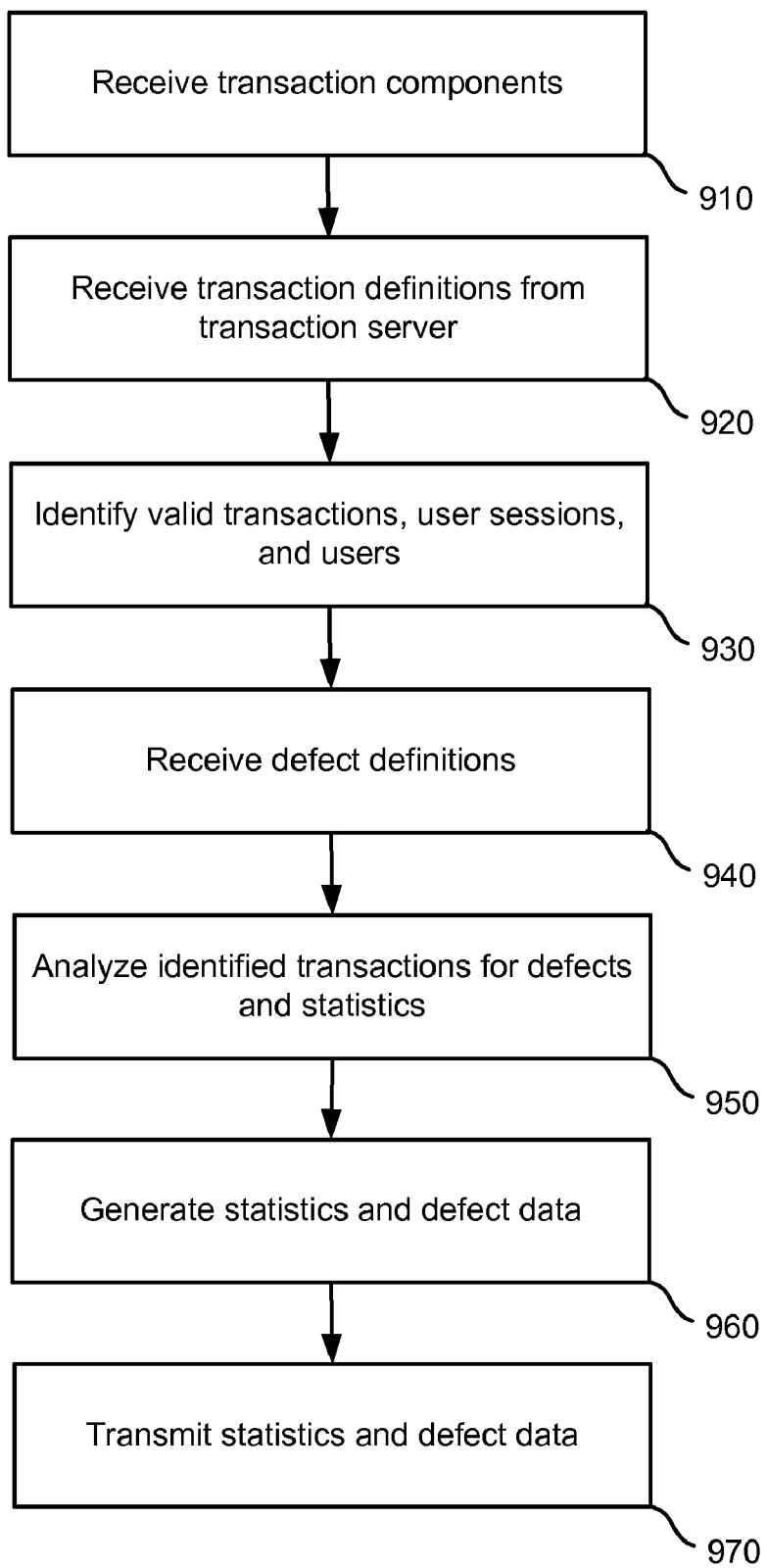
FIG. 9 is a flowchart of an embodiment of a process for processing transaction components from observed traffic.

FIG. 9 is a flowchart of an embodiment of a process for processing transaction components. In one embodiment, the flowchart of FIG. 9 provides more detail for step 730 of FIG. 7 and is implemented by modules 260-280 of traffic monitor 160 of FIG. 2. First, transaction components are received at step 910, e.g., including primary components and secondary components.

Transaction definitions are received by module 270 from transaction server 164 at step 920. The transaction definitions are generated by transaction server 164 from user input and/or transaction signatures received by transaction server 164 to describe templates that the traffic monitoring system should use in detecting patterns in the traffic. In one embodiment, recorders capture transaction data, generate transaction signatures from the transaction data and provide the signatures to transaction server 164. An operator may view the transaction signatures, modify them if desired, and select them to become transaction definitions. The transaction definitions may include HTTP parameter definitions, for instance, such as type, name and specification parameters. The type contained in the HTTP parameter definitions may include a query, cookie post, URL or session manager type. An HTTP parameter definition of a transaction name may be "user login" or any other name provided by an operator. The specification parameters may indicate a URL associated with the transaction, user identification, client machine identification, server machine identification, and other parameters associated with the particular transaction. Generation of transaction definitions from transaction signatures is discussed in more detail below with respect to steps 1050-1060 of FIG. 10B.

After receiving transaction definitions, traffic monitor 160 identifies valid transactions, user sessions and users at step 930. In one embodiment, a user name associated with a user session is detected by user ID module 260. The user name may include a login name for a user and can be included in the first request-response pair associated with a session. Once the login name or user name is identified, the login name and corresponding session ID (included in every request and response pair) is forwarded as login data to transaction server 164. User ID module 260 then forwards the session identification data to statistics and defects monitor 280.

Component processing module 270 identifies valid transactions by comparing the transaction definitions to the transaction components. In some embodiments, component processing module 270 may compare a URL of a transaction component with the transaction definitions. In some embodiments, component processing module 270 may also compare user identification, client machine identification, and other information of the transaction components to the transaction definitions. If the data contained in the transactions components does not match any transaction definition, the transaction component can be discarded, ignored, identified as "unclassified" or otherwise processed.

Defect definitions are received from transaction server 164 by traffic monitor 160 at step 940. At step 950, identified transactions are monitored for defects and statistics. Step 950 may be performed by statistics and defects monitor 280 of the system of FIG. 2. For example, valid transactions can be compared to the defect definitions to determine if any of the transactions are defective. Defect definitions may specify what comprises a defect and/or an acceptable transaction. In any case, transactions identified as defective are identified at step 950. For example, the defect definitions may specify that a transaction having a particular URL should not have a response time over a particular response time threshold. Thus, for all transactions having the particular URL and having a response time over the response time threshold, the transaction is identified as defective. A defective transaction is a transaction with one or more defects.

Statistics and defect data are then generated from the identified transactions at step 960 by statistics and defects monitor 280. Statistics may include, e.g., response time, count of completed transactions, count of uncompleted transactions, and other statistics for one or more transactions. Defect data may include defect and incident information, count information such as the number of times a particular defect has occurred and other data associated with transactions identified as being defective. The statistics and defect data is transmitted to transaction server 164 at step 970. In some embodiments, the defect data may be in XML format and the statistics data may be in binary format.

Figure 10A:
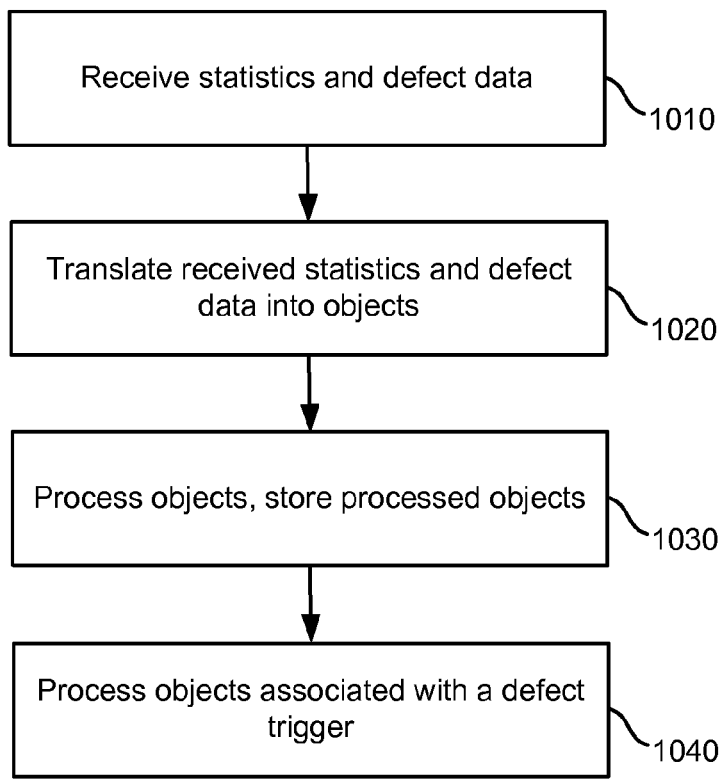
FIG. 10A is a flowchart of an embodiment of a process for performing data collection.

FIG. 10A illustrates a flowchart of an embodiment of a process for performing data collection. In one embodiment, the flowchart provides more detail for step 740 of the flowchart of FIG. 7 and is performed by transaction server 164. At step 1010, statistics and defect data are received by transaction server 164 from traffic monitor 160. In one embodiment, the statistics data is provided for one or more transactions based on the transaction URL. In some embodiments, the defects and statistics may be received by event collector 130 and statistics collector 350, respectively (FIG. 3).

The statistics and defect data are translated into a persistent storage state and stored, e.g., in an SQL database. In this embodiment, the statistics and defect data are first translated into objects such as Java objects at step 1020. The translation may be performed by collectors 310 and 350, as illustrated in FIG. 3. Statistics collector 350 receives statistics data, e.g., in a binary format, from traffic monitor 160, translates the received data into objects and provides the objects to statistics processor 355.

The objects are processed and stored at step 1030 by event processor 320. In one embodiment, storing the objects includes retrieving login data from the objects and storing the login data as a session ID and user name pair.

Next, the objects associated with a defect trigger are processed at step 1040. In some embodiments, the objects are processed to determine whether a defect is new or matches pre-existing defect criteria. In this embodiment, if a defect does not match pre-existing defect criteria, a new defect is created. Handling of triggers and the corresponding gathering of evidence is discussed in more detail above.

Figure 10B:
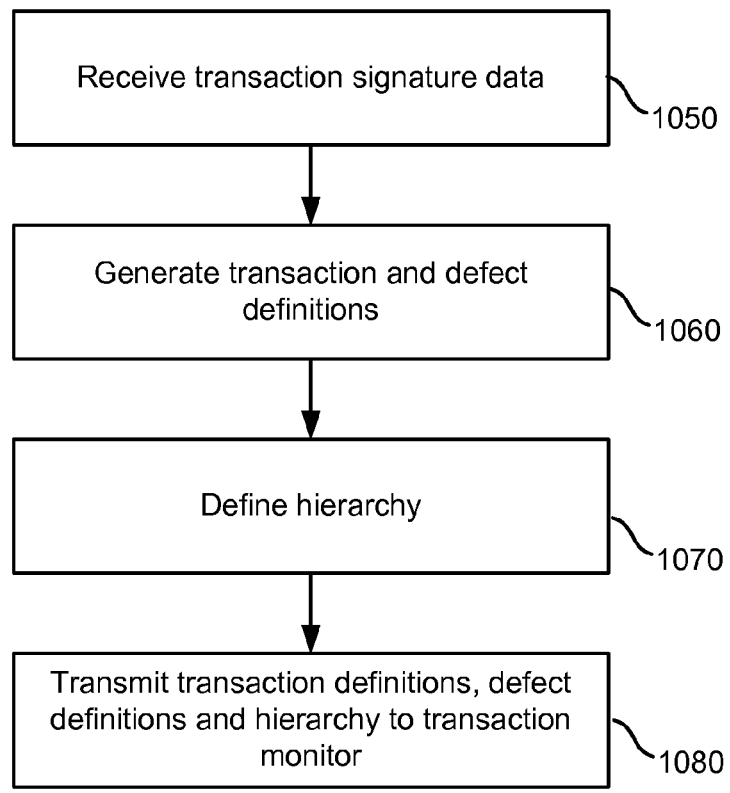
FIG. 10B illustrates a flowchart of an embodiment of a process for generating and transmitting transaction and defect definitions.

FIG. 10B illustrates a flowchart of an embodiment of a process for generating and transmitting transaction and defect definitions. In one embodiment, the flowchart provides more detail for step 740 of the flowchart of FIG. 7. As discussed above, a transaction signature describes an individual transaction that is captured by a recorder. A received transaction signature may later be manipulated into a transaction definition through transaction server 164 and used by traffic monitor 160 to identify valid transactions. Transaction signature data may be received by event collector 310 from one or more recorders, such as recorders 114, 162 and 174 of FIG. 1D and translated into objects before being stored in database server 360 (FIG. 3).

After receiving the transaction signature data, transaction definitions and defect definitions can be generated at step 1060. In one embodiment, admin console 380 provides an interface through browser 382 (FIG. 3) for this purpose. In particular, the operator may manipulate the transaction signature data and enter other commands through the interface to generate the transaction and defect definitions. This provides a convenient method for generating transaction definitions without having to generate them from scratch, although it is also possible for the operator to provide one or more transaction definitions from scratch. Rather, transactions can be recorded from actual client-application interactions, data for the transactions can be provided to an operator as a transaction signature for a particular transaction, and the operator may modify, e.g., edit, the signature through the interface.

For example, admin console 380 may present transaction signature data for a login transaction signature which includes parameters indicating that a login transaction request was received from a particular client machine A by a particular front-end web server B, that the request from client machine A included a specific user name parameter and password parameter, and that the request took twenty milliseconds to complete. An operator may manipulate the transaction signature into a transaction definition by changing the parameters, e.g., to identify a transaction from any client machine (rather than only client machine A). This can be done by deleting an identifier in the transaction signature associated with client machine A, for instance. A wildcard character can also be used to specify, e.g., a subset of a group of machines which are to be included in a transaction definition. The transaction signature can similarly be modified to omit a reference to any specific user name and password parameters and to specify a response time no greater than fifty milliseconds, for instance, (rather than exactly twenty milliseconds). In this case, the transaction definition is made more general and inclusive than the original transaction signature. A balance should be struck in modifying transaction definitions to avoid over- or under-inclusiveness. The operator can thus modify a transaction signature and select or "promote" the transaction signature to a transaction definition for transactions of interest.

For example, assume the operator is interested in monitoring a login process which involves one or more web pages which allow a user to login to a web site. The trained operator can recognize such web pages by their URLs. Requests with URLs for those web pages may therefore be generalized and promoted to transaction definitions. Moreover, a request with a URL for a login web page will typically include an identifier of the particular user in a query field of the URL, e.g., after the "?" in the URL. This user-specific information would result in an unnecessarily narrow transaction definition because only login requests from that specific user would match. Accordingly, the URL can be edited to delete the user-specific information, thereby generalizing the transaction definition so that login requests from all users will match the transaction definition.

In some embodiments, a signature parameter of a response time threshold may be used to identify defective transactions. For example, a transaction signature may be modified and saved as a defect definition so that transaction signatures which match the defect definition indicate a defective transaction. In another approach, a transaction signature may be modified and saved to define a non-defective transaction so that transaction signatures which match the non-defect definition indicated a non-defective transaction. In any case, the modified transaction signature may then be saved as a transaction definition. Additionally, generating a transaction or defect definition may include defining a business transaction, a domain, an application and user identifiers, business processes associated with an application, and other information. An application may be an attribute of a business process and include a session ID, user ID and other information.

Thus, admin console 380 may access the stored transaction signature data, provide it through an interface to be edited by an operator, and store the resulting transaction and/or defect definitions at database server 360. In other embodiments, an operator may manually generate transaction and defect definitions and store them in database server 360.

At step 1070, the operator can define a hierarchy. For example, a domain level can be defined at the top of the hierarchy followed by one or more business processes and business transactions associated with the business processes, where the detected transactions in the traffic can be associated with the business transactions. See also the discussions associated with step 102 of FIG. 1B and the component processing module 270 of FIG. 2. A hierarchy rules engine can be generated based on the transaction and hierarchy definitions for use in classifying interactions with an application.

After generating transaction definitions, defect definitions and a hierarchy, they are transmitted to traffic monitor 160 at step 1080 for use in monitoring incoming traffic, identifying transactions to process and classifying the transactions according to the hierarchy.

Figure 11:
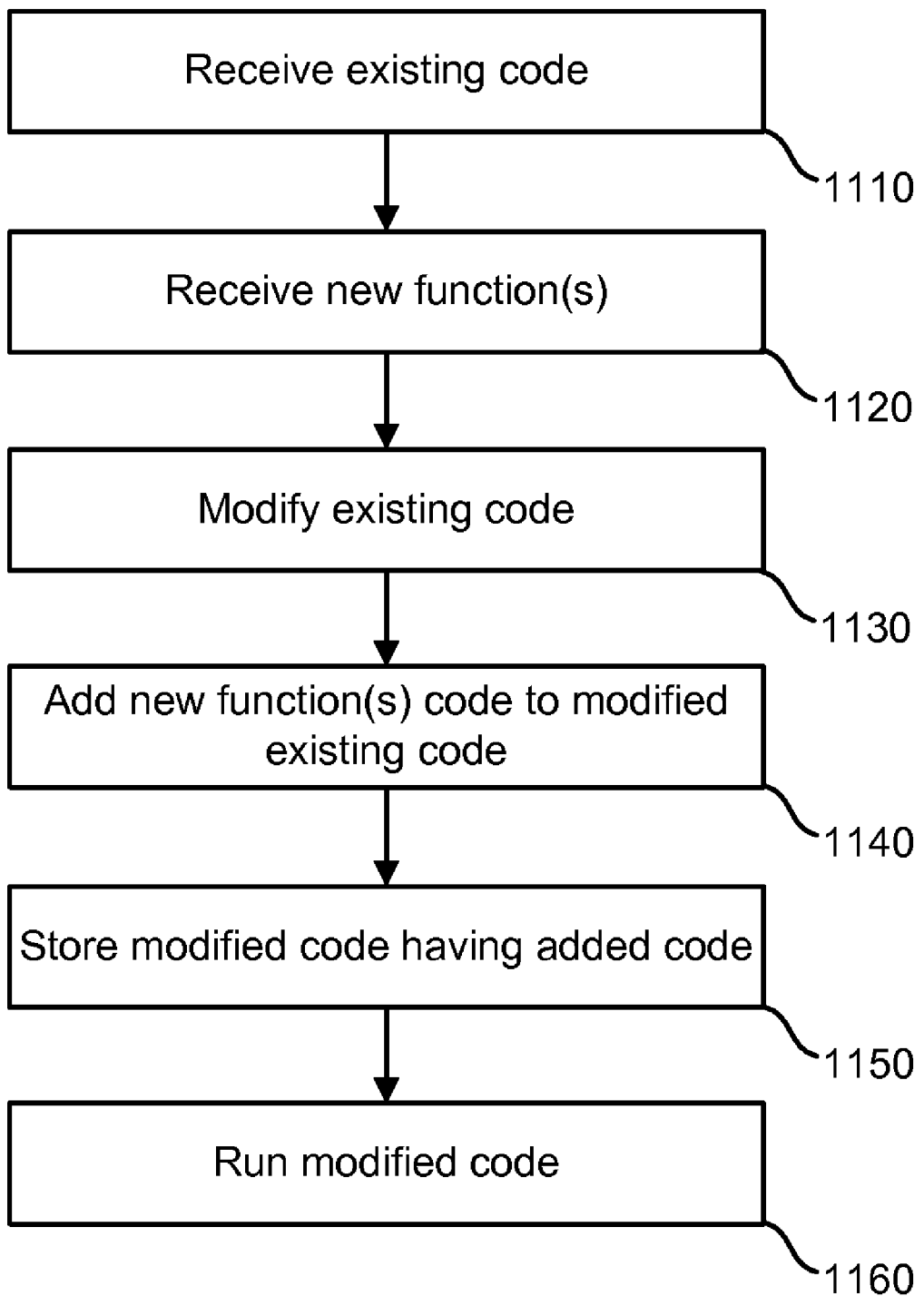
FIG. 11 is a flowchart of an embodiment of a process for modifying application code to generate application runtime data.

FIG. 11 is a flowchart of an embodiment of a process for modifying application code to generate application runtime data. As discussed in connection with FIG. 4, application monitoring system 190 monitors one or more applications, such as application 151 of application server 150, and generates application runtime data from the monitored applications. To achieve this, application code is configured to generate and provide application runtime data which is associated with processing of requests. Put another way, the flowchart of FIG. 11 is one embodiment of a process of modifying the existing object code of an application in order to monitor the application. In step 1110, a probe builder or other module receives the existing object code. In step 1120, the probe builder receives the new functionality, which can be new classes and processes that allow for monitoring of the application. In some embodiments, the new classes and processes can be provided by one or more libraries.

The existing code is modified to prepare for additional code at step 1130. In some embodiments, the existing code is modified to account for the size of the additional code, e.g., by adjusting indices for the existing code. Instructions of the existing code which follow an insertion point of the additional code are moved to make room for instructions of the additional code. For example, if the new code consumes eight bytes, then the indices for the existing code are adjusted to reflect a displacement of eight bytes. Additionally, all references to bytecode within an instruction, e.g., a pointer reference for a jump or branch instruction, may be adjusted.

All or part of the new functionality (e.g., the new classes/methods) is added to, combined with, or otherwise associated with the existing modified code at step 1140. Note that instrumenting bytecode of an application is only one example of a technique for monitoring an application. Various other techniques can be used, such as plugging into an exit built into the application or network server. In one embodiment, step 1140 may include adding a function which writes application data, such as a request-response pair identifier, an application server IP address and other information, to a response header generated by application code, as discussed in more detail below with respect to step 1220 of the flowchart of FIG. 12A. The application data may be observed and processed as network server traffic by traffic monitor 160 as the response travels from application server 150 to network server 140 and to client device 110. The modified code which includes the added code is stored at step 1150. In step 1160, the modified code is run, thereby generating application runtime data.

Figure 12A:
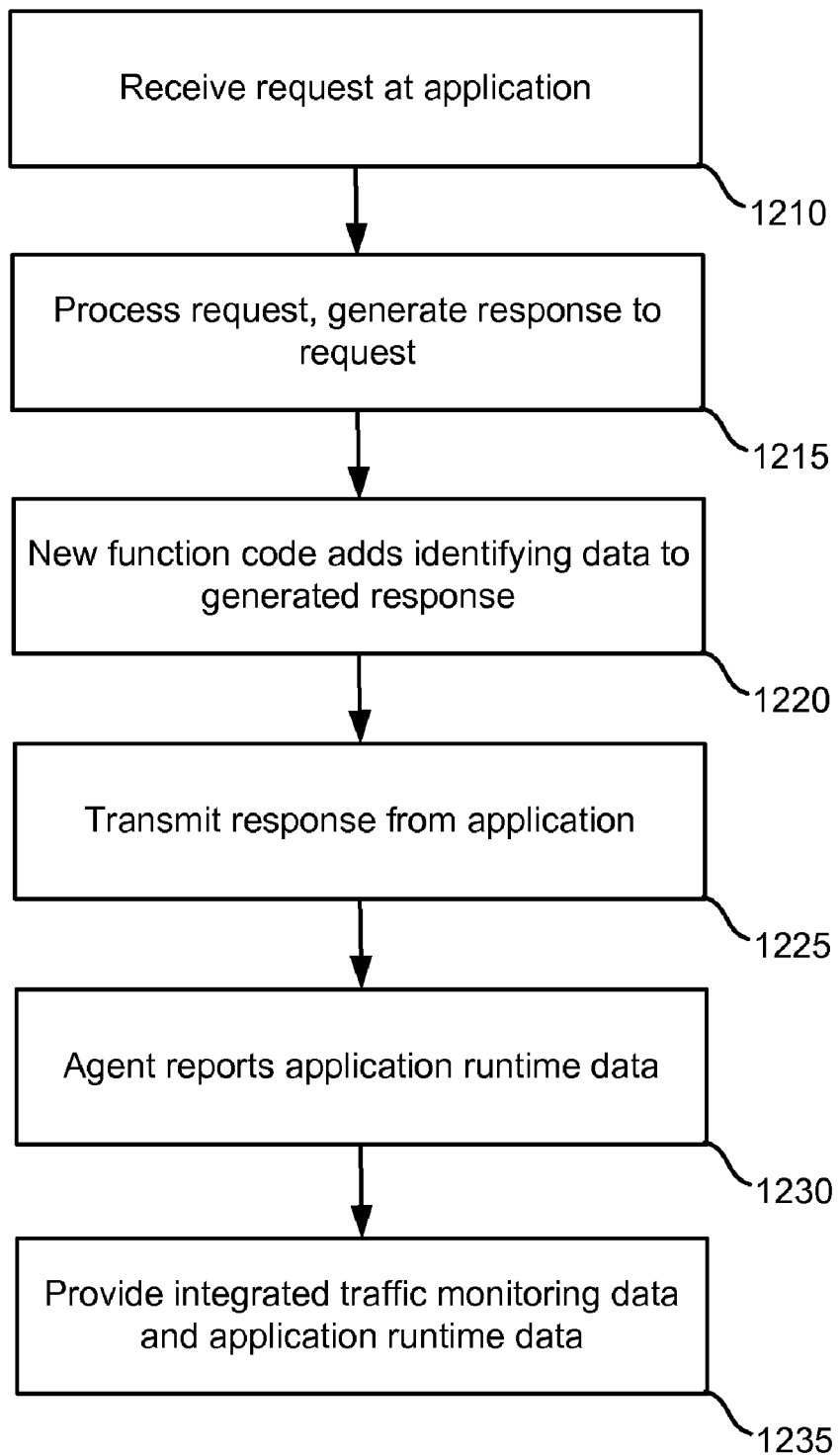
FIG. 12A is a flowchart of an embodiment of a process for processing an application request to associate traffic monitoring data with corresponding application runtime data.

FIG. 12A is a flowchart of an embodiment of a process for processing an application request to associate traffic monitoring data with corresponding application runtime data. One feature of the present technology involves integrating traffic monitoring data and application runtime data. In some embodiments, the integrated traffic monitoring data and application runtime data may be accessed through traffic monitoring system 180. In this approach, identifying data can be communicated to traffic monitoring system 180 from application monitoring system 190 or from another location to enable traffic monitoring system 180 to access application runtime data corresponding to traffic monitoring data for a particular request-response pair. For example, the identifying data may include index data, a request-response pair identifier and/or other information regarding the application runtime data. The identifying data may be communicated to system 180 by inserting the data into a response generated by an application, in one possible approach. In one embodiment, application monitoring system 190 may insert the identifying data into the response. The response and the identifying data may then be observed and processed by traffic monitoring system 180.

In one embodiment, FIG. 12A provides more detail of step 630 of FIG. 6. A request is received at an application at step 1210. The application processes the request and generates a response at step 1215 thereby forming a request-response pair. Processing the request may include performing actions by application code within application server 150 as well as accessing database server 151 or some other back-end server, e.g., by calling a servlet or EJB of the application.

Identifying data for the request-response pair is inserted into the generated response by new function code at step 1220. In some embodiments, the identifying data may be inserted into the response sometime before the response has been completely generated rather than after the response is completed. Other application-related information can also be provided in the response, including an application server ID, such as an IP address of the machine that the agent is running on, a virtual machine ID, which is a name associated with agent 152, a request handler ID, which is an entry point and/or a servlet name (servlet class name) which is involved in generating the response, and a servlet response time.

At step 1225, after adding the identifying data and other application-related information to the response, the response is transmitted from the application to network server 140, which may or may not perform additional processing of the response. After any further processing is performed, the response is sent by network server 140 to client 110. Traffic monitoring system 180 may observe and process the response such as by determining transaction components associated with the response, determining if the response is part of a defective transaction, and incorporating the response into defect and transaction statistics as discussed above with reference to FIG. 7. Moreover, the identifying data may be retrieved from the response and used to retrieve application runtime data associated with the response. The application-related information can also be retrieved. For example, if it is determined that the response is part of a defective transaction, corresponding application runtime data may be identified from the identifying data. This is discussed in more detail below with respect to FIG. 12B.

Application runtime data is reported by agent 152 of application server 150 to Enterprise Manager 155 at step 1230. The application runtime data may be indexed to the identifying data added to the response as well as other application data regarding processing of a request by application 151. Integrated traffic monitoring data and corresponding application runtime data can be provided to the operator via an interface, for instance, at step 1235 as discussed in more detail below with respect to FIG. 12B. Essentially, the traffic monitoring data and application performance data can be cross-referenced to one another to allow the operator to easily access both types of data to provide an enhanced understanding of network and application activity.

Figure 12B:
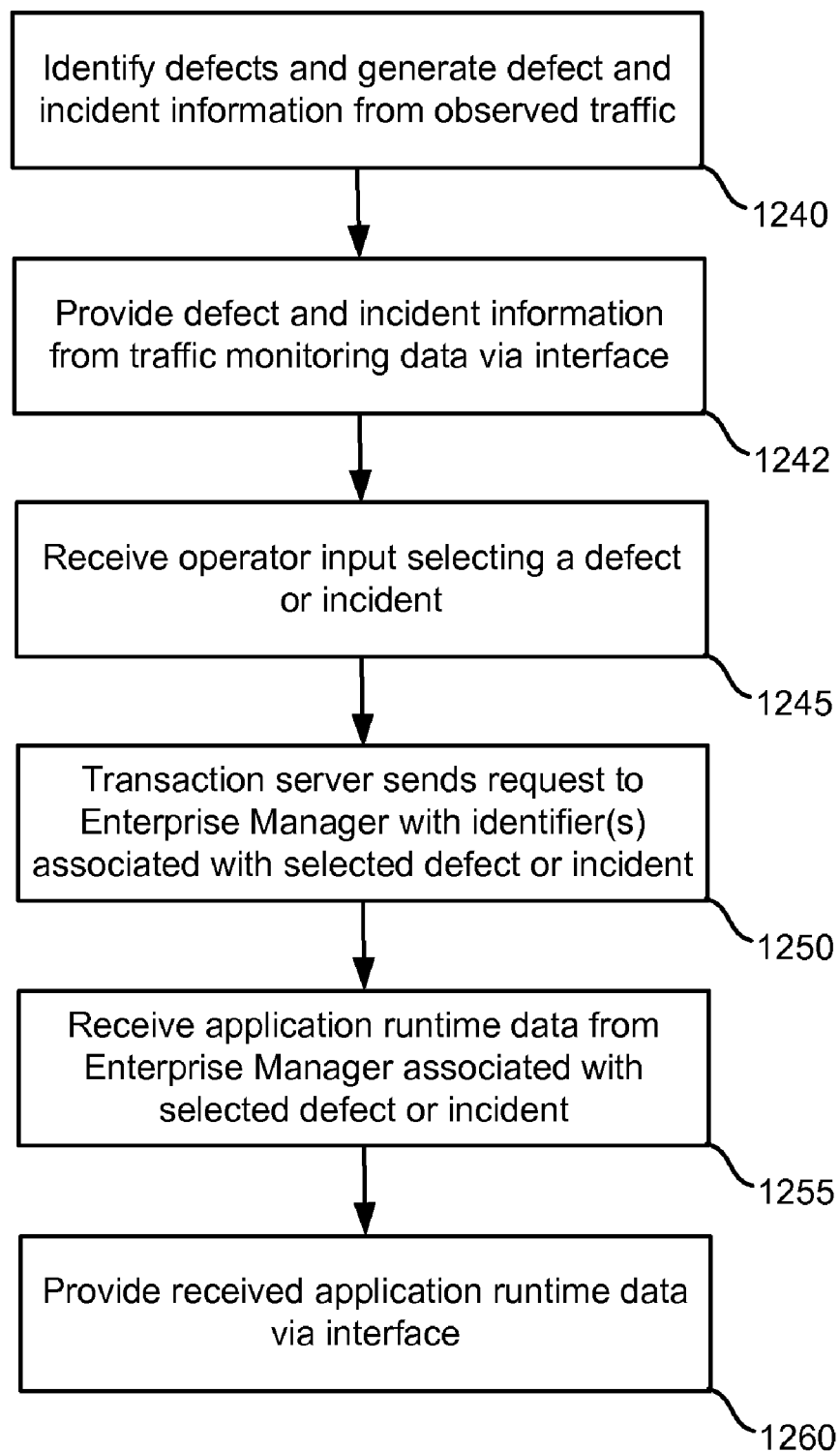
FIG. 12B is a flowchart of an embodiment of a process for associating application runtime data with corresponding traffic monitoring data.
Figure 12C:
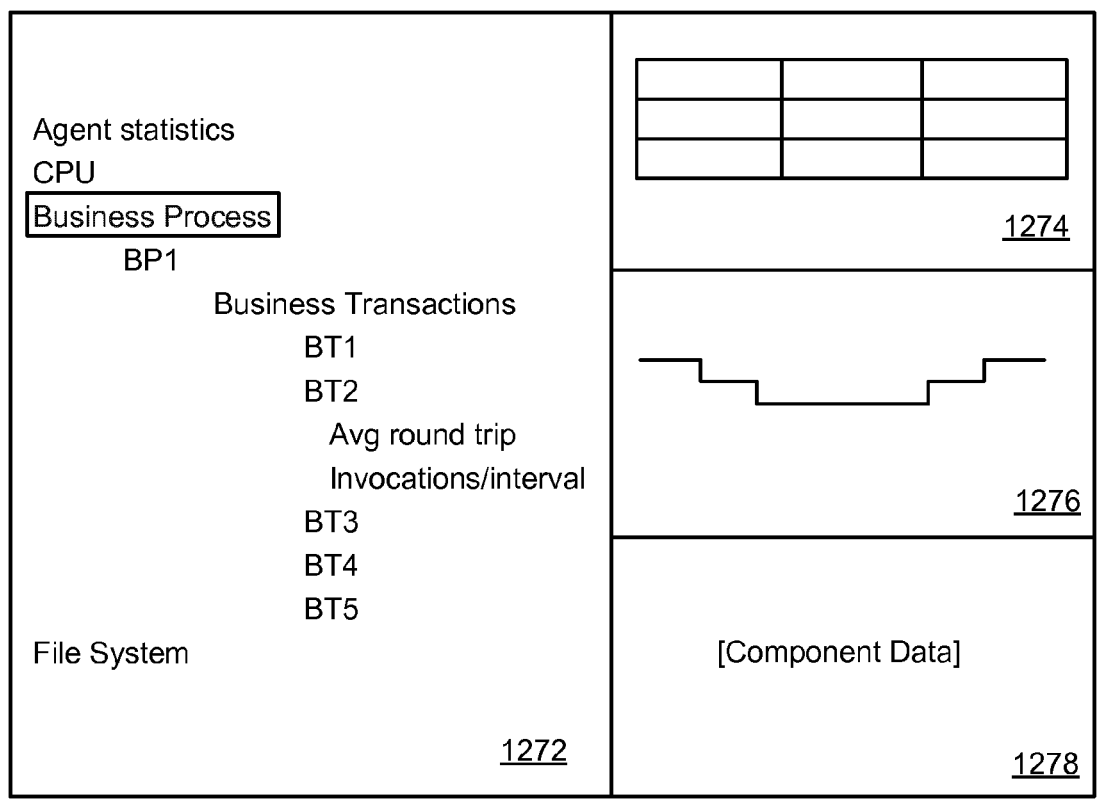
FIG. 12C is an example interface for displaying traffic monitoring data and application runtime data.

FIG. 12B is a flowchart depicting an embodiment of a process for associating application runtime data with corresponding traffic monitoring data. In one embodiment, the flowchart of FIG. 12B provides more detail for step 1235 of the process at FIG. 12A. Defects and incidents are identified and associated information is generated from the traffic monitoring data at step 1240. In one embodiment, this step is performed by traffic monitor 160 and transaction server 164. Step 1240 may include performing steps 710-730 of the process of FIG. 7 as discussed above. Identification of defects is discussed above with respect to step 950 of the flowchart at FIG. 9.

Next, data associated with the generated defects or incidents may be provided to an operator at step 1242, e.g., through an interface provided within browser 382 (FIG. 3). The interface content is provided to browser 382 by admin console 380. The operator can provide an input through the interface selecting a particular defect or incident for which application runtime data is desired, at step 1245. In response, transaction server 164 sends a request to Enterprise Manager 155 with identifying data associated with the selected defect or incident at step 1250. As mentioned, such identifying data may have been previously retrieved by traffic monitoring system 180 from a response provided to client 110, in one approach. For example, the identifying data may be associated with a request-response pair associated with a defect or one or more request-response pairs associated with one or more defects which triggered an incident. In another embodiment, transaction server 164 may send business transaction or transaction ID information to Enterprise Manager 155. In this case, Enterprise Manager 155 may have a mapping of business transaction or transaction ID to application runtime data. Enterprise Manager may then use the mapping to identify application runtime data associated with the selected defect or incident. In any case, when a request for application runtime data is received by Enterprise Manager 155 from transaction server 164, Enterprise Manager 155 gathers the requested data and sends it to transaction server 164.

Transaction server 164 receives the requested application runtime data associated with the selected defect or incident at step 1255. In one embodiment, the application runtime data is provided in an interface based on a hierarchy represented by a tree having a number of nodes. A portion of the application runtime data which is associated with a selected level of the hierarchy can be displayed based on a selected node. In some embodiments, the application runtime data may be received in some other format. Once the requested application runtime data is received, it is provided to the operator through the interface or some other means at step 1260.

In some embodiments, traffic monitoring data, such as statistics, defect and incident data derived from observed traffic, along with application runtime data, may be accessed through application monitoring system 190. In some embodiments, the application runtime data and/or corresponding traffic monitoring data can be displayed based on a hierarchy represented by a tree. A representative example of an interface for providing such a display, illustrated in FIG. 12C, includes display regions 1272, 1274, 1276 and 1278. Display region 1272 represents the hierarchy as a tree with selectable nodes. "RT" denotes response time. The tree has the following form, in one possible approach:

```
Domain
    Business Processes
        Business_Process1
            Business Transactions
                Business_Transaction1
                    Average Response time (ms)
                    Errors Per Interval
                    Invocations Per Interval
                Business_Transaction2
                    Average Response time (ms)
                    Errors Per Interval
                    Invocations Per Interval
        Business_Process2
```

Thus, the tree can organize the presentation of application runtime data and/or traffic monitoring data based on a hierarchy which includes a domain, business processes, business transactions and other nodes. Display region 1274 illustrates a representative table without data. The table in an actual interface may have information regarding defects of an incident which has been classified to the selected level of the hierarchy, for instance. An operator can select any of the rows of the table to have the corresponding trace displayed in the display region 1276, which includes a simplified representation of trace. Display region 1278 may provide other details regarding the invoked application components, such as an identifier of the request-response pair associated with the selected trace and other component data.

Figure 13:
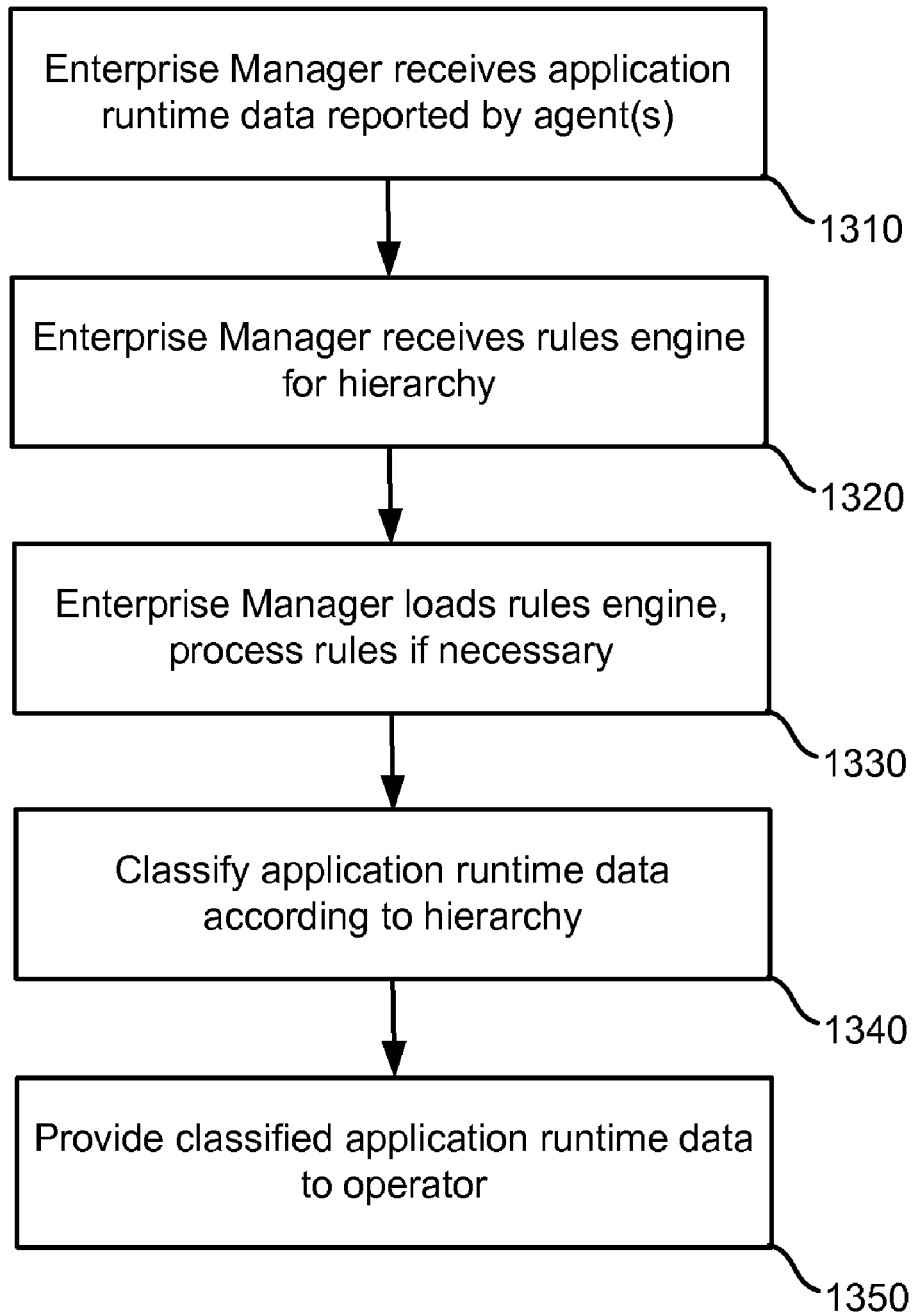
FIG. 13 is a flowchart of an embodiment of a process for providing traffic monitoring data and corresponding application runtime data to an operator via an interface.

FIG. 13 is a flowchart of an embodiment of a process for providing integrated traffic monitoring data and corresponding application runtime data to an operator through application monitoring system 190. In some embodiments, the process of FIG. 13 provides more detail for step 630 of the process of FIG. 6. Application runtime data reported by agent 152 is received by Enterprise Manager 155 at step 1310. The application runtime data can be associated with request-response pairs and can be reported as discussed above with respect to step 1230 of FIG. 12A.

Next, a rules engine for a hierarchy is received by Enterprise Manager 155, e.g., from transaction server 164, at step 1320. The set of rules can be generated by traffic monitoring system 180 in response to observed traffic and operator inputs. In some embodiments, the rules engine can be shared with the application monitoring system once, periodically, or at some other rate with respect to integration of data between traffic monitoring system 180 and application monitoring system 190.

In one embodiment, the rules engine may be generated from an XML file and can provide information for associating transactions with one or more levels of a hierarchy. In particular, the rules engine may provide classification rules and/or descriptions for identifying a domain, business processes within the domain, business transactions within the business processes, transactions within the business transactions and transaction components within the transactions. For example, the rules engine may describe HTTP request characteristics associated with a particular transaction, such as a URL host name, URL parameters, HTTP post parameters, cookie parameters and session manager parameters for each transaction.

The rules engine is loaded by Enterprise Manager 155 at step 1330. The rules can be modified, if necessary, to generate a modified rules engine which is tailored to the needs of the application monitoring system. For example, Enterprise Manager 155 may generate a modified set of rules to identify transaction components, e.g., by parsing the set of rules of the received rules engine. To this end, a configuration file which is used to generate the rules engine may include header information identifying each transaction component definition and body information containing the details of the transaction component definitions, such as name/value pairs that are associated with a transaction component. When the header information is detected during parsing, the information in the body is read and stored. A rule is then derived from the transaction component definition body portion.

Modified rules for identifying a transaction, business transaction, business process, domain and optionally other information can similarly be generated to provide the modified rules engine. The rules to identify the different levels of the hierarchy are derived from the portions of the rules engine which describe the corresponding elements. In one embodiment, the hierarchy can be represented by a tree having nodes which define the different levels of the hierarchy. In some embodiments, the rules engine used by the application monitoring system can be shared with traffic monitoring system 180.

Application runtime data may be classified according to the hierarchy at step 1340. For example, a transaction component may be associated with a request received and processed by application server 150. See the discussion above regarding step 102 (FIG. 1B) regarding binding of transaction components to the hierarchy. Step 102 can be applied equally by the traffic monitoring system using its rules engine or by the application monitoring system using its rules engine. Or, the traffic monitoring system and the application monitoring system can use the same rules engine.

In particular, application runtime data generated for each request received and processed by an application may be associated with a transaction component. The request received by the application includes parameter data associated with a transaction component. The parameter data may include, e.g., URL host name, URL parameters, HTTP post parameters, cookie and/or session manager parameters for each transaction. The agent, for instance, can compare the parameter data against the set of rules identifying a transaction component. If the parameter data matches a transaction component rule, the request is associated with the particular component. Optionally, the comparison can be made by the Enterprise Manager 155 or other entity.

For example, consider a business process for purchasing a book through a web site. This business process may include business transactions of performing a login, shopping to select a book, adding a selected book to a cart, and proceeding to checkout where payment information is entered. The business transaction of proceeding to checkout may include a request for a checkout content page and a response which provides the checkout page; the request for the checkout page may be processed by a checkout servlet within the monitored application. The rules engine received at step 1320 can identify the "checkout" transaction by URL host name (web server name), URL parameters (the URL itself), HTTP post parameters (parameters passed in the request), cookie parameters (cookies maintained, created or deleted as a result of the request) and/or session manager parameters (name/value pairs obtained from a session manager). Application runtime data reported at step 1310, which indicates the checkout servlet has processed a request, may include servlet identification information as well as URL host name, URL parameters, HTTP post parameters, cookie parameters and/or session manager parameters associated with the request processed by the servlet. These parameters will match the parameters for the checkout transaction, and the servlet will be associated with the transaction component at step 1340.

Moreover, because the transaction component is part of a transaction, a transaction is part of a business transaction, a business transaction is part of a business process and a business process is part of a domain, in the example hierarchy, the servlet can be associated with those additional levels of the hierarchy as well at step 1340.

A received request can be marked or otherwise associated with a transaction and business transaction. The reported application runtime data classified according to the hierarchy is then provided to an operator by Enterprise Manager 155 at step 1350. In one embodiment, the application runtime data may include average response time, errors per interval, method invocations per interval and other information for a transaction. This information can be provided along with the hierarchy information corresponding to the transaction and may be reported to an operator, e.g., through an interface provided by workstations 410 or 420 or other machines (not pictured).

Integrating Traffic Monitoring Data and Application Runtime Data

Further details are provided below regarding example implementations for integrating traffic monitoring data and application runtime data to provide an operator with an enhanced understanding of network and application activity.

Integration generally refers to using both types of data to facilitate understanding of interactions with the application. The traffic monitoring data and application runtime data can be integrated in different ways.

Figure 14:
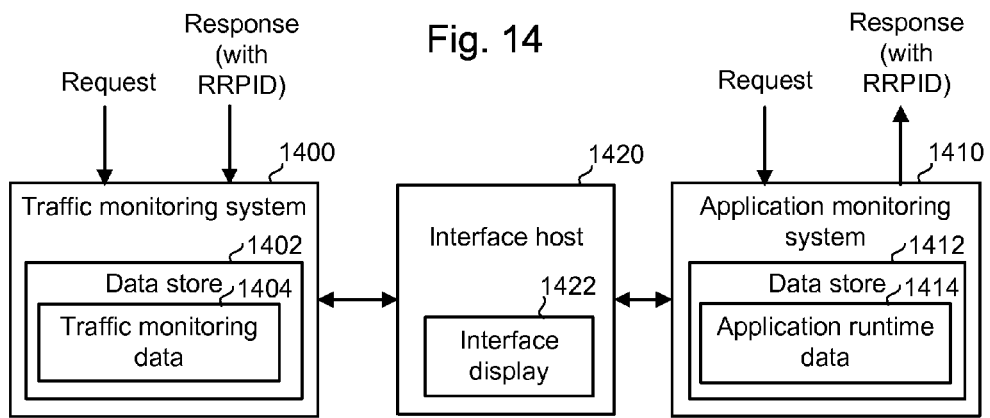
FIG. 14 is a block diagram of an embodiment of a system for integrating traffic monitoring data and application runtime data.

FIG. 14 is a block diagram of an embodiment of a system for integrating traffic monitoring data and application runtime data. The traffic monitoring system 1400 and application monitoring system 1410 can obtain data regarding an interaction with an application from different perspectives. An interface host 1420 includes an interface display 1422 which allows an operator or other person to access the traffic monitoring data and/or the application runtime data. In one approach, the interface host 1420 accesses traffic monitoring data 1404 in a data store 1402 of the traffic monitoring system 1400 and application runtime data 1414 in a data store 1412 of the application monitoring system 1410. For example, the interface display 1422 can include links which, when selected by an operator, cause the interface host 1420 to communicate with the respective data stores 1402 and 1412 to retrieve specific traffic monitoring data and/or application runtime data, respectively. Further, the information in the data stores 1402 and 1412 can be stored at the interface host 1420, additionally or alternatively. Or, the interface host 1420 can present the live data directly without going through a data store.

The interface display 1422 can be provided using any known techniques. For example, one or more screens which provide separate or combined displays of the traffic monitoring data and application runtime data can be used. Additionally, the traffic monitoring data and application runtime data can be provided in one or more windows. For example, information in any of the interfaces in FIGS. 29-34 can be provided in one or more windows of an interface, e.g., concurrently or one after another. Further, the operator may navigate among different displays using links, tabs, drop down menus or any other navigating mechanism. For example, the traffic monitoring data can be displayed with a link to associated application runtime data (see, e.g., FIG. 30, link 3010), and the application runtime data can be displayed with a link to associated traffic monitoring data. See the example interface displays discussed further below for more information. In addition to displays, the traffic monitoring data and application runtime data (integrated and non-integrated) can be reported using other outputs, such as a printer, a file, a stream, a speaker, a wireless device, etc.

By providing data from both the traffic monitoring system and the application monitoring system, a wealth of information can be provided which enhances capacity planning, understanding of resource usage, and troubleshooting capabilities. For example, the application runtime data can indicate that a database associated with an application server is overwhelmed with requests, while the traffic monitoring data can indicate that a certain class of users, e.g., users who are accessing the application without paying, are the ones who are submitting most of the requests. The traffic monitoring data can further indicate that paying customers are not using the database because it is too busy servicing the requests of the non-paying users. Based on this information, the resources could be rearranged, such as by providing a separate database which only services requests of the paying customers. In another example, combining the two types of information would allow an operator to see that a "login" business transaction is consuming an unusually large amount of database resources versus an "add to cart" transaction. In a further example, traffic monitoring data can indicate that a user's request, such as a request to purchase an item via a web site, took too long to process, or could not be successfully completed, while the application runtime data can indicate specific components or execution paths which are involved, such as by providing a trace. With this information, appropriate remedial action can be taken. Thus, with both types of information together, a greater focus and depth of understanding of the deployed resources can be realized.

Furthermore, the traffic monitoring system may provide a trigger mechanism that indicates when it is useful to examine (automatically or manually) the corresponding application runtime data, such as when an incident or defect is detected. As discussed previously, a defect can be set when a request and/or response do not meet certain success criteria, or conversely, when the request and/or response meet certain defect criteria, indicating an anomalous condition, while an incident can be set when one or more associated defects are set, in one approach.

When monitoring traffic between a client and an application, the traffic monitoring system 1400 receives requests sent from the client to the application and corresponding responses sent to the client by the application. The responses can include identifiers of request-response pairs. Such request-response pair identifiers (RRPIDs) should be globally unique identifiers (GUIDs). A request and a response may be associated as a request-response pair by a session cookie or other identifier.

Figure 15:
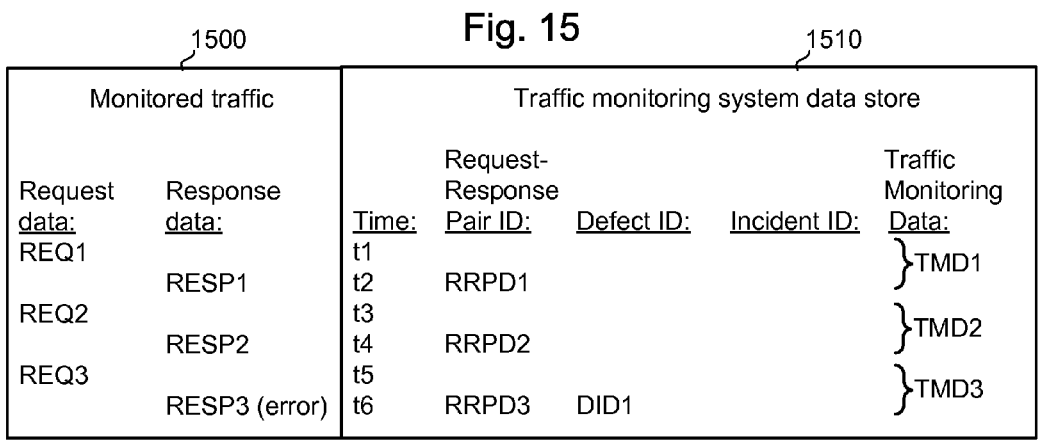
FIG. 15 is an example data structure of a traffic monitoring system data store.

FIG. 15 is an example data structure of a traffic monitoring system data store. The data structure 1510 indicates time points (t1-t6), request-response pair identifiers, defect identifiers, incident identifiers and traffic monitoring data (TMD). The time points may be obtained, e.g., from time stamps in the monitored traffic, or from a local clock. The request-response pair identifiers (RRPIDs) may be generated by the application monitoring system 1410 and provided to the traffic monitoring system 1400 in responses from the application. The RRPIDs allow identification of request-response pairs by the traffic monitoring system and the application monitoring system. For example, as indicated by the listing 1500, which represents the monitored traffic in a simplified form, a first request (REQ1) may be detected at t1 and a corresponding response (RESP1) may be detected at t2. The response includes a RRPID (RRPID1) which is detected and recorded by the traffic monitoring system in the data store 15 10. For example, REQ1 may be for a web page component and RESP1 may be the requested component.

The traffic monitoring data (TMD1) which is associated with the transaction represented by the request-response pair can therefore be classified by RRPID1 and/or a time range t1-t2 in the traffic monitoring system data store 1510. Further, the traffic monitoring data may be aggregated over multiple transactions to provide a broader view. For example, as mentioned, an incident can be set when one or more defects of respective transactions are set. Data from individual transactions can subsequently be accessed by the interface host using the RRPID. The RRPID can be used as a filtering criterion in allowing the interface host to selectively output a specific portion of the traffic monitoring data and application runtime data. However, use of the RRPID is not required to achieve this result. For example, time data can also be used to selectively access the traffic monitoring data and application runtime data. For instance, the interface host can communicate a data request to the data stores 1402 and/or 1412 which includes a time range, e.g., t1-t2, instead of, or in addition to an RRPID. Further, the traffic monitoring system may generate identifiers for defects, incidents or other locally generated data for selectively accessing the traffic monitoring data.

Similarly, a second request (REQ2) may be detected at t3 and a corresponding response (RESP2) may be detected at t4.

For example, REQ2 may be for another web page component and RESP2 may be the requested component. The corresponding RRPID (RRPID2) is also detected and recorded by the traffic monitoring system. The associated traffic monitoring data, TMD2, is also stored classified by the RRPID. At t5, a third request (REQ3) may be detected. In this case, an error in the response (RESP3) is detected by the traffic monitoring system at t6. For example, RESP3 may include an HTTP error response code (for example, HTTP 500-599 errors). As before, the corresponding RRPID (RRPID3) is detected and recorded, and the associated data, TMD3, is stored classified by RRPID3. TMD3 could provide further information regarding the defect, for instance. Moreover, a first defect identifier DID (DID1) which is triggered by RESP3 is also stored. Generally, the traffic monitoring system has the ability to assign identifiers to defects and incidents. Each DID can be created based on the evaluation of a single transaction instance which is made up of one or more transaction component instances, and one of the transaction component instances may have an RRPID attached to it. Further, an incident may be triggered from multiple occurrences of a defect, for instance, such that an IID can include a list of DIDs that make up an incident. In this example, an incident identifier (IID) is not triggered based on DID 1. Note that it is not necessary to store the requests and responses themselves as this would likely result in excessive overhead or data and security exposure.

Figure 16:
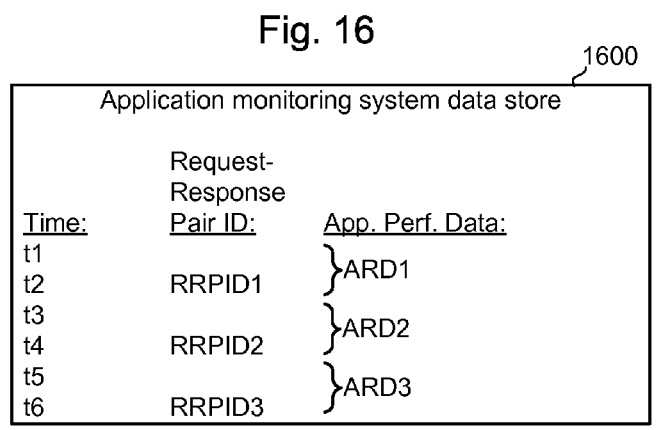
FIG. 16 is an example data structure of an application monitoring system data store.

FIG. 16 is an example data structure of an application monitoring system data store. The data structure 1600 is analogous to the data structure 1510 in that it includes time points (t1-t6) and associated RRPIDs. Additionally, application runtime data is stored, classified by RRPID. As mentioned, a given RRPID allows correlation of specific traffic monitoring data and application runtime data. In the data structure 1600, first application runtime data (ARD1) is stored classified to RRPID1 and the time range t1-t2, second application runtime data (ARD2) is stored classified to RRPID2 and the time range t3-t4 and third application runtime data (ARD3) is stored classified to RRPID3 and the time range t5-t6.

Figure 17:
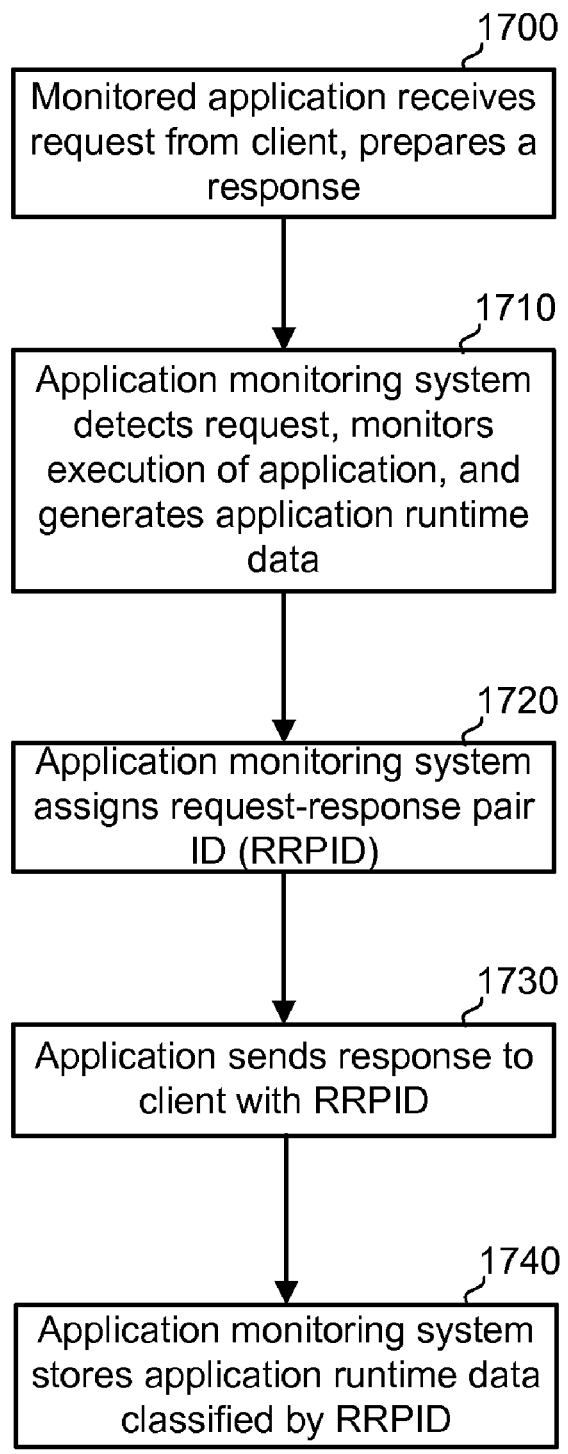
FIG. 17 is a flowchart of an embodiment of a process performed in providing application runtime data classified by request-response pair identifier.

FIG. 17 is a flowchart of an embodiment of a process performed in providing application runtime data classified by request-response pair identifier. The process can be performed when an application receives a request from a client. At step 1700, the monitored application receives a request from a client and prepares a response. At step 1710, the application monitoring system detects the request, monitors execution of the application and generates application runtime data. At step 1720, the application monitoring system assigns a RRPID to a request-response pair, for instance, and, at step 1730, the application sends a response (the response of the request-response pair) with the RRPID to the client. At step 1740, the application monitoring system stores the application runtime data classified by RRPID (see FIG. 16). Generally, the application monitoring system can determine whether the application runtime data is stored or discarded. Also, as mentioned, these steps are not necessarily discrete steps, as application runtime data may be generated and stored at any time.

Figure 18:
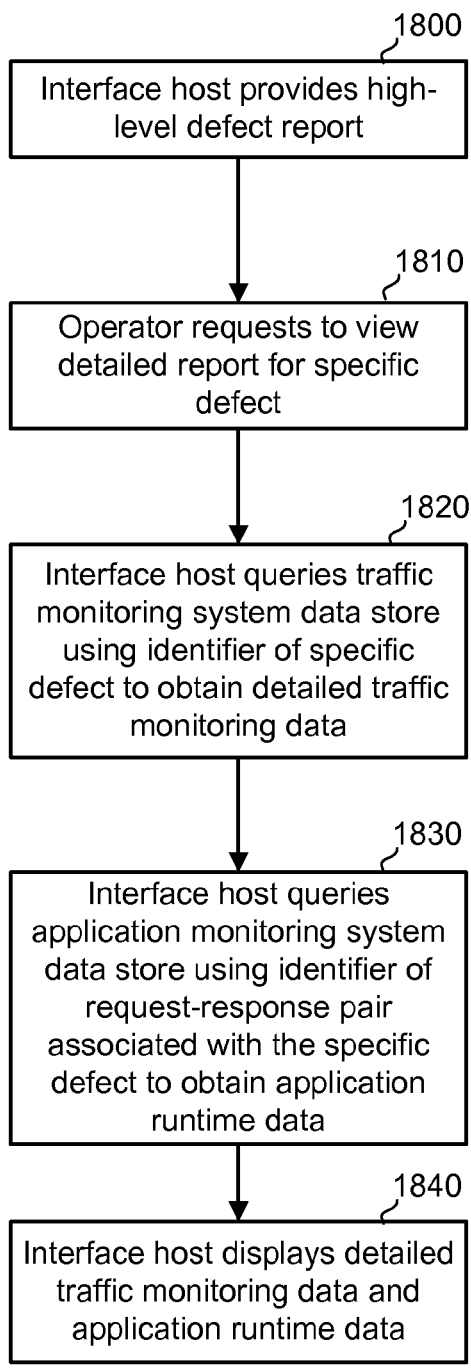
FIG. 18 is a flowchart of an embodiment of a process for displaying traffic monitoring data and application runtime data for a defect.
Figure 19:
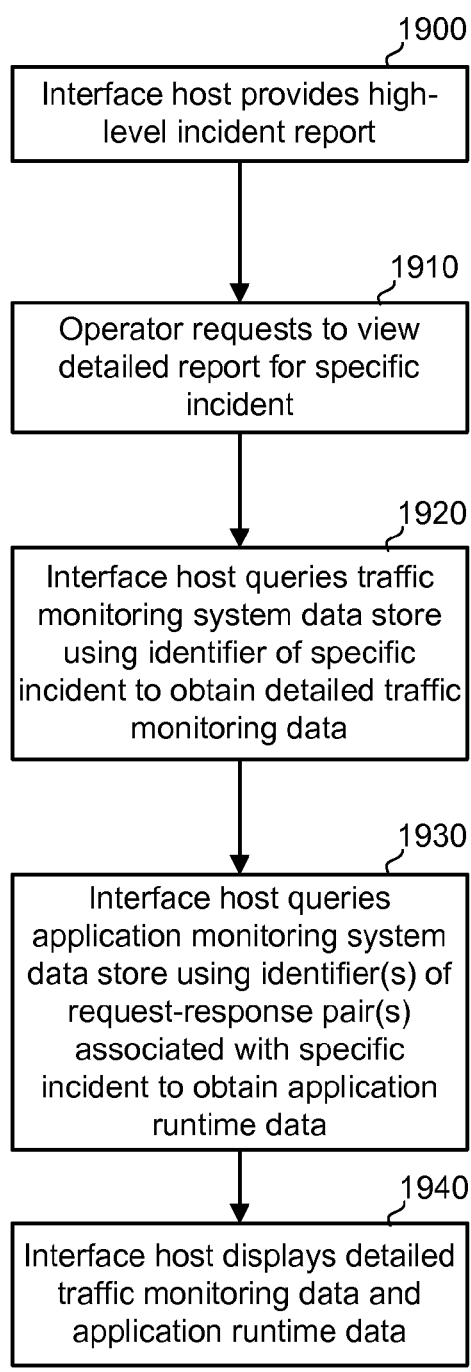
FIG. 19 is a flowchart of an embodiment of a process for displaying traffic monitoring data and application runtime data for an incident.

FIG. 18 is a flowchart of an embodiment of a process for displaying traffic monitoring data and application runtime data for a defect, and FIG. 19 is a flowchart of an embodiment of a process for displaying traffic monitoring data and application runtime data for an incident. The processes can be performed, e.g., in response to an operator input after traffic monitoring data and application runtime data have been gathered, typically for multiple transactions involving multiple clients. The information can be analyzed by the operator via the interface from time to time, e.g., as part of a periodic review process, or in response to detection of specific anomalous conditions by the system, such as defects or incidents, or complaints from system users, for instance.

Referring to FIG. 18, at step 1800, the interface host provides a high-level defect report. For example, FIG. 33 provides an example interface display 3300 which depicts a defect report list, which provides information regarding specific defects. The interface display 3300 provides a one-line listing of data for each defect, including a link which can be selected by the operator to view further detailed information for a specific defect. In FIG. 33, the traffic monitoring data in a row includes a date and time, an identifier of a business process, an identifier of a business transaction, a defect type and a limit, a value of a measured parameter, a business impact, login name, user group, client IP address, web server IP address and web server MAC address.

At step 1810, the operator enters a command to view a detailed report for a specific defect. For example, the operator may select link 3310 in the interface display 3300 of FIG. 33. When detailed defect information is requested, at step 1820, the interface host queries the traffic monitoring system data store using a defect identifier (DID) to obtain detailed traffic monitoring data. Further, at step 1830, the interface host queries the application monitoring system data store using the identifier (RRPID) of the request-response pair associated with the specific defect to obtain corresponding application runtime data. For example, this can be the request-response pair which was flagged as meeting a defect criterion. Recall that the traffic monitoring system can provide locally generated identifiers for defects and incidents while the application monitoring system can provide locally generate identifiers for request-response pairs which it shares with the traffic monitoring system.

Figure 34:
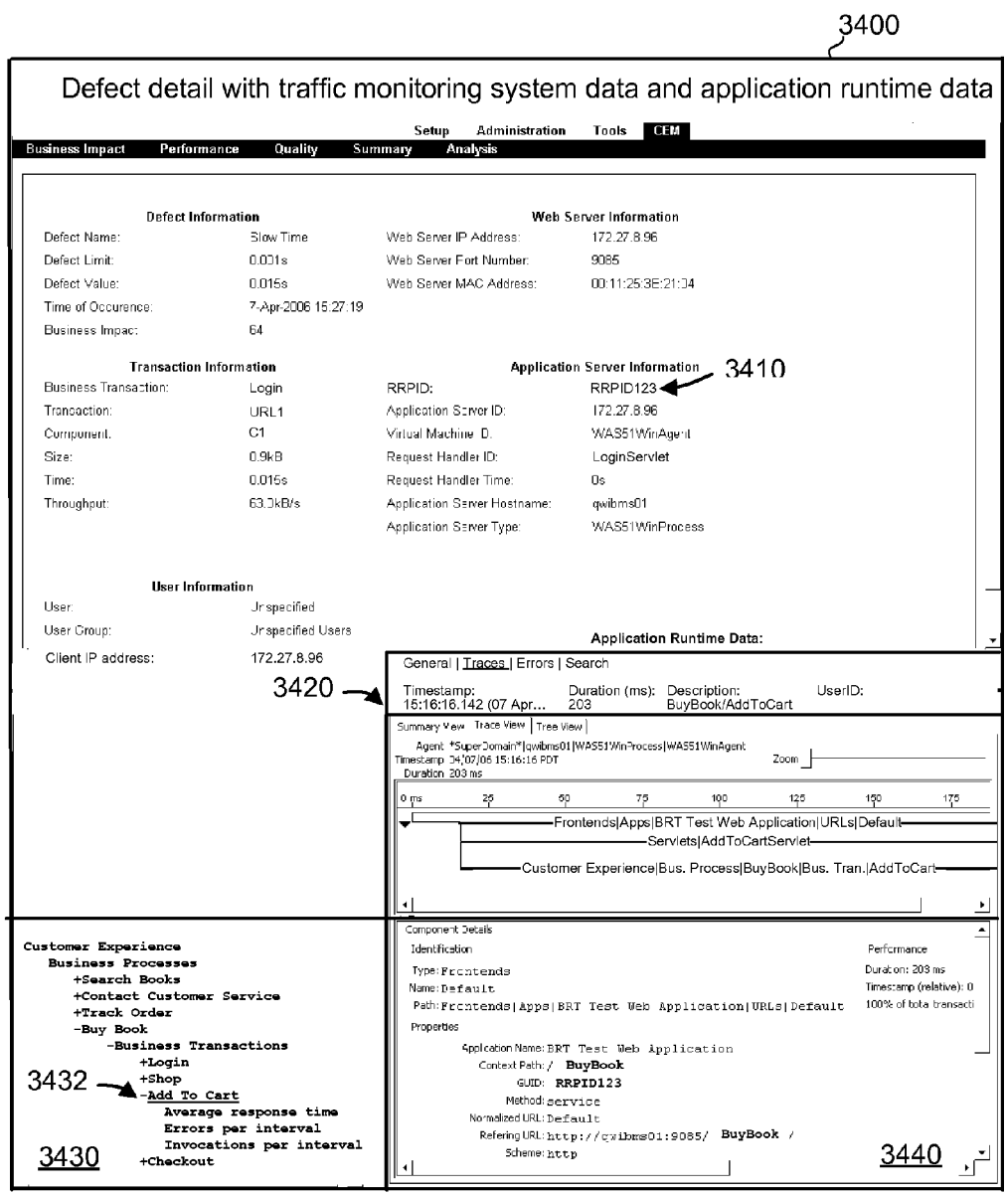
FIG. 34 is an example interface display which depicts details of a defect on the defect report list of FIG. 33, including both traffic monitoring data and application runtime data.

At step 1840, the interface host displays the detailed traffic monitoring data and application runtime data associated with the defect. For example, upon selection of the link 3310, the interface display 3400 of FIG. 34 can be provided. FIG. 34 is an example interface display which depicts details of a defect on the defect report list of FIG. 33. The interface display 3400 provides traffic monitoring data, e.g., defect information, web server information and transaction information, in addition to associated application runtime data.

Referring to FIG. 19, at step 1900, the interface host provides a high-level incident report. Recall that an incident can be associated with one or more defects. For example, the interface display 2900 of FIG. 29 depicts an incident report list which provides a one-line listing of traffic monitoring data for each incident, including an incident identifier (IID), which can be selected by the operator to view further detailed information for a specific incident, as indicated by the text "IID (click for detail)." The incident report list provides a status (e.g., open or closed), an impact level (e.g., low, moderate or severe), a business impact metric, an identifier of the business process, an identifier of the business transaction, the number of identified users, user groups and defects, the defect type, the time and date of the first and last occurrences of the incident and the duration.

At step 1910, if the operator requests to view a detailed report for a specific incident, for example, by selecting the link 2910 (FIG. 29), the interface host queries the traffic monitoring system data store using the incident identifier (IID) of the specific incident to obtain corresponding traffic monitoring data, at step 1920, and, at step 1930, the interface host queries the application monitoring system data store using the identifiers (RRPIDs) of the request-response pairs associated with the specific incident to obtain corresponding application runtime data. For example, the RRPIDs can be associated with the defects which are associated with the incident. At step 1940, the interface host displays the detailed traffic monitoring data and application runtime data. For example, FIG. 30 provides an example interface display 3000 which depicts details of an incident on the incident report list of FIG. 29. The interface display 3000 indicates the business process, business transaction and defect type for a particular incident with an incident identifier "001334," and includes additional details under the categories of "Impact," "Details" and "Problem Resolution Cycle" as indicated. The business process is denoted by "CE|Buy Book" where CE denotes the domain of "CE" ("Customer Experience") and "Buy Book" denotes the business process. "Add To Cart" denotes the business transaction.

Figure 31A:
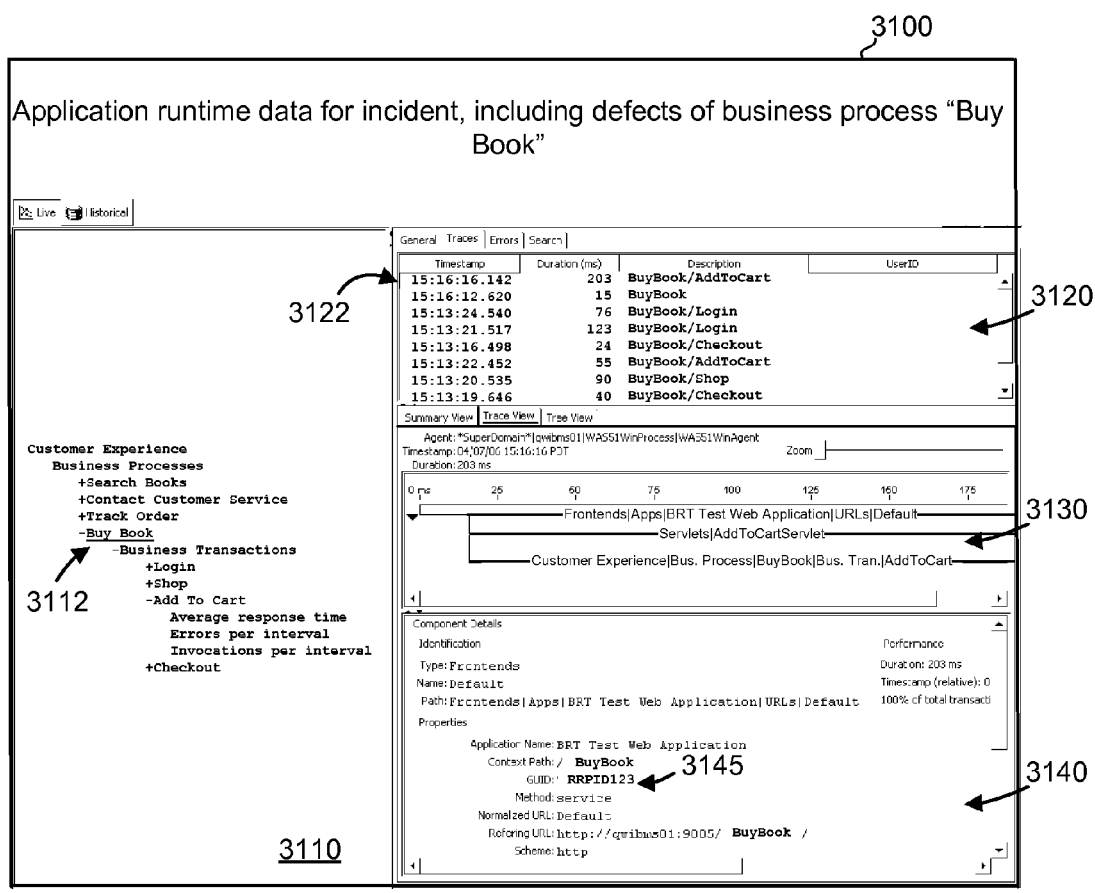
FIG. 31A is an example interface display which depicts application runtime data for an incident, including defects of a business process "Buy Book."

Further, the interface 3100 of FIG. 31A is provided upon selection of the link ("view") 3010 in FIG. 30 to selectively provide application runtime data for the defects associated with the incident. Thus, in this approach, the operator is first presented with traffic monitoring data for an incident and can subsequently drill down to obtain corresponding application runtime data for defects associated with the incident as desired. In another approach, both traffic monitoring data and corresponding application runtime data are presented together, e.g., as shown in the interface 3400 of FIG. 34.

As mentioned, the application runtime data which is provided corresponds to the selected traffic monitoring data. To illustrate this in a simplified manner, note that the first traffic monitoring data (TMD1) and the corresponding first application runtime data (ARD1) may both be accessed for the transaction having RRPID1 (see FIGS. 15 and 16).

Hierarchy For Characterizing Interactions With an Application

Further details are provided below regarding example implementations for characterizing interactions with an application according to a hierarchy.

Figure 20:
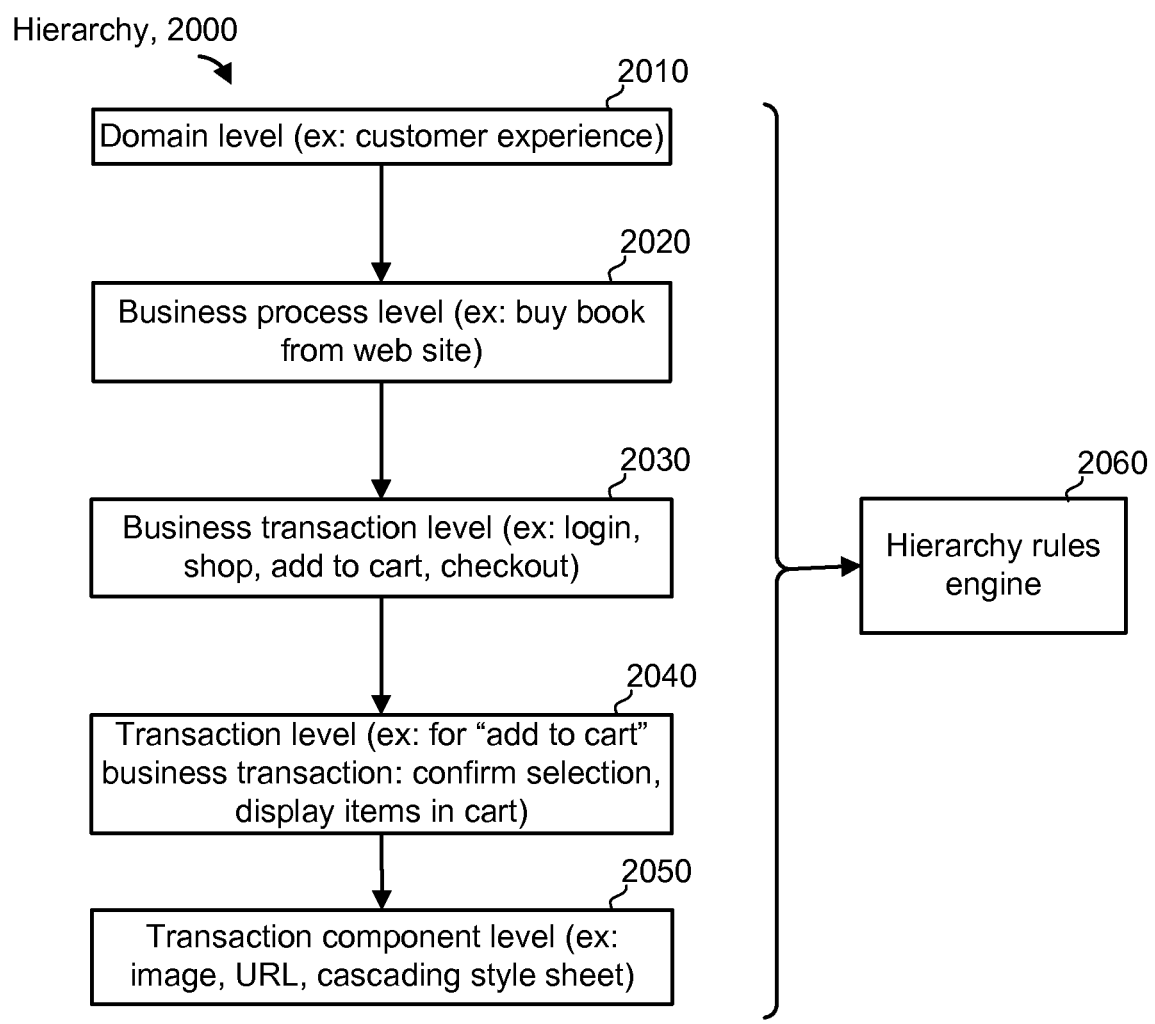
FIG. 20 depicts a hierarchy for characterizing interactions with an application with various degrees of breadth.

FIG. 20 depicts a hierarchy for classifying interactions with an application with various degrees of breadth. As mentioned, a hierarchy can be provided for classifying traffic monitoring data and/or application runtime data. The different levels of the hierarchy can be defined based on any desired organizational structure. For example, the hierarchy can include human-facing terminology, that is, terminology which facilitates understanding of client's interactions with a monitored application. In one approach, the different levels of the hierarchy characterize a client's interaction with an application from the client's perspective at various degrees of breadth, from a wide breadth at the higher levels to a more narrow breadth at the lower levels. Furthermore, the interaction may be viewed from a perspective of the client machine of a user or a machine such as a web server which is between a client machine and the application. Furthermore, the interactions can be classified according to multiple hierarchies to accommodate different organizational schemes. A hierarchy may encompass any type of interaction with an application, whether the interaction is in the realm of a for-profit business, such as for e-commerce transactions, educational organization or government organization, for instance. Further, the one or more hierarchies can include nodes at different levels of the one or more hierarchies, where each node has a descriptive name.

The example hierarchy 2000 includes five levels, although two or more levels can be used. A top level of the hierarchy is a domain level 2010 named "Customer Experience."

A next level of the hierarchy is a business process level 2020. An example of a business process is buying a book from a web site, for instance. Thus, "buy book" can be the name of a node at the business process level of the hierarchy. Other example business processes for a book-selling web site can include "Search Books," "Contact Customer Service," and "Track Order." Another example of a business process involves employees enrolling in a benefits program, in which case the business process node of the hierarchy can be named, e.g., "Enroll in benefits". A specific instance of the business process class occurs, e.g., when a particular user enrolls in a benefits program.

A next level of the hierarchy is a business transaction level 2030. A business process can be made up of a number of business transactions. For example, for the business process of buying a book from a web site, the business transactions can include business transactions of logging in to the web site, such as by entering a user id and password, shopping on the web site, such as by viewing different items for sale, adding a selected item to a shopping cart, and completing a checkout process, such as by entering payment and shipping information. Thus, "Login," "Shop," "Add To Cart" and "Checkout" can be the names of nodes of the business transaction level of the hierarchy. Specific instances of the business transaction classes occur when a specific users logs in to a web site, shops on the web site, adds a selected item to a shopping cart, and completes a checkout process.

A next level of the hierarchy is a transaction level 2040. A business transaction can be made up of a number of individual transactions. For example, the class of business transactions named "Add To Cart" may include classes of transactions named "confirm selection" and "display items in cart." Specific instances of the transaction classes occur when a particular user performs a "confirm selection" transaction and a "display items in cart" transaction. In one approach, each transaction is associated with a web page. For example, a first web page may ask the user to confirm his or her selection and a second web page may display the items in the cart. In another example, a "checkout" business transaction may include transactions for confirming a purchase, entering payment information and entering shipping information.

A bottom level of the hierarchy is a transaction component level 2050. A transaction can be made up of one or more transaction components, such as components of a web page. These components can include, e.g., images (e.g., .gif files), cascading style sheets (e.g., .css files), JavaScript code components (e.g., .js files) and so forth.

A hierarchy rules engine 2060 can be used to implement the hierarchy 2000. The rules engine defines the nodes of the hierarchy, including an identifier and a name for each node, along with other relevant information which characterizes a node. A rules engine can be used by either or both of the traffic monitoring system and the application monitoring system for classifying traffic monitoring data and application runtime data, respectively (see, e.g., FIGS. 15 and 16). Moreover, the rules engine of the application monitoring system may be a modified version of that used by the traffic monitoring system. For example, the hierarchy defined by the rules engine used by the application monitoring system generally can correspond to the hierarchy 2000 but can have fewer or more hierarchical levels, and the definition of each level can vary as well. In one approach, the rules engine of the application monitoring system simplifies the hierarchy 2000 to include levels 2010, 2020, 2030 and 2040. Generally, the traffic monitoring system and the application monitoring system may use the same or different rules engines, and the hierarchies of the rules engines may be the same or different.

Detailed information regarding one possible embodiment of the rules engine 2060 is provided in the section titled "Example pseudo-code listing for rules engine" at the end of this specification. See also FIG. 25. Thus, the rules engine can be generated by the traffic monitoring system for use in classifying the traffic monitoring data, and provided to the application monitoring system where it is adapted for use in classifying the application runtime data. Or, the application monitoring system can be configured with a rules engine which is not derived from that of the traffic monitoring system.

Figure 21:
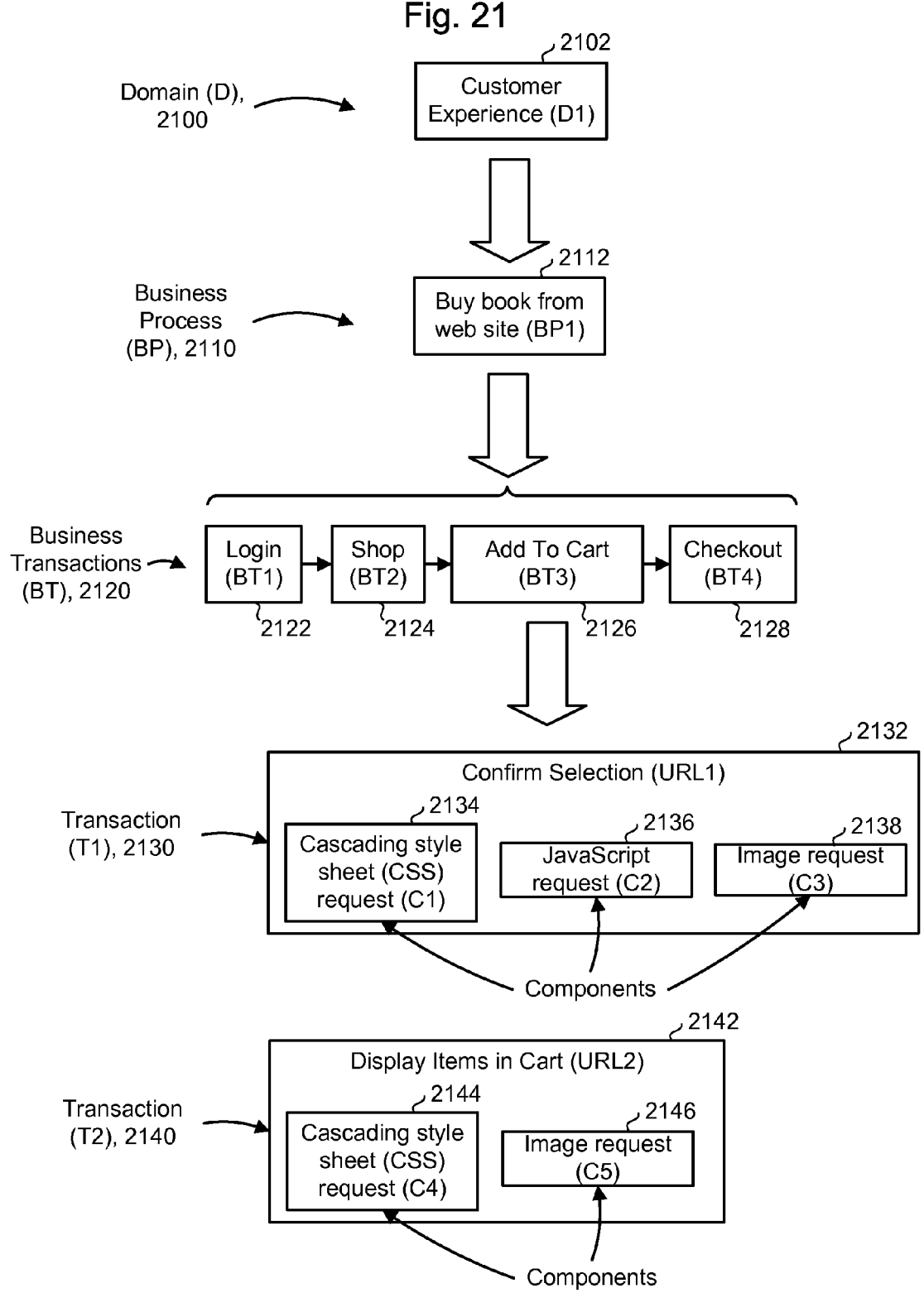
FIG. 21 depicts details of an example hierarchy for the business process of buying a book from a web site.

FIG. 21 depicts details of an example hierarchy for the business process of buying a book from a web site. A specific example of the hierarchy 2000 of FIG. 20 is provided based on a business model which models the steps a user typically performs in buying a book from the web site. The domain (D) level 2100 includes a "Customer Experience" (CE) class (D1) 2102. The business process (BP) level 2110 includes a class 2112 for buying a book from the web site. The business transaction (BT) level 2120 includes a class for "Login" 2122, a class for "Shop" 2124, a class for "Add To Cart" 2126 and a class for "Checkout" 2128. An instance of the class for "Add To Cart" 2126, for instance, includes a number of individual transactions 2130 and 2140. For example, transaction 2130 ("confirm selection") includes a web page request 2132 such as a first URL (URL1) which includes a number of example components, e.g., a cascading style sheet request 2134, a JavaScript component request 2136 and an image request 2138. Another transaction 2140 ("display items in cart") similarly includes a web page request 2142 such as a second URL (URL2) which includes example components, e.g., a cascading style sheet request 2144 and an image request 2146. Additional transactions may be included as well.

The rules engine can define how to identify a transaction component based on the characteristics of a request-response pair. In one approach, the request can be analyzed by the rules engine at the traffic monitoring system and/or the application monitoring system to determine the level of the hierarchy to which traffic monitoring data or application runtime data, respectively, belongs. For example, some levels of the hierarchy can be associated with a sequence of multiple requests, e.g., the domain 2010, business process levels 2020, business transaction level 2030 and the transaction level 2040 (FIG. 20) while other levels can be associated with a single request, e.g., the transaction component level 2050. The rules engine can also define how to identify the transaction, business transaction, business process and domain for the request once the transaction component is known. For further details, see the section titled "Example pseudo-code listing for rules engine" at the end of this specification.

At the application monitoring system, the entry point to the application can be an invocation of a component such as a Java servlet or JSP. In one approach, an agent at the application obtains the request for the component invocation and uses the set of rules defined in the rules engine to determine one or more transaction component, transaction, business transaction, business process and domain. Since each component invocation is evaluated by the rules engine, this should be done in a high-performance way. In particular, a configuration file can be parsed once to create an in-memory rules engine that operates as follows:

1. For every component invocation, obtain the characteristics of the associated request, such as (a) URL host name and port, b) URL parameters, c) HTTP post parameters, d) cookie parameters, e) session manager parameters and others.

2. Given these request characteristics, the rules engine determines the business transaction and business process to which the request and hence, the component invocation, belongs.

3. The rules engine logic to identify the transaction component can be implemented as a sorted set of regular expressions—one regular expression for each possible transaction component. For each request, the rules engine starts matching against this set of regular expressions one-by-one. The first match identifies the transaction component to which the request belongs.

4. The rules engine logic to identify the transaction, business transaction, business process and domain can be implemented as an in-memory tree. The configuration file is parsed to create a tree of the hierarchy, including the transaction component level, the transaction level, the business transaction level, the business process level and the domain level. Once the transaction component is known for a request, the tree can be traversed to determine the levels of the hierarchy to which the component is classified.

Figures 22, 23, 24:
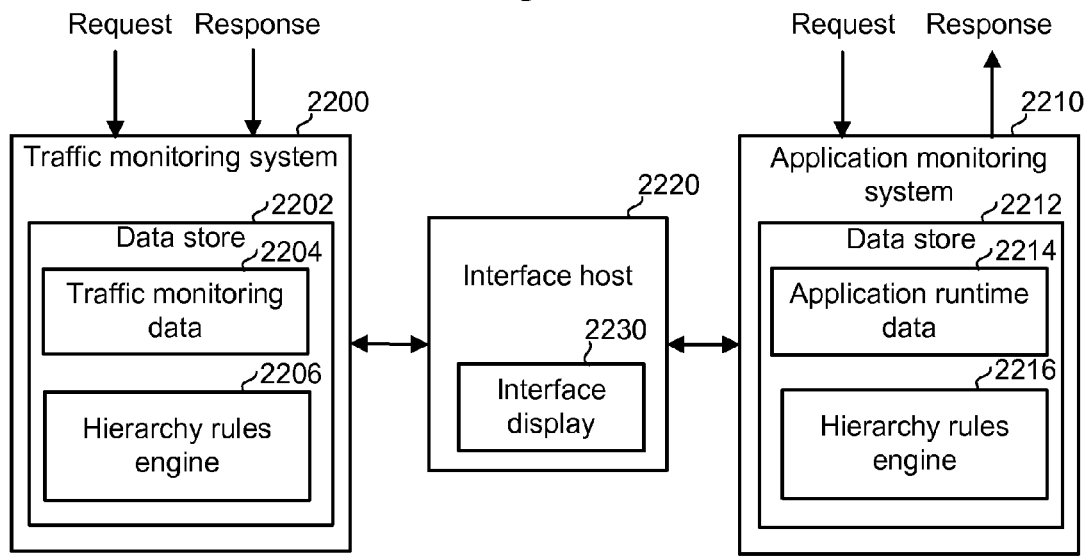
FIG. 22 is a block diagram of an embodiment of a system for classifying traffic monitoring data and application runtime data based on a hierarchy.
FIG. 23 is an example data structure of a traffic monitoring system data store which stores traffic monitoring data classified by a hierarchy.
FIG. 24 is an example data structure of an application monitoring system data store which stores application runtime data classified by a hierarchy.

FIG. 22 is a block diagram of an embodiment of a system for classifying traffic monitoring data and application runtime data based on a hierarchy. The traffic monitoring data and/or application runtime data can be selectively displayed or otherwise output according to one or more levels of the hierarchy. The arrangement shown is analogous to that of FIG. 14 but adds hierarchy rules engines 2206 and 2216 for the traffic monitoring system 2200 and the application monitoring system 2210, respectively. In particular, the traffic monitoring system 2200 includes a data store 2202 in which the traffic monitoring data 2204 and hierarchy rules engine 2206 are stored. Optionally, the hierarchy rules engine 2206 can be provided at another location which is accessible to the traffic monitoring system 2200. The application monitoring system 2210 includes a data store 2212 in which the application runtime data 2214 and hierarchy rules engine 2216 are stored. Or, the hierarchy rules engine 2216 can be provided at another location which is accessible to the application monitoring system 2210. Optionally, the traffic monitoring system 2200 and the application monitoring system 2210 can access a common hierarchy rules engine, or they can access respective rules engines with the same rules. The interface host 2220 includes an interface display 2230 as discussed previously in connection with FIG. 14. First and second hierarchies for classifying traffic monitoring data and the application runtime data can include at least one shared hierarchical level, the first hierarchy can include at least one hierarchical level which is not shared with the second hierarchy and the second hierarchy can include at least one hierarchical level which is not shared with the first hierarchy.

FIG. 23 is an example data structure of a traffic monitoring system data store which stores traffic monitoring data classified by a hierarchy. The data structure 2300 classifies traffic monitoring data (TMD) to one or more levels of the hierarchy. For example, first TMD (TMD-A) can be classified to a component C1, a transaction T1, a business transaction BT3, a business process BP1 and a domain D1. Similarly, TMD-B can be classified to the component C2, the transaction T1, the business transaction BT3, the business process BP1 and the domain D1. TMD-C can be classified to the component C3, the transaction T1, the business transaction BT3, the business process BP1 and the domain D1. In practice, some of levels of the hierarchy can be bound to one another so that each level of the hierarchy need not be specified for each entry in the data store 2300. For example, recall from the discussion regarding step 102 of FIG. 1B that transaction components can be bound to transactions, transactions can be bound to business transactions, business transactions can be bound to business processes, and business processes can be bound to a domain. Binding may be accomplished through a simple table lookup, where a list of transaction components is related to a transaction, for example. Another example of a binding mechanism may be through such a list used in conjunction with a session identifier, where only transactions or transaction components sharing a common session identifier may be bound together. Also, a transaction component may itself be a transaction and require no component-to-transaction binding.

For example, for the business process (BP1) of buying a book from a web site (FIG. 21), different request-response pairs can be classified according to the different business transactions BT1, BT2, BT3 and BT4, and different individual transactions within the business transactions. Additionally, as mentioned, a request-response pair can be classified according to multiple hierarchies. As a result, traffic monitoring data can be selectively accessed, e.g., via an interface display, for transactions that are associated with a specific level of the hierarchy, or multiple levels of the hierarchy. Also, the specific level of the hierarchy to which traffic monitored data is classified can be indicated.

Similarly, for a second transaction (T2) under the business transaction BT3, fourth TMD (TMD-D) can be classified to a component C4, the transaction T2, the business transaction BT3, the business process BP1 and the domain D1, and fifth TMD (TMD-E) can be classified to a component C5, the transaction T2, the business transaction BT3, the business process BP1 and the domain D1.

FIG. 24 is an example data structure of an application monitoring system data store which stores application runtime data classified by a hierarchy. The data store 2400 classifies application runtime data (ARD) to one or more levels of the hierarchy. For example, using the notation of the example hierarchy of FIG. 21, first application runtime data (ARD-A) can be classified to the transaction Ti, the business transaction BT3, the business process BP1 and the domain D1. Similarly, second application runtime data (ARD-B) can be classified to the transaction T2, the business transaction BT3, the business process BP1 and the domain D1. Note that the transaction component level of the hierarchy is not included in the application monitoring system data store in the present example as this level is deemed to be too granular.

Additionally, a given set of ARD can be classified to different elements of a hierarchy, and different sets of ARD can be classified to the same element of a hierarchy. For example, for the business process of buying a book from a web site (FIG. 21), different sets of ARD can be classified to the business transaction BT1, or one set of ARD can be classified to BT1, BT2, BT3 and BT4. Additionally, as mentioned, ARD can be classified according to multiple hierarchies. As a result, application runtime data can be selectively accessed for transactions that are associated with a specific level of a hierarchy (see FIGS. 31A, 31B, 32 and 34).

Figure 25:
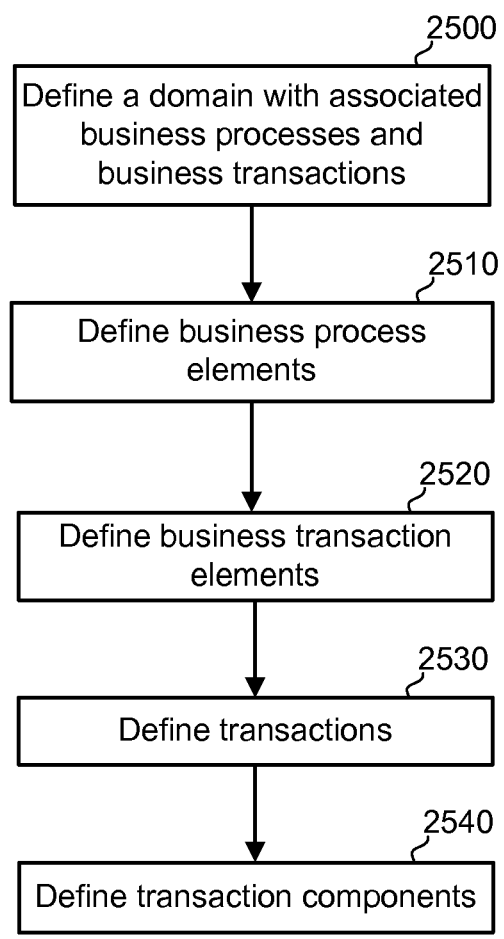
FIG. 25 is a flowchart of an embodiment of a process for generating a hierarchy rules engine.

FIG. 25 is a flowchart of an embodiment of a process for generating a hierarchy rules engine. An operator can perform the steps indicated using an appropriate software tool to generate a configuration file such as an XML file used to provide a rules engine. In another approach, the XML configuration file can be developed directly by a programmer.

Referring also to the section titled "Example pseudo-code listing for rules engine" at the end of this specification, at step 2500, a domain is defined in addition to business processes and business transactions which are bound to the domain. A domain element can include various elements including an identifier attribute, a domain name, documentation information (e.g., version and timestamp), a private parameter list which includes a sequence of private parameter elements (which can include parameter names such as passwords whose values should not be displayed), an application definition list which includes a sequence of application definition elements (for describing a web application using elements for matching a user login, session id and business transaction elements), and a business process list which includes a sequence of business process elements.

The application definition elements can include an identifier attribute, a name attribute used for logging, an application type attribute, a login definition list (a sequence of elements, any one of which can be used to match a user login), a session definition list (a sequence of elements, any one of which can be used to match a session id) and a business transaction definition list (a sequence of elements which describes a business transaction associated with the domain). In particular, a login definition element describes how to recognize a user login, and includes a non-empty sequence of parameter definition elements, which may not have a "value" attribute. Every parameter in the list must match observed data in order to recognize a user login. A session definition element describes how to recognize a user session, and includes a non-empty sequence of parameter definition elements, which may not have a "value" attribute. Every parameter in the list must match observed data in order to recognize a session id.

At step 2510, the business process elements are defined. Each business process element can include an identifier attribute and a name attribute used for logging.

At step 2520, the business transaction elements are defined. A business transaction element can include an identifier attribute, an incarnation identifier attribute, a name attribute used for logging, an importance attribute, an identifier of a business process with which the business transaction is associated or bound, a transaction definition list and a defect definition list. The transaction definition list can include a non-empty sequence of transaction elements, the first of which may identify the business transaction. The defect definition list can include a sequence of defect definition elements.

At step 2530, one or more transactions are defined. A transaction element can include an identifier attribute, a name attribute used for logging, an attribute that determines whether statistics are reported, an attribute that determines whether the transaction element is cacheable (this should be false for the first transaction in a business transaction), a count attribute that indicates how many times the transaction element is expected to be found, a transaction component list and a defect definition list. The transaction component list includes a non-empty sequence of transaction component elements, the first of which may identify the transaction, while the defect definition list includes a sequence of defect elements.

At step 2540, one or more transaction components are defined. A transaction component element, which can be a request-response pair element, can include an identifier attribute, a name attribute used for logging, an attribute that determines whether statistics are reported, an attribute that determines whether the transaction element is cacheable (this should be false for the first transaction component in a transaction), a count attribute that indicates how many times the transaction component element is expected to be found, a parameter definition list and a defect definition list.

The parameter definition list includes a sequence of parameter definition elements which describe parameters which can be used for identifying transaction components or logins. A parameter definition element can include a type attribute, an operator attribute, a name attribute, a value attribute, an offset attribute and a length attribute. The type attribute can include a query parameter which is matched against query parameters in a URL, a cookie parameter which is matched against Cookie: and Set-Cookie: headers, a post parameter which is matched against data in an HTTP post, a URL parameter, a session manager parameter, a parameter extracted from NTLM authentication (an authentication protocol used in various Microsoft network protocol implementations) and a parameter extracted from HTTP Basic Authentication (RFC 2617). The operator attribute specifies the relation that must hold between the value attribute and the observed data in order for this parameter to match the data. The value attribute is used with the name attribute for identifying transaction components. The offset attribute specifies how many characters at the beginning of the observed data are to be skipped when matching against the string in the value attribute. The length attribute specifies how many characters of the observed data (after skipping the number of characters specified by the offset attribute) are matched against the string in the value attribute.

The defect definition list includes a sequence of defect definition elements which can include an identifier attribute, an importance attribute, a defect type attribute and a defect value attribute. Defect definition elements can be generated for transaction components, transactions or transaction definitions, in one approach.

Figure 26:
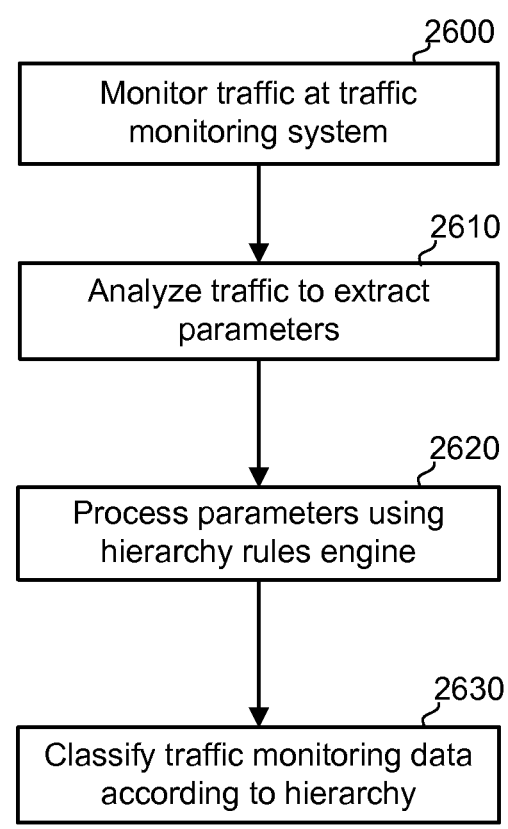
FIG. 26 is a flowchart of an embodiment of a process performed by a traffic monitoring system for classifying traffic monitoring data.

FIG. 26 is a flowchart of an embodiment of a process performed by a traffic monitoring system for classifying traffic monitoring data. The transaction definitions, once they have been developed and deployed in a rules engine, for instance, (FIG. 25), can be used by the traffic monitoring system to classify traffic monitoring data according to a hierarchy. For example, classifying a transaction to a transaction definition in the hierarchy results in classifying the transaction as well to higher levels of the hierarchy to which the transaction definition has been associated when the hierarchy was defined. As a result, the data store 2300 (FIG. 23) can be provided in which traffic monitoring data (TMD) is classified to one or more levels of the hierarchy. Information for new transactions can be added to the data store 2300 as the transactions are detected. Further, information regarding multiple transactions can be aggregated to provide aggregated traffic monitoring data which is classified according to the hierarchy.

In particular, at step 2600, the traffic is monitored at the traffic monitoring system such as to detect a request and an associated response. At step 2610, the traffic is analyzed to extract information such as HTTP parameters, e.g., URL, cookie, post and query name/value pairs from both the request header and request content. At step 2620, the parameters are processed using the hierarchy rules engine, such as by comparing the parameters to the transaction definitions in the hierarchy rules engine to locate matching transaction definitions. At step 2630, the traffic monitoring data is classified according to the hierarchy. For example, data can be stored in the traffic monitoring system data store (FIG. 23) classifying the traffic monitoring data to a transaction definition (and to the associated business transaction, business process and domain).

Figure 27:
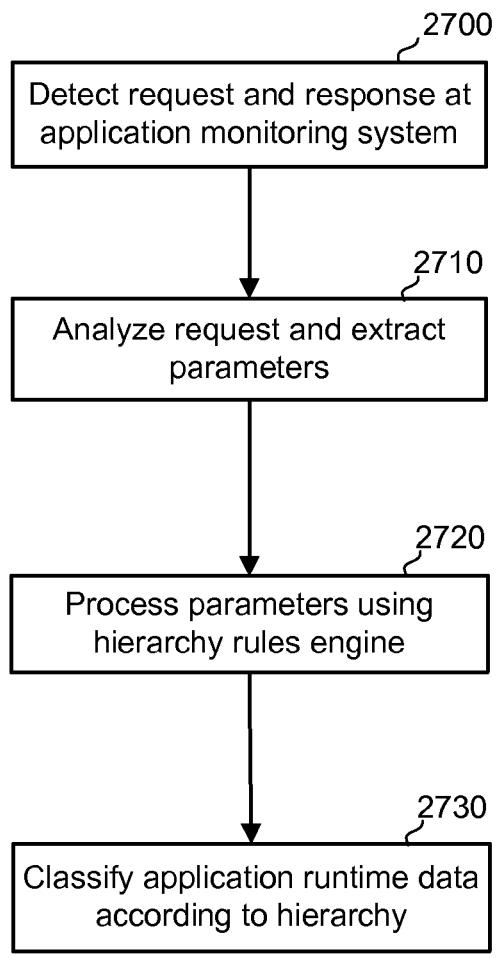
FIG. 27 is a flowchart of an embodiment of a process performed by an application monitoring system for classifying application runtime data.

FIG. 27 is a flowchart of an embodiment of a process performed by an application monitoring system for classifying application runtime data. A process analogous to that of FIG. 26 can be conducted by the application monitoring system. In particular, at step 2700, a request and an associated response are detected at the application monitoring system. At step 2710, the request is analyzed to extract information such as HTTP parameters, e.g., URL, cookie, post and query name/value pairs from both the request header and request content. At step 2720, the parameters are compared to the transaction definitions in the hierarchy rules engine to locate matching business transaction definitions. As mentioned, the hierarchy rules engine used by the application monitoring system can vary from that used by the traffic monitoring system. In one example, the hierarchy rules engine used by the application monitoring system includes the transaction, business transaction, business process and domain levels of the rules engine used by the traffic monitoring system, but not the transaction component level. The granularity of the classifying of the application runtime data to the hierarchy is therefore at the transaction level. The granularity of the classifying which is configured should reflect a balance between the need to avoid excessive amounts of overhead data and the need to associate the application runtime data with detailed levels of the hierarchy. At step 2730, the application runtime data is classified according to the hierarchy. Further, information regarding multiple request and responses can be aggregated to provide aggregated application runtime data which is classified according to the hierarchy.

Figure 28:
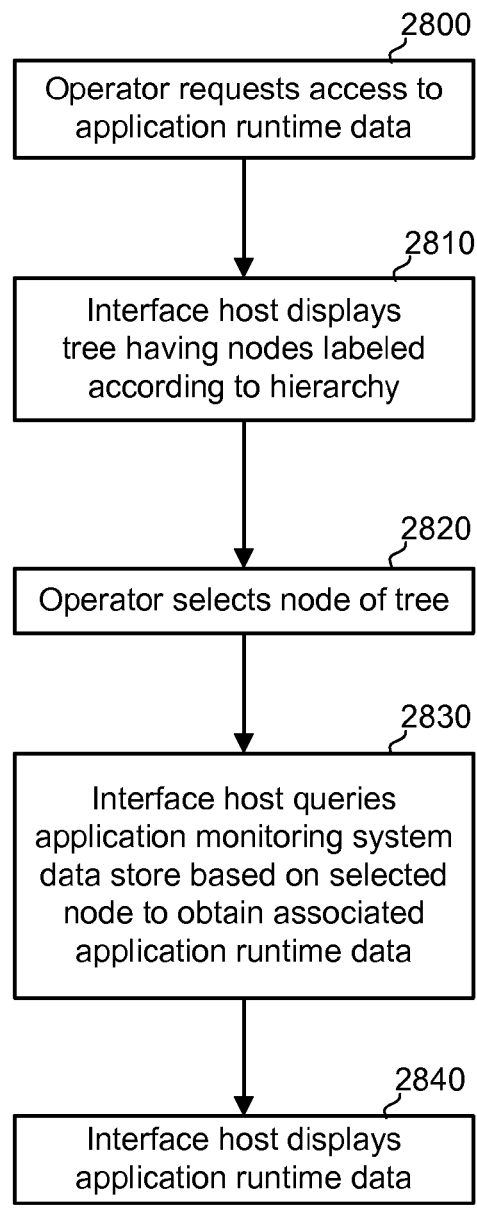
FIG. 28 is a flowchart of an embodiment of a process performed by an operator in selectively displaying application runtime data by selecting a node of a tree in an interface.
Figure 31B:
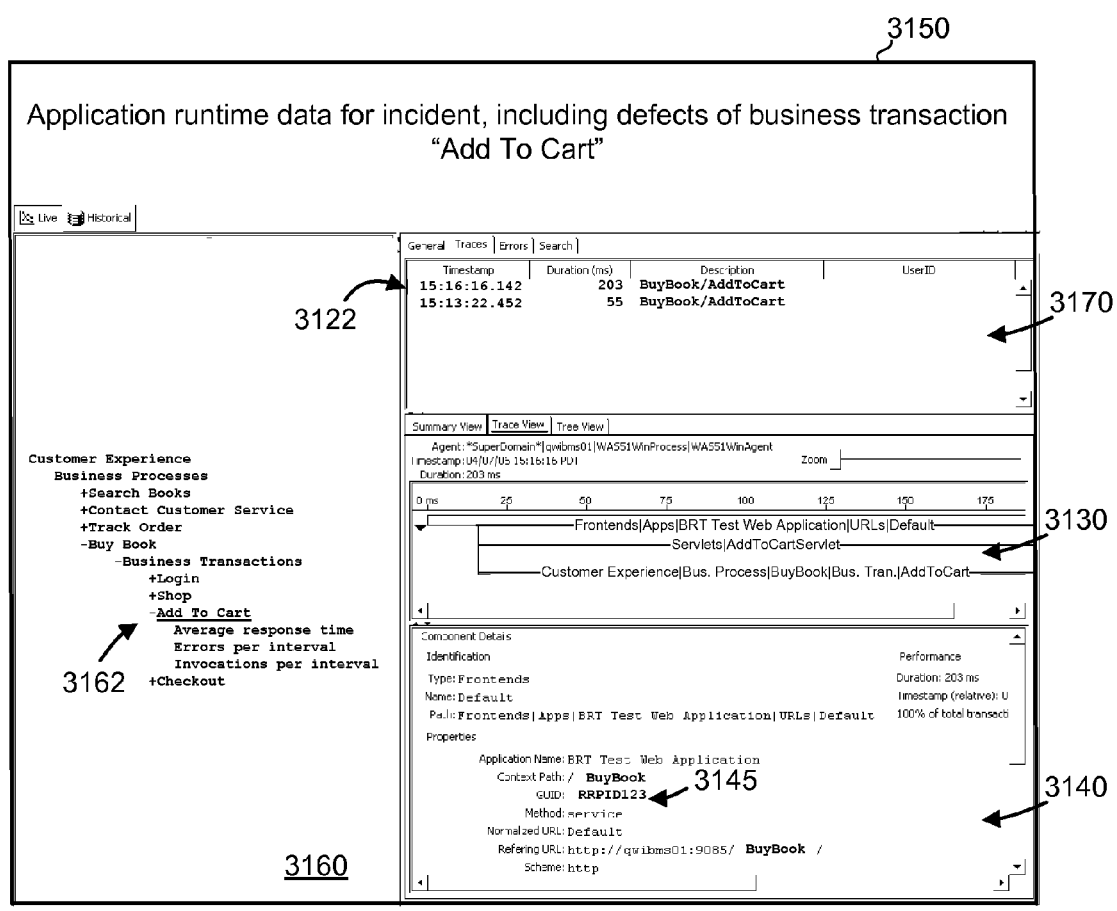
FIG. 31B is an example interface display which depicts application runtime data for an incident, including defects of a business transaction "Add To Cart."
Figure 32:
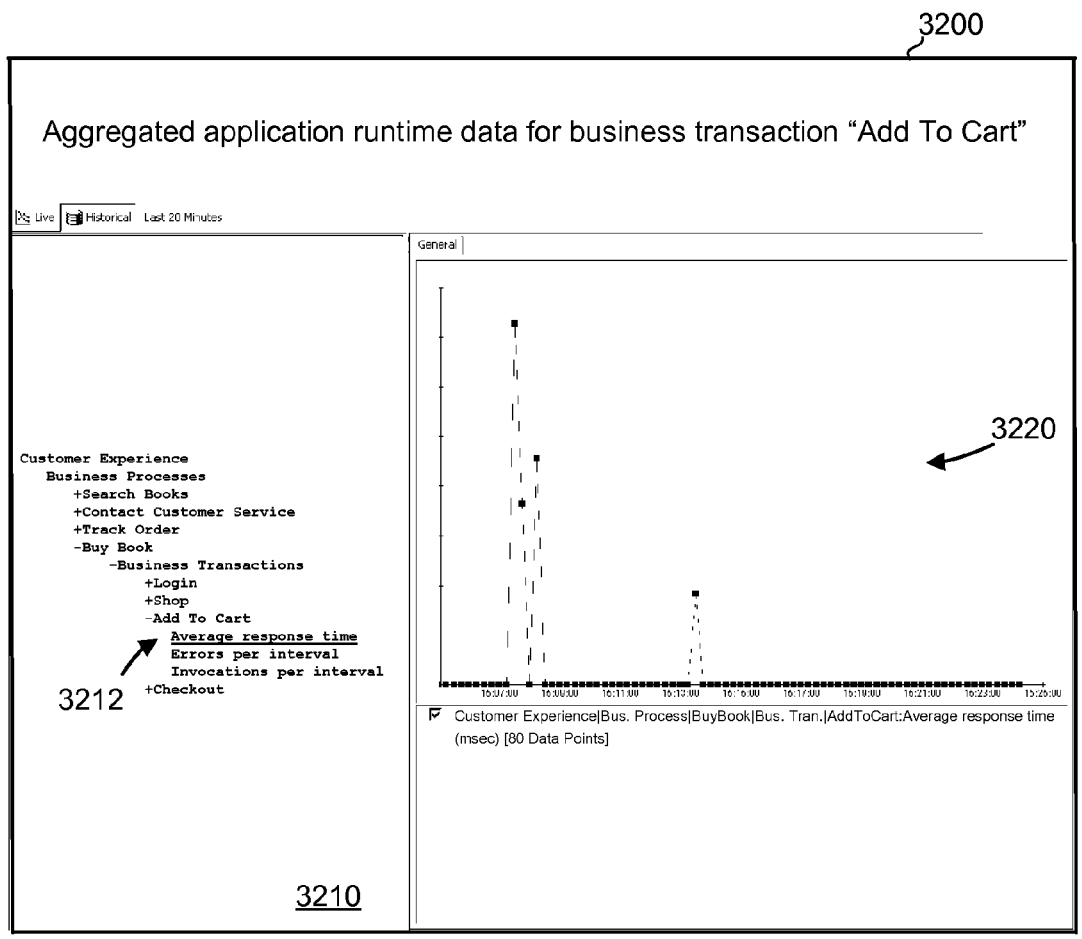
FIG. 32 is an example interface display which depicts aggregated application runtime data for a business transaction "Add to Cart."

FIG. 28 is a flowchart of an embodiment of a process performed by an operator in selectively displaying application runtime data by selecting a node of a tree in an interface. Referring also to the interfaces of FIGS. 31A, 31B and 32, a tree in the display regions 3110, 3160 and 3210, respectively, can be provided which includes user-selectable nodes of the hierarchy. Based on selection of a node by an operator, corresponding traffic monitoring data or application runtime data can be displayed. For example, display regions 3120, 3130, and 3140 of FIG. 31A provide application runtime data for a selected "Business Process" node named "Buy Book". In particular, display region 3120 indicates a timestamp and duration for different business transactions associated with the "Buy Book" business process. The business transactions may be associated with defects, for instance. Display regions 3170, 3130, and 3140 of FIG. 31B provide application runtime data for a selected "Business Transaction" node named "Add To Cart". In particular, display region 3170 indicates a timestamp and duration for different business transactions associated with the "Add To Cart" business process. Display region 3220 of FIG. 32 provides aggregated application runtime data for a selected "average response time" node which is under the selected "Business Transactions" node named "Add to Cart".

In particular, at step 2800 (FIG. 28), the operator requests access to application runtime data. For example, the operator may select the link 3010 in FIG. 30 to obtain application runtime data for an incident. At step 2810, the interface host displays a tree having nodes which are labeled according to the hierarchy (e.g., display regions 3110, 3160 and 3210). At step 2820, the operator selects a node of the tree. In response, at step 2830, the interface host queries the application monitoring system data store based on the selected node (e.g., a selected level of the hierarchy) to obtain the associated application runtime data. The data store can access the data by filtering based on the provided parameters, e.g., hierarchical level. Filtering based on RRPID can also be used. At step 2840, the interface host displays the resulting application runtime data. Optionally, aggregated data classified to one or more levels of the hierarchy can also be obtained and displayed. The above-described processes can be understood further in view of the following discussion.

Example User Interface Displays

The following example interfaces can be provided for use by an operator or other person to obtain information from the traffic monitoring system and/or the application monitoring system.

FIG. 29 is an example interface display which depicts an incident report list of a traffic monitoring system. In particular, the display 2900 provides a list of open incidents for all business processes. Drop down lists allow the operator to configure the display by selecting the status of the incidents, e.g., open or closed, and a particular business process with which the incidents are associated. The drop down lists are currently set to "open" (for status) and "all" (for business processes). Furthermore, a tab menu allows the operator to select incidents, impact maps, impact leaders, and defects. The tab "Incidents" is currently selected. As mentioned, an incident can be set when one or more associated defects are set, indicating, e.g., that a problem is present which requires the attention of the operator. The display 2900 lists information for four incidents in corresponding rows. Each row includes an incident identifier (IID), a status, an impact level, a business impact metric, an identifier of the business process, an identifier of the business transaction, the number of identified users, user groups and defects, the defect type, the time and date of the first and last occurrences and the duration. Information can be sorted by each column header. For example, the first row indicates that the IID is "001334," the status is "open," the impact level is "moderate," the business impact metric is "3,216," the business process is "CE|Buy Book" and the business transaction is "Add To Cart." "CE" denotes the "Customer Experience" domain 2010 (FIG. 20), "Buy Book" denotes the business process and "Add To Cart" denotes the business transaction. Further, the number of identified users is zero, the number of user groups is zero, the number of defects is fifty one, the defect type is "Slow Time," the time and date of the first occurrence is "7-Apr-2006 11:17," the time and date of the last occurrence is "7-Apr-2006 15:32" and the duration is "04:15" in hours and minutes.

The display 2900 thus provides traffic monitoring data which is classified to one or more levels of a hierarchy, e.g., business process and business transaction levels for multiple incidents, e.g., four incidents in the example provided. Moreover, in the particular example provided, the identifiers of the incidents are links which can be selected by the operator to open a new window of information for a specific incident. For example, the IID in the first row "001334" is a link 2910 that can be selected to open the display 3000 of FIG. 30, e.g., to drill down to obtain further detailed information for the specific incident.

FIG. 30 is an example interface display which depicts details of an incident on the incident report list of FIG. 29, in addition to a link 3010 to application runtime data (FIG. 31A). The display 3000 indicates the business process, business transaction and defect type for a particular incident with an IID of "001334". See the text at area 3005, which reads: "Business Process: CE|Buy Book—Business Transaction: Add To Cart—Defect Type: Slow Time." This information is carried over from the interface 2900. The display 3000 provides traffic monitoring data for an incident which is classified to one or more levels of the hierarchy, e.g., the business process and business transaction levels. Further, the display 3000 allows the operator to enter information regarding the incident. For example, the date the incident was closed can be entered along with other relevant information such as the cause and resolution of the incident. The display 3000 includes additional details under the categories of "Impact," "Details" and "Problem Resolution Cycle" as indicated. Under the category of "Impact," a link 3010 ("View") allows the operator to view application runtime data which is associated with the incident. The display 3100 of FIG. 31A opens when the link 3010 is selected.

FIG. 31A is an example interface display which depicts application runtime data for an incident, including defects of a business process "Buy Book." The display 3100 includes a region 3110 which represents the hierarchy as a tree with selectable nodes. Under the "Customer Experience" domain, example business processes which are provided include "Search Books," "Contact Customer Service," "Track Order" and "Buy Book." Also, example business transactions which make up the business process of "Buy Book" are provided, including "Login," "Shop," "Add To Cart" and "Checkout." In this example, the node 3112 for the business process of "Buy Book" is selected by the operator using a mouse or other pointing device, for instance. Further, the region 3120 includes information for each of the defects which are associated with the incident. In this example, the first listed defect 3122 is selected, e.g., by the operator. Or, the first listed defect 3122 can be selected automatically. The display regions 3130 and 3140 provide application runtime data for the selected defect and hierarchy level. The application runtime data provided in the display regions 3130 and 3140 can vary based on the selected defect and/or hierarchy level. The defect can represent a request-response pair or other transaction which has met defect criteria, as discussed. The display 3100 thus can provide application runtime data which is classified to one or more levels of the hierarchy for a specific defective request-response pair of a transaction. The identifier of the request-response pair is indicated by the RRPID 3145 which is "RRPID123." In the display region 3110, the leftmost nodes represent higher levels of the tree, while the rightmost nodes represent lower levels. Nodes can also be provided for specific types of application runtime data which are associated with a node of the hierarchy. For example, nodes are provided for "Average Response time," "Errors Per Interval" and "Invocations Per Interval" (e.g., invocations of a method of the application per interval) under the "Add To Cart" Business Transaction node. Additionally, each node can be displayed in a collapsed view, in which case lower levels nodes cannot be seen, or an expanded view, in which case lower level nodes are visible. A "+" sign indicates the node is collapsed, whereas a "−" sign indicates the node is expanded. The tree can be used to access both application runtime data and traffic monitoring data based on a hierarchy. Further, multiple trees can be used to access data classified according to multiple hierarchies. FIG. 31A shows the tree being used to access application runtime data.

When the operator selects a particular Business Process or Business Transaction in the tree in the display region 3110, the corresponding application runtime data is accessed. The tree in the display region 3110 thus allows the operator to better understand a context of the application runtime data in display regions 3120, 3130 and 3140. For example, the operator can view defects which are associated with a particular level of the hierarchy. The display provided is more useful than a display which only provides the names of the components which are invoked in the trace.

For example, the "Buy Book" node, which is associated with a business process of the hierarchy, has been selected, in which case a list of defects associated with that business process is provided in display region 3120. Additional information regarding the defect selected in the display region 3120 is displayed in the right-hand display regions 3130 and 3140 which provide a transaction trace and a listing of component details, respectively. The transaction trace can be decorated with a label which has the format: "Customer Experience|Business Processes|Business_Process1|Business Transactions|Business_Transaction1," as indicated at display region 3130. A particular Business Process or Business Transaction in the tree can be selected automatically by default when the interface 3100 is initially displayed. Or, no node can be selected when the interface 3100 is initially displayed.

Recall that a trace indicates the components of an application which are invoked and the time and sequence in which they are invoked. In the particular presentation of the display region 3130, time extends along a horizontal axis. A vertical direction indicates called methods below calling methods. However, this is merely one example presentation of application runtime data. Many other presentations are possible.

The top level component in the transaction trace can be decorated with the business transaction and business process name. For example, in the display region 3130, the notations "Frontends|Apps|BRT Test Web Application|URLs|Default" and "Servlets|AddToCartServlet" are the component names of the invoked components of the trace. The notation "Customer Experience|Bus. Process|BuyBook|Bus. Tran.|AddToCart" indicates that the domain is "Customer Experience," the business process is "BuyBook" (e.g., buy book from web site) and the business transaction is "AddToCart." (e.g., add book to shopping cart). Any descriptive label can be used in the hierarchy to facilitate understanding of the business process that is represented by the trace. By classifying the application runtime data according to the hierarchy, insight into the execution of the application is significantly enhanced. Moreover, the application runtime data is made more understandable to both programmers and individuals with less technical knowledge, such as operations personnel.

The display region 3120 includes information regarding the available traces which have been classified to the selected level of the hierarchy (the business process of "Buy Book") and which are associated with the incident. The operator can select any of the rows to have the corresponding trace displayed in the display region 3130. Each trace is associated with a timestamp, a duration, a description, and a userID field. For the entry 3122, the description "BuyBook/AddToCart" indicates that the business process is "BuyBook" and the business transaction is "AddToCart." The display region 3140 provides other details regarding the invoked components in the traces. For example, note the use of a RRPID 3145 ("RRPID123") which is associated with the selected defect.

Furthermore, aggregated application runtime data can be classified based on the hierarchy. This allows various questions to be answered, such as "What was the number of errors for some time period for a specific business transaction?" The application runtime data, without classification based on the hierarchy, could answer the question "What was the number of errors at some point of time for a component such as an EJB or a servlet?" Thus, as mentioned, classifying the application runtime data according to a hierarchy provides a powerful tool for understanding application performance and diagnosing problems. Additionally, by decorating the transaction traces with the business process name and business transaction name, for instance, further insight can be gained.

FIG. 31B is an example interface display which depicts application runtime data for an incident, including defects of a business transaction "Add To Cart." The display 3150 is provided when the operator selects the node 3162 in the display region 3160 for the business transaction of "Add To Cart." In this case, the display region 3170 is updated to only include the corresponding transactions of the selected business transaction while omitting reference to transactions associated with other business transactions. In this manner, the operator can drill down to lower levels of the hierarchy to obtain corresponding application runtime data. Essentially, the hierarchy can be used as a filter to focus on specific information of interest.

Thus, the displays 2900, 3000, 3100 and 3150 allow the operator to gather data regarding an incident in a logical manner. The display 2900 allows the operator to select an incident from an incident report list. The operator can gain more details of a specific incident from the display 3000 and then access the displays 3100 and 3150 for application runtime data, or the displays 3000 and 3100 or 3150 can be provided at the same time. Or, the operator can access the display 3100 or 3150 from the display 2900. Many variations are possible. The operator can see the transactions which are associated with a particular business process or business transaction, for instance.

Additionally, the tree display can be modified to convey additional information. For example, a business transaction and/or process which caused an incident can be highlighted in the tree, such as in blinking red text. For example, if the "Add To Cart" business transaction caused the incident, the business process of "Buy Book" might be in blinking red in an initial view of the interface 3100. The operator could then expand the tree under "Buy Book" and see a business transaction of "Add To Cart" also in blinking red. In another approach, the interface 3100 can automatically expand the tree to denote the lowest node of the hierarchy which caused the incident.

FIG. 32 is an example interface display 3200 which depicts aggregated application runtime data for a business transaction "Add to Cart." The display 3200 can be provided when the operator selects the "Average response time" node 3212 of the tree in the display region 3210, for instance. In this case, a display region 3220 provides an aggregation of the application runtime data for the business transaction. The display 3200 thus provides aggregated application runtime data which is classified to one or more levels of the hierarchy. Specifically, the aggregated data is classified to the business process of "Buy Book" and the business transaction of "Add To Cart." Further, the selected application runtime data for the business transaction is an "Average response time." Again, note that any meaningful labels can be chosen for use in the hierarchy. In the simplified example of the display region 3220, the horizontal axis denotes time of day and the vertical axis denotes average response time.

Thus, the displays provided allow the operator to view traffic monitoring data and/or application runtime data in an integrated, seamless manner, moving to more detailed views as needed. The displays can also be configured to provide multiple regions as desired to view traffic monitoring data and/or application runtime data associated with multiple levels of the hierarchy at the same time.

FIG. 33 is an example interface display which depicts a defect report list of a traffic monitoring system. The display 3300 can be provided when the "Defects" tab of the display 2900 is selected. Each row includes a date and time, an identifier of the business process, an identifier of the business transaction, a defect type and a limit, such as a time limit that defines when a defect will be declared. Four defects are shown as an example only. For example, the first row indicates a date and time of "7-Apr-2006 15:32:39," a business process of "CE|BuyBook" (where CE is the Customer Experience domain and BuyBook is the business process), a business transaction of "Login," defect type of "Slow Time" and a time limit of 0.001 sec. Also provided is a value of the measured parameter. For example, in the first row, the value is 0.016 sec., which exceeds the limit of 0.001 sec. A business impact, login name, user group, client IP address, web server IP address and web server MAC address are also provided. These addresses allow the operator to determine if the defects are linked to a specific address. Note that the information can be sorted by each column header. Each row includes a link to a display of detailed information for the associated individual defect, as shown in the display 3400 of FIG. 34, e.g., to drill down to obtain further detailed information. For example, the date and time field can be provided as links. The first row includes the link 3310, for instance. The display 3300 thus provides traffic monitoring data for multiple defects.

FIG. 34 is an example interface display which depicts details of a defect on the defect report list of FIG. 33, including both traffic monitoring data and application runtime data. The display 3400 provides traffic monitoring data such as defect information, web server information, transaction information, application server information and user information, as indicated. The display 3400 also provides application runtime data in display regions 3420, 3430 and 3440, analogous to the regions 3120, 3110 and 3140, respectively, of the display 3100 of FIG. 31A. The display 3400 thus provides traffic monitoring data for a defect which is classified to one or more levels of the hierarchy, e.g., the business process and business transaction levels.

Some of the Application Server Information in the display 3400 can be provided to the traffic monitoring system from the application monitoring system, such as in the headers of the responses sent to the clients, as discussed. This information includes the application server ID which is the IP address of the machine that the agent is running on, the virtual machine ID, which is the name of the agent provided by the Enterprise Manager, the request handler ID, which is the entry point, and the RRPID 3410 (e.g., RRPID123). In one approach, the RRPID can be provided to the application monitoring system when the link 3310 is selected (FIG. 33). Thus, the link can carry context information about the defect, and pass it back to the application monitoring system to tell it where to initialize the view so that the application runtime data related to the specific defect is shown, in one possible approach. Similar to the discussion in connection with FIGS. 31A and 31B, display region 3420 provides a transaction trace of the selected defect, while the display region 3430 provides a tree which represents the hierarchy. The "Add To Cart" business transaction node 3432 is selected. In this case, there is only one transaction associated with the defect so the tree can be configured automatically to highlight the "Add To Cart" node 3432. Equivalent information as provided in the tree can be provided in other ways as well. The display 3400 thus provides a unified presentation of both traffic monitoring data and application runtime data on a single screen.

The functionality described herein may be implemented using one or more processor readable storage devices having processor readable code embodied thereon for programming one or more processors. The processor readable storage devices can include computer readable media such as volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

Example Pseudo-Code Listing For Rules Engine

The following listing is referenced, e.g., in the discussion above regarding FIG. 25.

Level 1: Domain

The <DomainConfigFile> element is the top-level element in the rules engine definition and is of the form:

```
<DomainConfigFile
  TSId="id"
  domainName="domain-name"
  <DocInfo/>
  <PrivateParamList>private-parameter-list</PrivateParamList>
  <AppDefList>application-definition-list</AppDefList>
  <TranDefGroupList>transaction-definition-grouplist
  </TranDefGroupList>
</DomainConfigFile>
```

TSId attribute: Required. A unique identifier for the transaction server sending this rules engine definition.

domainName attribute: Optional. Names the domain.

DocInfo element: Required. Describes the XML rules engine definition. See below for a description.

PrivateParamList element: Optional. A sequence of <PrivateParam> elements.

AppDefList element: Optional. A sequence of <AppDef> elements.

TranDefGroupList element: Optional. A sequence of <TranDefGroup> elements.

The <DocInfo> element is of the form:

```
<DocInfo
  version="version"
  dateAndTime="timestamp" />
``` version attribute: Required.
dateAndTime attribute: Required. The value is the date and time when the XML rules engine definition was generated.

A <PrivateParam> element is of the form:

```
<PrivateParam
    name="pattern" />
``` name attribute: Required. A pattern (wildcards can be used) specifying parameter names whose values should not be displayed when traffic monitor parameter tracing is enabled. This can be used for parameters that represent passwords.

An <AppDef> element can describe a web application and is of the form:

```
<AppDef
    id="id"
    name="name"
    appTypeId="id"
    userProcessingType="value"
    <LoginDefOrList>login-def-list</LoginDefOrList>
    <SessionDefOrList>session-def-list</SessionDefOrList>
    <TranSetDefList>business-transaction-definition-list</TranSetDefList>
</AppDef>
``` id attribute: Required. A 64-bit unsigned non-zero integer.
name attribute: Required. A name. It may be used for logging.
appTypeId attribute: Required. A 64-bit unsigned non-zero integer.
userProcessingType attribute: Required. The value is "ENTERPRISE" or "ECOMMERCE."
LoginDefOrList element: Optional. A sequence of <LoginDef> elements, any one of which can be used to match a user login.
SessionDefOrList element: Optional. A sequence of <SessionDef> elements, any one of which can be used to match a session id.
TranSetDefList element: Optional. A sequence of <TranSetDef> elements.

Level 2: Business Process

A <TranDefGroup> element describes a Business Process (which represents a group of TranSets). The <TranDefGroup> element is the second-level element in the rules engine definition and is of the form:

```
<TranDefGroup
    id="id"
    name="name" />
</TranDefGroup>
``` id attribute: Required. A 64-bit unsigned non-zero integer.
name attribute: Required. A name. It may be used for logging.

Level 3: Business Transaction

A <TranSetDef> element defines one business transaction. The <TranSetDef> element is the third-level element in the rules engine definition and is of the form:

```
<TranSetDef
    id="id"
    incarnationId="id"
    name="name"
```

-continued

```
    importance="importance"
    tranDefGroupId="id" />
    <TranUnitDefList>transaction-definition-list</TranUnitDefList>
    <DefectDefList>defect-def-list</DefectDefList>
</TranSetDef>
``` id attribute: Required. A 64-bit unsigned non-zero integer.
incarnationId attribute: Required. A 64-bit unsigned non-zero integer.
name attribute: Required. A name. It may be used for logging.
importance attribute: Optional. A non-negative integer.
tranDefGroupId attribute: Required. The <Id> of the <TranDefGroup> for this transet.
TranUnitDefList element: Required. A non-empty sequence of <TranUnitDef> elements. The first one identifies the business transaction.
DefectDefList element: Optional. A sequence of <DefectDef> elements.

Level 4: Transaction

A <TranUnitDef> element defines one transaction. The <TranUnitDef> element is the fourth-level element in the rules engine definition and is of the form:

```
<TranUnitDef
    id="id"
    name="name"
    collectStats="value"
    cacheable="cacheable"
    count="count"
    <TranCompDefList>trancomp-list</TranCompDefList>
    <DefectDefList>defect-def-list</DefectDefList>
</TranUnitDef>
``` id attribute: Required. A 64-bit unsigned non-zero integer.
name attribute: Required. A name. It may be used for logging.
collectStats attribute: Required. A Boolean that determines whether statistics are reported.
cacheable attribute: Optional. A Boolean. Must be 0 (false) for the first <TranUnitDef> in each <TranSetDef>.
count attribute: Optional. A positive integer indicating how many times the tranunit is expected to be found.
TranCompDefList: Required. A non-empty sequence of <TranCompDef> elements. The first one identifies the transaction.
DefectDefList element: Optional. A sequence of <DefectDef> elements.

Level 5: Transaction component

A <TranCompDef> element describes one request-response pair, such as an HTML page or an image. The <TranCompDef> element is the fifth-level element in the rules engine definition and is of the form:

```
<TranCompDef
    id="id"
    name="name"
    collectStats="value"
    cacheable="cacheable"
    count="count"
    <ParameterDefList>parameter-list</ParameterDefList>
    <DefectDefList>defect-def-list</DefectDefList>
</TranCompDef>
``` id attribute: Required. A 64-bit unsigned non-zero integer.
name attribute: Required. A name. It may be used for logging.

collectStats attribute: Required. A Boolean that determines whether statistics are reported.

cacheable attribute: Optional. A Boolean. Must be 0 (false) for the first <TranCompDef> in each <TranUnitDef>.

count attribute: Optional. A positive integer indicating how many times the trancomp is expected to be found.

ParameterDefList element: Required. A sequence of <ParameterDef> elements.

DefectDefList element: Optional. A sequence of <DefectDef> elements.

A <LoginDef> element describes how to recognize a user login, and includes a non-empty sequence of <ParameterDef> elements, which may not have a "value" attribute. Every parameter in the list must match observed data in order to recognize a user login.

A <SessionDef> element describes how to recognize a user session, and includes a non-empty sequence of <ParameterDef> elements, which may not have a "value" attribute. Every parameter in the list must match observed data in order to recognize a session id.

A <ParameterDef> element describes one parameter which can be used for identifying trancomps or logins, and is of the form:

```
<ParameterDef
    type="type"
    op="operator"
    name="name"
    value="value"
    offset="offset"
    length="length" />
``` type attribute: Required. One of "Q," "C," "P," "U," "S," "NTLM_AUTH," or "BASIC_AUTH":

Q: Query parameter. Matched against query parameters in a URL.

C: Cookie parameter. Matched against Cookie: and Set-Cookie: headers.

P: Post parameter. Matched against data in an HTTP post.

U: URL parameter. The Name attribute must be "Host," "Port," or "Path."

S: Session manager parameter. Currently the Name attribute must be "UserName," "SessionId," or "DistinguishedName." These are used for Netegrity SiteMinder. "S" is not allowed with a <ParameterDef> element in a <TranCompDef> element.

NTLM_AUTH: A parameter extracted from NTLM Authentication. The name attribute must be "UserName" or "MessageType." When the name is "MessageType" the only possible values are "1" and "3."

BASIC_AUTH: A parameter extracted from HTTP Basic Authentication (RFC 2617). The name attribute must be "UserName."

op attribute: Required when used in a <TranCompDef> element; not allowed when used in a <LoginId> or <SessionId> element. Specifies the relation that must hold between the value attribute and the observed data in order for this parameter to match the data. The possible values (with internal names in parentheses) are:

1: (MATCH_SIMPLE_PATTERN) The value attribute represents a pattern which must match the observed data. The pattern may contain a single "*" character, which matches any substring.

2: (DOES_NOT_EXIST) The observed data must not contain a parameter named by the name attribute. In this case the value attribute must not be supplied.

Op 0 (IGNORE) is used internally but may not appear in the domainconfig.xml rules engine definition.

Other op values may be used, such as regular-expression-match or exact-match.

value attribute: Optional when used in a <TranCompDef> element; not allowed when used in a <LoginId> or <SessionId> element. Used with the Name attribute for identifying trancomps.

offset attribute: Optional. Non-negative integer. Specifies how many characters at the beginning of the observed data are to be skipped when matching against the string in the Value attribute.

length attribute: Optional. Positive integer. Specifies how many characters of the observed data (after skipping the number of characters specified by the Offset attribute) are matched against the string in the Value attribute.

A <DefectDef> element specifies defects that can be generated for a trancomp, transaction, or business transaction. It is of the form:

```
<DefectDef
    id="id"
    importance="importance"
    defectType="type"
    defectValue="value" />
``` id attribute: Required. A 64-bit unsigned integer.

importance attribute: Optional. An integer.

defectType attribute: Required. An integer between 1 and 15 but not including the obsolete types 12, 13, and 14. The legal values depend on the context of the enclosing <DefectDefList>:

1-6: any 7, 10-11: <TranCompDef>, only for the first (identifying) trancomp in a <TranUnitDef>

8: <TranCompDef>, only for a trancomp other than the first (identifying) trancomp in a <TranUnitDef>

9: <TranUnitDef>

15: <TranSetDef> defectValue attribute: Required. The value depends on defectType:

7 or 8: A comma-separated list of 1 or more HTTP status codes or status code ranges, where a status code is a non-negative integer and a range is a pair of status codes separated by '–'.

10: Any non-empty string.

All others: An unsigned integer.

What is claimed is:

1. A method for providing information regarding an application, comprising:

generating application runtime data based on execution of an application, the execution is responsive to at least one client providing a request to the application;

classifying the application runtime data according to a hierarchy, thereby providing classified application runtime data, the hierarchy comprising different levels which characterize the interacting, the classifying includes obtaining at least one component from the request, comparing the at least one component to definitions in a set of definitions, identifying a matching definition in the set of definitions, the matching definition being associated with one level of the hierarchy, and traversing a tree which represents the hierarchy to identify a next higher level and a next, next higher level in the hierarchy; and providing an output using the classified application runtime data.

2. The method of claim 1, wherein:
the classifying comprises classifying an aggregation of application runtime data associated with a plurality of clients according to the hierarchy.

3. The method of claim 1, wherein:
the at least one component of the request, and the definitions in the set of definitions, which are used in the comparing, comprise URLs.

4. The method of claim 1, further comprising:
providing a data structure which associates the application runtime data with one or more of the different levels of the hierarchy; wherein:
the providing an output comprises displaying an interface with a tree having nodes which are labeled according to the hierarchy, receiving an operator selection of one of the nodes, corresponding to a selected level of the hierarchy, querying a data store based on the selected level of the hierarchy to access associated application runtime data, based on the data structure, and displaying the associated application runtime data.

5. The method of claim 1, further comprising:
providing a data structure which associates the application runtime data with identifiers of the next higher level and an identifier of the next, next higher level;
wherein, in the data structure, the identifier of the next, next higher level identifies a business process, and the identifier of the next higher level identifies business transactions which are parts of the business process, the business transactions are user-specific tasks.

6. The method of claim 5, wherein:
the data structure further includes an identifier of a transaction which is part of one of the business transactions.

7. The method of claim 6, wherein:
the transaction comprises a web page which is associated with a set of web pages.

8. The method of claim 1, wherein:
at least one level of the hierarchy is associated with a set of transactions, each transaction being associated with at least one web page.

9. The method of claim 1, wherein:
the application provides a response to the at least one client based on the request, and assigns a request-response pair identifier to the request and the response, and the application runtime data is stored, classified by the request-response pair identifier, to provide the classified application runtime data.

10. The method of claim 1, wherein:
the application runtime data indicates components invoked by the application during execution of the application.

11. The method of claim 1, wherein:
the different levels of the hierarchy characterize the interacting according to a business model with different degrees of breadth.

12. At least one processor readable storage device having processor readable code embodied thereon for programming at least one processor to perform a method, the method comprising:
at an application, receiving a request from at least one client which is interacting with the application;
responsive to the request, generating application runtime data based on execution of the application;

classifying the application runtime data according to a hierarchy, thereby providing classified application runtime data, the hierarchy comprising at least three levels which characterize the interacting with different degrees of breadth, the classifying comprises obtaining at least one component from the request, comparing the at least one component to definitions in a set of definitions, identifying a matching definition in the set of definitions, the matching definition being associated with one level of the hierarchy, and traversing a tree which represents the hierarchy to identify a next higher level and a next, next higher level in the hierarchy; and providing an output using the classified application runtime data.

13. The at least one processor readable storage device of claim 12, wherein:
the providing an output comprises displaying an interface with a tree having nodes which are labeled according to the hierarchy, receiving an operator selection of one of the nodes, corresponding to a selected level of the at least three levels of the hierarchy, querying a data store based on the selected level of the hierarchy to access associated application runtime data, and displaying the associated application runtime data.

14. A monitoring system, comprising:
one or more storage devices; and
one or more processors in communication with said one or more storage devices, said one or more processors: (a) generate application runtime data based on execution of an application, the execution is responsive to a request from at least one client interacting with the application, (b) classify the application runtime data according to a hierarchy, thereby providing classified application runtime data, the hierarchy comprising different levels which characterize the interacting, where, to classify the application runtime data, the one or more processors obtain at least one component from the request, compare the at least one component to definitions in a set of definitions, identify a matching definition in the set of definitions, the matching definition being associated with one level of the hierarchy, and traverse a tree which represents the hierarchy to identify a next higher level and a next, next higher level in the hierarchy, and (c) provide an output using the classified application runtime data.

15. The monitoring system of claim 14, wherein:
the one or more processors, to provide the output, display an interface which allows viewing of a selected portion of the classified application runtime data according to a selected level of the hierarchy.

16. The monitoring system of claim 14, wherein:
the at least one component of the request, and the definitions in the set of definitions, which are used in the comparing, comprise at least one of URLs, HTTP post parameters, cookie parameters, query parameters and session manager parameters.

17. The method of claim 1, wherein:
the application provides a response to the at least one client based on the request, and assigns a request-response pair identifier to the request and the response, and the application runtime data is stored, classified by the request-response pair identifier, to provide the classified application runtime data; and the providing an output comprises displaying an interface with a tree having nodes which are labeled according to the hierarchy, receiving an operator selection of one of the nodes, corresponding to a selected level of the hierarchy, querying a data store based on the selected level of the hierarchy to access associated application runtime data, and displaying the associated application runtime data, where the associated application runtime data which is accessed is obtained by filtering based on the request-response pair identifier.

18. The method of claim 1, wherein:
the at least one component of the request, and the definitions in the set of definitions, which are used in the comparing, comprise URL host names and ports.

19. The method of claim 1, wherein:
the at least one component of the request, and the definitions in the set of definitions, which are used in the comparing, comprise HTTP post parameters.

20. The method of claim 1, wherein:
the at least one component of the request, and the definitions in the set of definitions, which are used in the comparing, comprise cookie parameters.

21. The method of claim 1, wherein:
the at least one component of the request, and the definitions in the set of definitions, which are used in the comparing, comprise query parameters.

22. The method of claim 1, wherein:
the at least one component of the request, and the definitions in the set of definitions, which are used in the comparing, comprise session manager parameters.

23. The method of claim 1, wherein:
the comparing comprises comparing the at least one component to a set of regular expressions, one-by-one, until a match is found.

24. The method of claim 1, wherein:
the comparing uses a rules engine which specifies a pattern which must be matched in the at least one component, when determining whether there is a match between the at least one component and one of the definitions in the set of definitions.

25. The method of claim 1, wherein:
the comparing uses a rules engine which specifies a parameter which must not exist in the at least one component, when determining whether there is a match between the at least one component and one of the definitions in the set of definitions.

26. The at least one processor readable storage device of claim 12, wherein:
the classifying includes providing a data structure which associates the application runtime data with identifiers of each of the at least three levels of the hierarchy, where the output is provided based on the data structure.

27. The at least one processor readable storage device of claim 12, wherein:
the at least three levels of the hierarchy include the one level, a next higher level, and a next, next higher level; and
the classifying the application runtime data includes providing a data structure which associates the application runtime data with identifiers of the one level, the next higher level and the next, next higher level, where the output is provided based on the data structure.

28. The at least one processor readable storage device of claim 12, wherein:
the at least one component of the request, and the definitions in the set of definitions, which are used in the comparing, comprise URLs.

29. The at least one processor readable storage device of claim 12, wherein:
the at least one component of the request, and the definitions in the set of definitions, which are used in the comparing, comprise HTTP post parameters.

30. The at least one processor readable storage device of claim 12, wherein:
the at least one component of the request, and the definitions in the set of definitions, which are used in the comparing, comprise cookie parameters.

31. The at least one processor readable storage device of claim 12, wherein:
the at least one component of the request, and the definitions in the set of definitions, which are used in the comparing, comprise query parameters.

32. The at least one processor readable storage device of claim 12, wherein:
the at least one component of the request, and the definitions in the set of definitions, which are used in the comparing, comprise session manager parameters.

33. The at least one processor readable storage device of claim 12, wherein:
the comparing comprises comparing the at least one component to a set of regular expressions, one-by-one, until a match is found.

34. The monitoring system of claim 14, wherein:
to classify the application runtime data, the one or more processors provide a data structure which associates the application runtime data with identifiers of the one level, the next higher level and the next, next higher level.

35. The monitoring system of claim 14, wherein:
the interface includes a tree having nodes which are labeled according to the hierarchy; and
the one or more processors receive an operator selection of one of the nodes, corresponding to a selected level of the hierarchy, query a data store based on the selected level of the hierarchy to access associated application runtime data, and display the associated application runtime data.

* * * * *